US010358194B1

(12) United States Patent
Wengreen et al.

(10) Patent No.: US 10,358,194 B1
(45) Date of Patent: Jul. 23, 2019

(54) SELF-BALANCING SURFBOARD

(71) Applicants: Shelby Jean Wengreen, Sammamish, WA (US); Eric John Wengreen, Sammamish, WA (US)

(72) Inventors: Shelby Jean Wengreen, Sammamish, WA (US); Eric John Wengreen, Sammamish, WA (US)

( * ) Notice: Subject to any disclaimer, the term of this patent is extended or adjusted under 35 U.S.C. 154(b) by 0 days.

(21) Appl. No.: 16/236,480

(22) Filed: Dec. 29, 2018

Related U.S. Application Data

(60) Provisional application No. 62/775,355, filed on Dec. 4, 2018.

(51) Int. Cl.

| | |
|---|---|
| ***B63B 35/79*** | (2006.01) |
| ***B63H 5/125*** | (2006.01) |
| ***G05D 1/02*** | (2006.01) |

(52) U.S. Cl.
CPC ......... *B63B 35/7943* (2013.01); *B63H 5/125* (2013.01); *G05D 1/0206* (2013.01); *B63H 2005/1254* (2013.01)

(58) Field of Classification Search
CPC ... B63B 35/7943; B63B 39/06; B63B 39/061; G05D 1/0206
See application file for complete search history.

(56) References Cited

U.S. PATENT DOCUMENTS 5,487,441 A 1/1996 Endo
5,590,908 A * 1/1997 Carr ......................... A63C 5/03 280/14.21
5,839,386 A 11/1998 Frieling
6,095,076 A 8/2000 Nesbitt
6,095,881 A 8/2000 Neubauer
6,302,230 B1 10/2001 Kamen
6,568,340 B2 5/2003 Dec
6,651,763 B1 11/2003 Kamen
6,743,062 B1 6/2004 Jones
6,973,847 B2 12/2005 Adams
7,023,330 B2 4/2006 Kamen
7,275,607 B2 10/2007 Kamen
7,458,435 B2 * 12/2008 Negoro ................. A63C 17/12 180/180
7,479,872 B2 1/2009 Kamen
8,398,446 B2 3/2013 Railey
8,738,278 B2 5/2014 Chen
8,905,800 B2 12/2014 Dusablon
(Continued)

FOREIGN PATENT DOCUMENTS

CN 2018-713487 * 9/2018
JP 10023613 A * 1/1998

OTHER PUBLICATIONS eFoil Wireless Hand Controller—Prior art at least as early as Dec. 3, 2018; Downloaded on Dec. 31, 2018 from https://liftfoils.com/efoil.
(Continued)

*Primary Examiner* — Ajay Vasudeva

(57) ABSTRACT

A board can have an upward-facing side arranged to enable a person to stand on the board while surfing. A motor can be attached to a downward-facing side of the board to propel the board. A computer system can use data from sensors and a steering system to actively respond to actions from the person riding on the board.

30 Claims, 23 Drawing Sheets

(56) References Cited

U.S. PATENT DOCUMENTS

| | | | | |
|---|---|---|---|---|
| 9,004,213 | B2 * | 4/2015 | Larson | A63C 17/012 180/181 |
| 9,045,202 | B1 * | 6/2015 | Alarcon | G01C 21/203 |
| 9,145,206 | B1 | 9/2015 | Robinson | |
| 9,359,044 | B2 | 6/2016 | Langelaan | |
| 9,376,189 | B1 | 6/2016 | Henau | |
| 9,440,714 | B2 | 9/2016 | Robinson | |
| 9,944,361 | B2 * | 4/2018 | Cho | B63B 35/7943 |
| 10,150,544 | B2 * | 12/2018 | Schibli | B63H 16/08 |
| 2005/0274210 | A1 | 12/2005 | Adams | |
| 2011/0056423 | A1 | 3/2011 | Railey | |
| 2016/0231138 | A1 | 8/2016 | Roberts-Thomson | |
| 2017/0050730 | A1 | 2/2017 | Robinson | |

OTHER PUBLICATIONS

Fliteboard Wireless Hand Controller—Prior art at least as early as Dec. 3, 2018; Downloaded on Dec. 31, 2018 from https://fliteboard.com/product-details.

Sea-Doo—Prior art at least as early as Dec. 3, 2018; Downloaded on Dec. 31, 2018 from www.sea-doo.com.

Surftek Hand Controller—Prior art at least as early as Dec. 3, 2018; Downloaded on Dec. 31, 2018 from https://www.surfteksurfboards.com.

Jefsurf Hand Controller—Prior art at least as early as Dec. 3, 2018; Downloaded on Dec. 31, 2018 from http://www.jetsurfus.com.

Gyroscope Wikipedia Article—Prior art at least as early as Dec. 3, 2018; Downloaded on Dec. 31, 2018 from https://en.wikipedia.org/wiki/Gyroscope.

Inclinometer Wikipedia Article—Prior art at least as early as Dec. 3, 2018; Downloaded on Dec. 31, 2018 from https://en.wikipedia.org/wiki/Inclinometer.

Pressure Sensor Wikipedia Article—Prior art at least as early as Dec. 3, 2018; Downloaded on Dec. 31, 2018 from https://en.wikipedia.org/wiki/Pressure_sensor.

Load Cell Wikipedia Article—Prior art at least as early as Dec. 3, 2018; Downloaded on Dec. 31, 2018 from https://en.wikipedia.org/wiki/Load_cell.

* cited by examiner

| Time | Position of Person | Position of Board | Details |
|---|---|---|---|
| 1 | 1.0 | 2.0 | The person is falling off the back of the board. Board traveling at 1 foot per unit of time. Person traveling at 0.5 feet per unit of time. |
| 2 | 1.5 | 3.0 | The board detects problem due to force on back of board or due to tilt of board. |
| 3 | 2.0 | 3.2 | Board reduces velocity. Board traveling at 0.2 feet per unit of time. Person traveling at 0.5 feet per unit of time. |
| 4 | 2.5 | 3.4 | Board traveling at 0.2 feet per unit of time. Person traveling at 0.5 feet per unit of time. |
| 5 | 3.0 | 3.6 | Board traveling at 0.2 feet per unit of time. Person traveling at 0.5 feet per unit of time. |
| 6 | 3.5 | 3.8 | Board traveling at 0.2 feet per unit of time. Person traveling at 0.5 feet per unit of time. |
| 7 | 4.0 | 4.0 | The board detects force or tilt indicative of the person being centered on the board. Board adjusts velocity. |
| 8 | 4.5 | 4.5 | Board traveling at 0.5 feet per unit of time. Person traveling at 0.5 feet per unit of time. |

FIG. 38

SELF-BALANCING SURFBOARD

CROSS-REFERENCE TO RELATED APPLICATION

The entire contents of the following application are incorporated by reference herein: U.S. Patent Application No. 62/775,355; filed Dec. 4, 2018; and entitled SELF-BALANCING SURFBOARD.

BACKGROUND

Field

Various embodiments disclosed herein relate to boards configured to be ridden on water. Certain embodiments relate to propulsion systems for boards.

Description of Related Art

Surfing is very popular along ocean coasts. Many people, however, do not live near an ocean coast. Efforts to replicate surfing inland have included wave pools, river surfing, and attaching a motor to surfboards.

Control systems for the motor have included hand-held throttles. Squeezing a trigger of the hand-held throttle causes the motor to increase its thrust. These systems, however, are difficult to control. Even the most talented surfers struggle to perform basic maneuvers on these systems. Thus, there is a need for systems and methods to enable the joy and thrill of surfing in inland bodies of water.

SUMMARY

In some embodiments, a watercraft comprises a board having an upward-facing side configured to enable a person to stand while riding the watercraft. The board can comprise a central axis, a nose, and a tail. The watercraft can comprise a motor coupled to the board and configured to propel the board.

In some embodiments, a watercraft comprises a first tilt sensor configured to detect a first rotation of at least a first portion of the board in a counter-clockwise direction relative to the central axis. The watercraft can comprise a steering system configured to turn the watercraft by directing water flow. The watercraft can comprise a computer system comprising at least one processor and a memory having program instructions that when executed by the at least one processor are configured to cause the steering system to direct the water flow to turn the watercraft leftward in response to the first tilt sensor detecting the first rotation.

In some embodiments, a remote computing device is communicatively coupled (e.g., wirelessly) with the computer system. Software (e.g., an "app" running on the remote computing device) can be used to select settings that are sent from the remote computing device to the computer system of the watercraft.

In some embodiments, the board comprises a front half having the nose. The steering system can comprise a portion configured to direct the water flow. The portion of the steering system can be coupled to the front half of the board. The portion of the steering system can be configured to direct the water flow rightward (or leftward) in response to the first tilt sensor detecting the first rotation.

In some embodiments, the board comprises a back half having the tail. The steering system can comprise a portion configured to direct the water flow. The portion of the steering system can be coupled to the back half of the board. The portion of the steering system can be configured to direct the water flow leftward (or rightward) in response to the first tilt sensor detecting the first rotation.

In some embodiments, the first tilt sensor is configured to detect a second rotation of the board in a clockwise direction relative to the central axis, and the program instructions are configured to cause the steering system to direct the water flow to turn the watercraft rightward (or leftward) in response to the first tilt sensor detecting the second rotation.

In some embodiments, a second tilt sensor is configured to detect a second rotation of at least a second portion of the board in a clockwise direction relative to the central axis. The program instructions can be configured to cause the steering system to direct the water flow to turn the watercraft rightward (or leftward) in response to the second tilt sensor detecting the second rotation.

In some embodiments, the first tilt sensor comprises at least one of a gyroscope, an accelerometer, an inclinometer, a clinometer, a liquid capacitive sensor, an electrolytic sensor, and a pendulum sensor. The second tilt sensor can comprise at least one of a gyroscope, an accelerometer, an inclinometer, a clinometer, a liquid capacitive sensor, an electrolytic sensor, and a pendulum sensor. The first tilt sensor can comprise a gyroscope and an accelerometer. The second tilt sensor can comprise a gyroscope and an accelerometer.

In some embodiments, the steering system comprises at least one of a movable propeller configured to direct the water flow, a movable impeller configured to direct the water flow, a movable nozzle configured to direct the water flow, and a movable fin configured to direct the water flow.

In some embodiments, the steering system comprises a channel configured to direct the water flow in a first direction. The first direction can be offset from the central axis of the board. The offset can be configured such that directing the water flow in the first direction causes the board to turn.

In some embodiments, the steering system comprises a channel configured to direct the water flow in a first direction. The first direction can be oriented at a first angle relative to the central axis of the board. The first angle can be greater than ten degrees, less than 80 degrees, and/or less than 110 degrees. The first angle can be configured such that directing the water flow in the first direction causes the board to turn.

In some embodiments, the board is a surfboard. The board can comprise at least one of a surfboard shape, a wakeboard shape, a stand-up-paddleboard shape, a kiteboarding board shape, a snowboard shape, a wakesurfing board shape, and a windsurfing board shape.

In some embodiments, the board is buoyant and at least a majority of the upward-facing side is approximately flat. The upward-facing side can comprise foot bindings that can be figured to help secure feet of the rider to the board.

In some embodiments, the board is buoyant and at least a majority of the upward-facing side is approximately flat to enable feet of the person to stand on the upward-facing side. The upward-facing side can comprise a texture configured to provide grip to the feet of the person surfing on the board.

In some embodiments, the watercraft comprises an enclosed shape configured to float in response to being submerged in fresh water. The watercraft can be configured to enable the person to surf on the watercraft. The watercraft can comprise a length from the nose to the tail, a width from a left side of the watercraft to a ride side of the watercraft, and a thickness. The length can be less than eleven feet, less than eight feet, greater than 4 feet, and/or greater than three feet. The width can be less than four feet, less than three feet, greater than 12 inches, and/or greater than 18 inches. The thickness can be less than eleven inches, less than 8 inches, greater than 0.1 inches, and/or greater than 0.4 inches.

In some embodiments, a watercraft comprises a board having an upward-facing side configured to enable a person to stand while riding the watercraft. The board can comprise a central axis, a nose, and a tail. The watercraft can comprise a motor coupled to the board and configured to propel the board.

In some embodiments, the board comprises a front portion having the nose and a back portion having the tail. The upward-facing side of the board can comprise a first upward-facing surface and a second upward-facing surface. The watercraft can comprise a first force sensor system coupled to the front portion such that the first force sensor system is configured to detect a first foot stepping on the first upward-facing surface in a first area of the front portion. The watercraft can comprise a second force sensor system coupled to the back portion such that the second force sensor system is configured to detect a second foot stepping on the second upward-facing surface in a second area of the back portion. The first force sensor system can comprise one or more force sensors. The second force sensor system can comprise one or more force sensors. A data analysis system can analyze data from many force sensors of the first force sensor system and can analyze data from many force sensors of the second force sensor system.

In some embodiments, the watercraft is configured to enable the person to surf on the watercraft.

In some embodiments, a watercraft comprises a computer system having at least one processor and a memory having program instructions that when executed by the at least one processor are configured to increase a first thrust of the motor in response to comparing a first force detected by the first force sensor system to a second force detected by the second force sensor system. In some embodiments, program instructions increase a first thrust of the motor by increasing a rotational speed of an impeller or propeller and/or by increasing electrical power supplied to an electrical motor.

In some embodiments, program instructions are configured to decrease the first thrust of the motor at least ninety percent in response to the first force sensor system detecting a third force that is below a first threshold, and in response to the second force sensor system detecting a fourth force that is below a second threshold. The first threshold can be configured to be indicative of the person not standing on the first upward-facing surface. The second threshold can be configured to be indicative of the person not standing on the second upward-facing surface.

In some embodiments, a first force sensor system comprises at least one of an electronic force sensor, a pressure sensor, a pressure transducer, a force transducer, a first strain gauge, a piezoresistive strain gauge, a piezoelectric force sensor, a diaphragm force sensor, a capacitive force sensor, an electromagnetic force sensor, an optical force sensor, a potentiometric force sensor, a resonant force sensor, a thermal force sensor, an ionization force sensor, and a load cell.

In some embodiments, a second force sensor system comprises at least one of an electronic force sensor, a pressure sensor, a pressure transducer, a force transducer, a first strain gauge, a piezoresistive strain gauge, a piezoelectric force sensor, a diaphragm force sensor, a capacitive force sensor, an electromagnetic force sensor, an optical force sensor, a potentiometric force sensor, a resonant force sensor, a thermal force sensor, an ionization force sensor, and a load cell.

In some embodiments, a first force sensor system comprises at least a first force sensor, a second force sensor, and a third force sensor arranged in a triangular format under the first upward-facing surface to detect the first force.

In some embodiments, a second force sensor system comprises at least a first force sensor, a second force sensor, and a third force sensor arranged in a triangular format under the second upward-facing surface to detect the second force.

In some embodiments, a first force sensor system comprises at least a first force sensor, a second force sensor, a third force sensor, and a fourth force sensor arranged in at least one of a quadrilateral format under the first upward-facing surface to detect the first force and a trapezoidal format under the first upward-facing surface to detect the first force.

In some embodiments, a second force sensor system comprises at least a first force sensor, a second force sensor, a third force sensor, and a fourth force sensor arranged in at least one of a quadrilateral format under the second upward-facing surface to detect the second force and a trapezoidal format under the second upward-facing surface to detect the second force.

In some embodiments, a first force sensor system comprises at least a first force sensor and a second force sensor. The first force sensor and the second force sensor can be configured to detect force from the first foot stepping on the first upward-facing surface. The second force sensor system can comprise at least a third force sensor and a fourth force sensor. The third force sensor and the fourth force sensor can be configured to detect force from the second foot stepping on the second upward-facing surface. Program instructions can be configured to determine the first force based on first data from the first force sensor and based on second data from the second force sensor. Program instructions can be configured to determine the second force based on third data from the third force sensor and based on fourth data from the fourth force sensor.

In some embodiments, the watercraft comprises a computer system having at least one processor and a memory having program instructions that when executed by the at least one processor are configured to increase a first thrust of the motor in response to determining that a first force detected by the first force sensor system is greater than a first predetermined threshold relative to a second force detected by the second force sensor system.

In some embodiments, the watercraft comprises a computer system having at least one processor and a memory having program instructions that when executed by the at least one processor are configured to increase a first thrust of the motor in response to determining that a first ratio of the first force divided by the second force is greater than a second predetermined threshold.

In some embodiments, the watercraft comprises a computer system having at least one processor and a memory having program instructions that when executed by the at least one processor are configured to increase a first thrust of the motor in response to determining that a second ratio of the second force divided by the first force is less than a third predetermined threshold.

In some embodiments, the watercraft comprises a computer system having at least one processor and a memory having program instructions that when executed by the at least one processor are configured to increase a first thrust of the motor in response to determining that a first force detected by the first force sensor system is greater than a second force detected by the second force sensor system.

In some embodiments, the watercraft comprises a computer system having at least one processor and a memory having program instructions that when executed by the at least one processor are configured to increase a first thrust of the motor in response to determining that the second force detected by the second force sensor system is less than the first force detected by the first force sensor system.

In some embodiments, the watercraft comprises a computer system having at least one processor and a memory having program instructions that when executed by the at least one processor are configured to increase a first thrust of the motor in response to determining that the first force detected by the first force sensor system is at least twenty percent greater than the second force detected by the second force sensor system.

In some embodiments, the watercraft comprises a computer system having at least one processor and a memory having program instructions that when executed by the at least one processor are configured to increase a first thrust of the motor in response to determining that the second force detected by the second force sensor system is at least twenty percent less than the first force detected by the first force sensor system.

In some embodiments, the watercraft comprises a computer system having at least one processor and a memory having program instructions that when executed by the at least one processor are configured to increase a first thrust of the motor in response to determining that the first force detected by the first force sensor system is greater than seventy percent, greater than eighty percent, and/or greater than ninety percent of the second force detected by the second force sensor system.

In some embodiments, the watercraft comprises a computer system having at least one processor and a memory having program instructions that when executed by the at least one processor are configured to increase a first thrust of the motor in response to determining that the second force detected by the second force sensor system is less than 110 percent, less than 120 percent, and/or less than 140 percent of the first force detected by the first force sensor system.

In some embodiments, the watercraft comprises a computer system having at least one processor and a memory having program instructions that when executed by the at least one processor are configured to decelerate the watercraft in response to comparing a first force detected by the first force sensor system to a second force detected by the second force sensor system.

In some embodiments, the motor comprises at least one of a propeller and an impeller. The program instructions can be configured to decelerate the watercraft by decreasing a second thrust of the motor. The program instructions can decrease the second thrust of the motor by reducing a rotational speed of the propeller and/or impeller. The program instructions can decrease the second thrust of the motor by reducing an electrical power supplied to the motor.

In some embodiments, the motor comprises at least one of a propeller and an impeller. The program instructions can be configured to decelerate the watercraft by reversing a rotational direction of at least one of the propeller and the impeller from a forward thrust direction to a reverse thrust direction.

In some embodiments, program instructions are configured to decelerate the watercraft by deploying at least one braking fin.

In some embodiments, a computer system comprises at least one processor and a memory having program instructions that when executed by the at least one processor are configured to decelerate the watercraft in response to determining that a first force detected by the first force sensor system is less than a first predetermined threshold relative to a second force detected by the second force sensor system.

In some embodiments, a computer system comprises at least one processor and a memory having program instructions that when executed by the at least one processor are configured to decelerate the watercraft in response to determining that a first ratio of the first force divided by the second force is less than a second predetermined threshold.

In some embodiments, a computer system comprises at least one processor and a memory having program instructions that when executed by the at least one processor are configured to decelerate the watercraft in response to determining that a second ratio of the second force divided by the first force is greater than a third predetermined threshold.

In some embodiments, a computer system comprises at least one processor and a memory. The memory can comprise program instructions that when executed by the at least one processor are configured to decelerate the watercraft in response to determining that a first force detected by the first force sensor system is less than a second force detected by the second force sensor system.

In some embodiments, a computer system comprises at least one processor and a memory. The memory can comprise program instructions that when executed by the at least one processor are configured to decelerate the watercraft in response to determining that the second force detected by the second force sensor system is greater than the first force detected by the first force sensor system.

In some embodiments, a computer system comprises at least one processor and a memory. The memory can comprise program instructions that when executed by the at least one processor are configured to decelerate the watercraft in response to determining that the first force detected by the first force sensor system is at least ten percent, at least twenty percent, and/or at least thirty percent less than the second force detected by the second force sensor system.

In some embodiments, a computer system comprises at least one processor and a memory. The memory can comprise program instructions that when executed by the at least one processor are configured to decelerate the watercraft in response to determining that the second force detected by the second force sensor system is at least ten percent, at least twenty percent, and/or at least thirty percent greater than the first force detected by the first force sensor system.

In some embodiments, a computer system comprises at least one processor and a memory. The memory can comprise program instructions that when executed by the at least one processor are configured to decelerate the watercraft in response to determining that the first force detected by the first force sensor system is less than seventy percent, is less than eighty percent, and/or is less than ninety percent of the second force detected by the second force sensor system.

In some embodiments, a computer system comprises at least one processor and a memory. The memory can comprise program instructions that when executed by the at least one processor are configured to decelerate the watercraft in response to determining that the second force detected by the second force sensor system is greater than 110 percent, is greater than 120 percent, and/or is greater than 140 percent of the first force detected by the first force sensor system.

In some embodiments, a watercraft comprises a steering system configured to turn the watercraft by directing water flow. The watercraft can comprise a computer system having at least one processor and a memory. At least one of the first force sensor system and the second force sensor system can comprise at least a first force sensor located on a left half of the board and a second force sensor located on a right half of the board. The memory can comprise program instructions that when executed by the at least one processor are configured to cause the steering system to direct the water flow to turn the watercraft leftward (or rightward) in response to at least one of determining a first force detected by the first force sensor is greater than a second force detected by the second force sensor; determining the second force detected by the second force sensor is less than the first force detected by the first force sensor; determining the first force detected by the first force sensor is at least ten percent, at least twenty percent, and/or at least forty percent greater than the second force detected by the second force sensor; and determining the second force detected by the second force sensor is at least ten percent, at least twenty percent, and/or at least forty percent less than the first force detected by the first force sensor. In some embodiments, program instructions comprise software and/or firmware.

In some embodiments, the program instructions are configured to cause the steering system to direct the water flow to turn the watercraft rightward (or leftward) in response to at least one of determining the first force detected by the first force sensor is less than the second force detected by the second force sensor; determining the second force detected by the second force sensor is greater than the first force detected by the first force sensor; determining the first force detected by the first force sensor is at least ten percent, at least twenty percent, and/or at least forty percent less than the second force detected by the second force sensor; and determining the second force detected by the second force sensor is at least ten percent, at least twenty percent, and/or at least forty percent greater than the first force detected by the first force sensor.

In some embodiments, a watercraft comprises a first force sensor system coupled to a left half of the board such that the first force sensor system is configured to detect a first force from at least a first portion of a first foot stepping on the left half. The watercraft can comprise a second force sensor system coupled to a right half of the board such that the second force sensor system is configured to detect a second force from at least a second portion of the first foot stepping on the right half. The watercraft can comprise a steering system configured to turn the watercraft by directing water flow. The watercraft can comprise a computer system comprising at least one processor and a memory. The memory can comprise program instructions that when executed by the at least one processor are configured to cause the steering system to direct the water flow to turn the watercraft leftward in response to at least one of determining the first force is greater than the second force; determining the second force is less than the first force; determining the first force is at least ten percent, at least twenty percent, and/or at least forty percent greater than the second force; and determining the second force is at least ten percent, at least twenty percent, and/or at least forty percent less than the first force.

In some embodiments, a watercraft comprises a battery configured to supply electrical power to the motor, and a computer system comprising at least one processor and a memory having program instructions that when executed by the at least one processor are configured to monitor a power level of the battery. The program instructions can be configured to limit a maximum available thrust of the motor to less than 50 percent of a maximum full-charge thrust of the motor and greater than 5 percent of the maximum full-charge thrust in response to the power level falling below a predetermined threshold that is less than 30 percent of a maximum of the power level. The program instructions can be configured to limit the maximum available thrust until the power level is greater than 30 percent of the maximum of the power level.

In some embodiments, a watercraft comprises a hydrofoil. The hydrofoil can couple the motor to the board.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

FIG. 38 illustrates a position table, according to some embodiments.

DETAILED DESCRIPTION

Although certain embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Surfing is very popular along ocean coasts. Many people, however, do not live near an ocean coast. Efforts to replicate surfing inland have included wave pools, river surfing, and attaching a motor to surfboards.

Control systems for the motor have included hand-held throttles. Squeezing a trigger of the hand-held throttle causes the motor to increase its thrust. These systems, however, are difficult to control. Even the most talented surfers struggle to perform basic maneuvers on these systems. Simply coupling a propeller to the bottom of a surfboard (with or without a hydrofoil) is not enough to unlock the thrill of surfing on lakes. Some of the embodiments described herein dramatically simplify riding a motorized surfboard.

Figure 2:
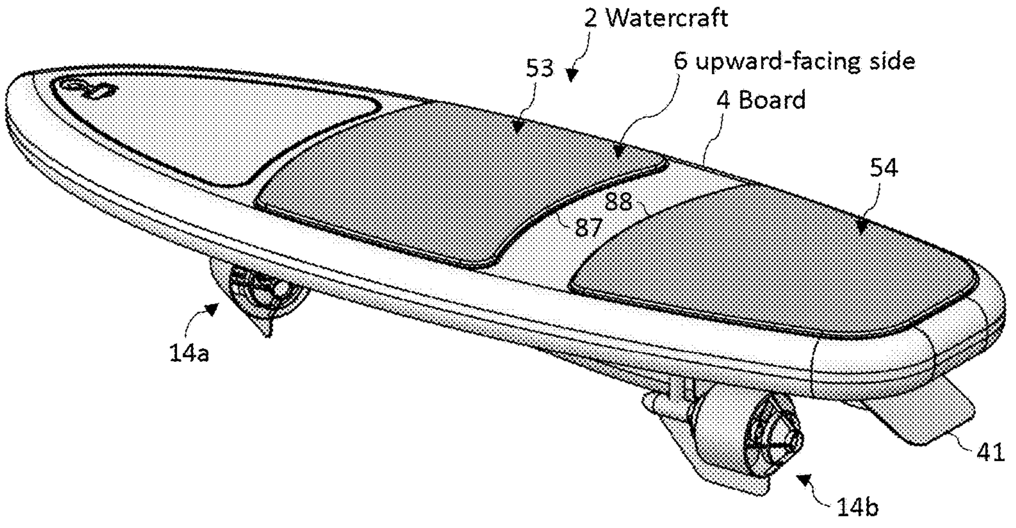

FIG. 2 illustrates a watercraft 2 that includes a board 4, which can have the shape of a surfboard (although various embodiments include many different board shapes and sizes). As used herein, "surfboard" shapes can include many different types of surfboard shapes, wakeboard shapes, stand-up-paddleboard shapes, and wakesurfing-board shapes.

The board 4 can be propelled by various motors (as described herein and/or incorporated by reference).

The board 4 can comprise a front portion having the nose 10 and a back portion having the tail 12. The front portion may comprise more than half of the board 4 (and is not necessarily limited to the front 50 percent of the board 4). In some embodiments, the front portion comprises less than 50 percent of the board 4.

As used herein, "surf" (and related terms such as surfing and surfboard) are used broadly and are not limited to activities in the ocean. As used herein, a person can "surf" with waves and without waves. As used herein, a person can "surf" on an ocean, on a lake, on a river, and on any suitable body of water. As used herein, surfing includes when a person rides a watercraft having a board-like shape (e.g., a surfboard, a wakeboard, a stand-up paddleboard, a wakesurfing board) on the surface of the water. For example, a wakeboarder is "surfing" although having to use a boat is less than ideal for many free-spirited individuals.

The upward-facing side 6 of the board 4 can comprise a first upward-facing surface 53 and a second upward-facing surface 54. A person can place one of his feet on the first upward-facing surface 53 and can place his other foot on the second upward-facing surface 54.

Figure 1:
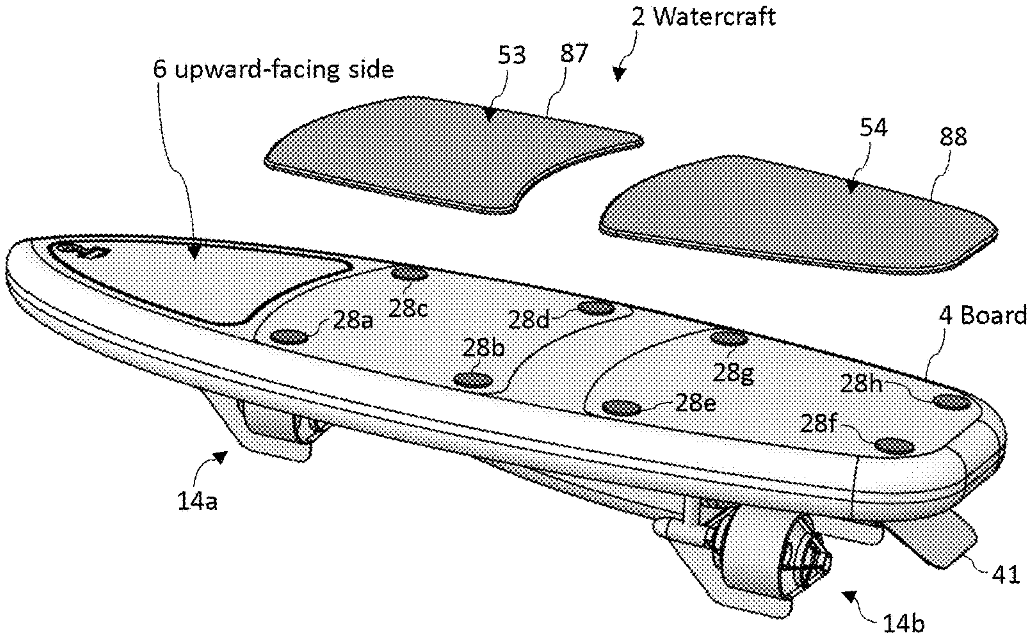
FIGS. 1 and 2 illustrate perspective views of a watercraft configured for surfing, according to some embodiments.

In FIG. 1, the first platform 87, the first upward-facing surface 53, the second platform 88, and the second upward-facing surface 54 are elevated to show force sensors 28*a*, 28*b*, 28*c*, 28*d*, 28*e*, 28*f*, 28*g*, 28*h*.

The watercraft 2 is configured such that force from a person's first foot standing on the first upward-facing surface 53 (and thus standing on the first platform 87) is detected by one or more force sensors 28*a*, 28*b*, 28*c*, 28*d*. The watercraft 2 is configured such that force from a person's second foot standing on the second upward-facing surface 54 (and thus standing on the second platform 88) is detected by one or more force sensors 28*e*, 28*f*, 28*g*, 28*h*. A computer system 33 (shown in FIG. 5) can analyze data from a first force sensor system (e.g., comprising force sensors 28*a*, 28*b*, 28*c*, 28*d*) and can analyze data from a second force sensor system (e.g., comprising force sensors 28*e*, 28*f*, 28*g*, 28*h*) to determine how force (caused by the person standing on the board 4) is distributed. Then, the computer system 33 can activate motors and fins to move the board 4 (e.g., to move the board 4 under an estimated center of mass 61 of the person riding the board 4).

Figure 6:
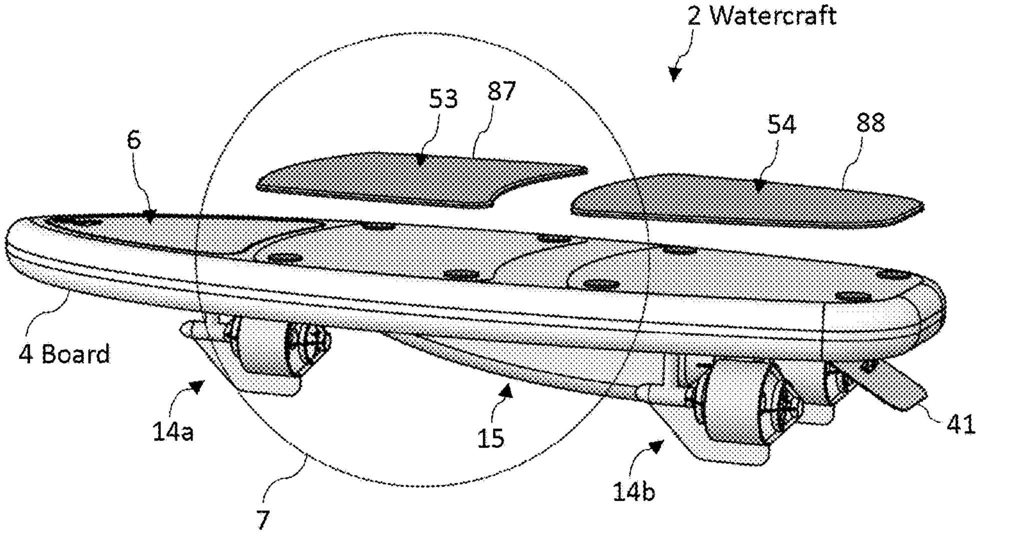
FIG. 6 illustrates a perspective view of the watercraft, according to some embodiments.
Figure 7:
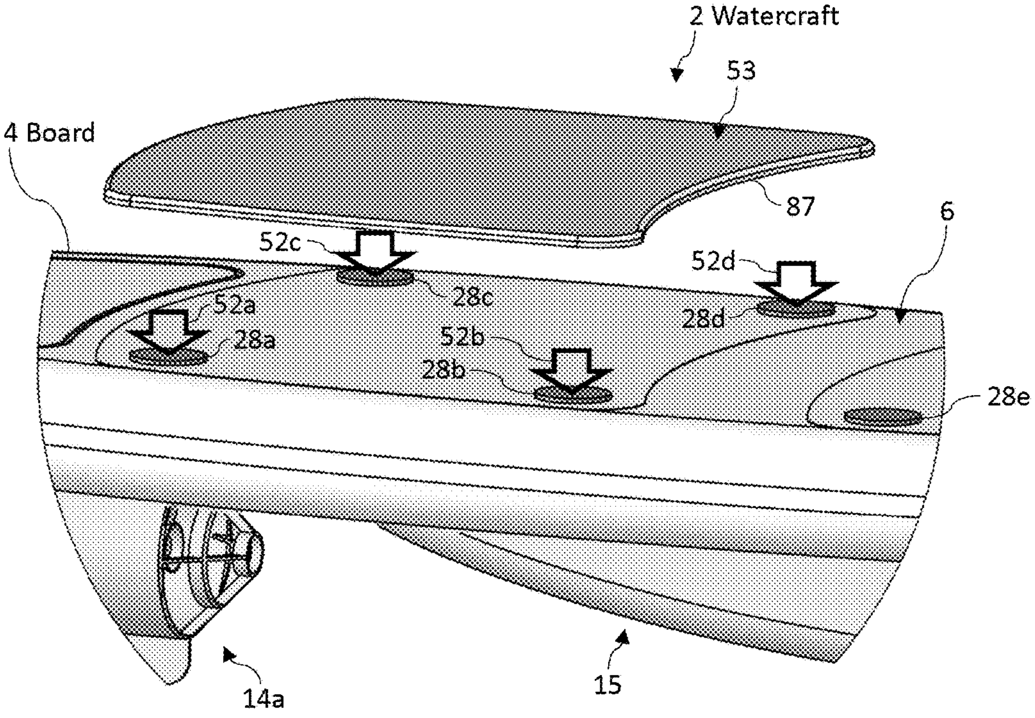
FIG. 7 illustrates a perspective view of the area indicated by Circle 7 in FIG. 6, according to some embodiments.
Figure 8:
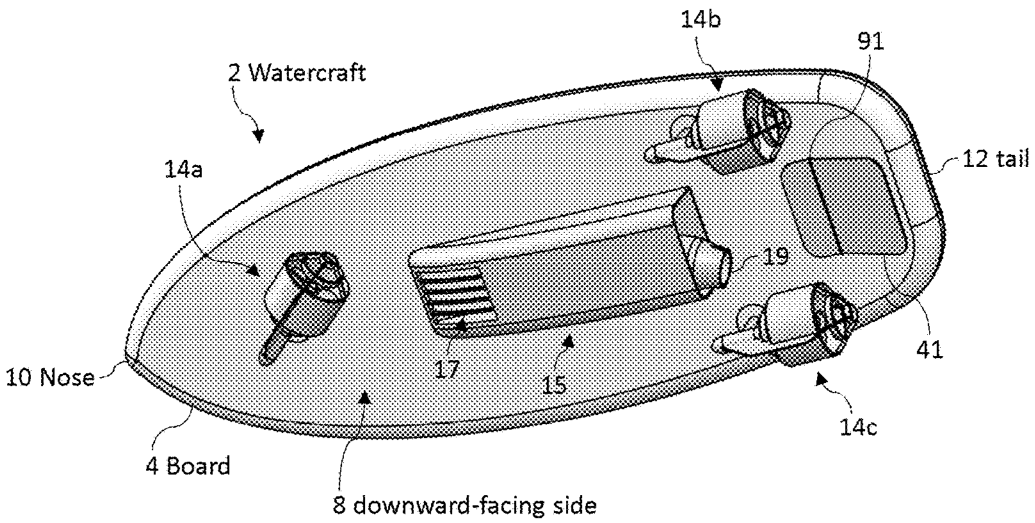
FIG. 8 illustrates a perspective view of a downward-facing side of the watercraft, according to some embodiments.
Figure 9:
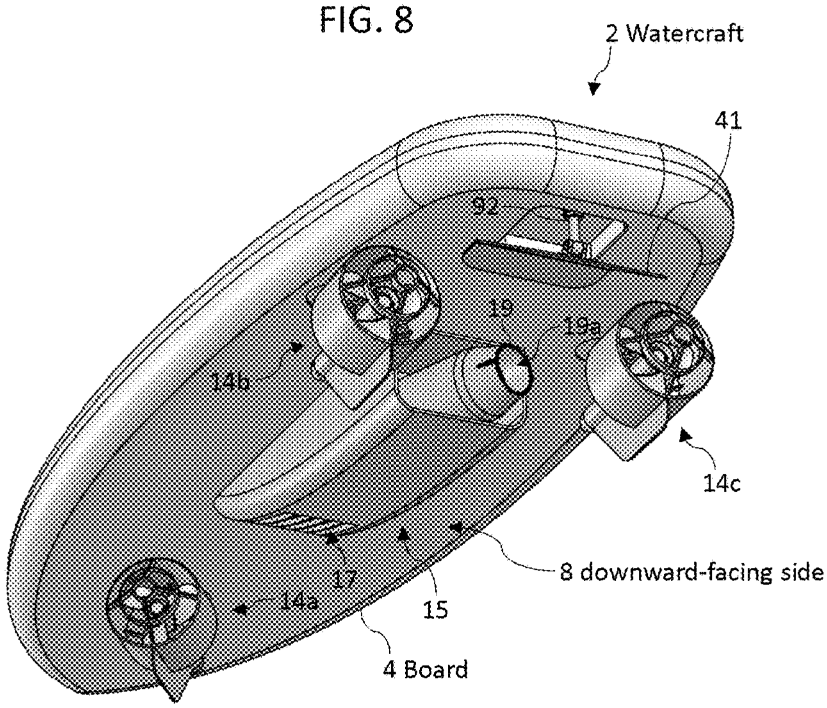
FIG. 9 illustrates a perspective view of a downward-facing side of the watercraft, according to some embodiments.
Figure 10:
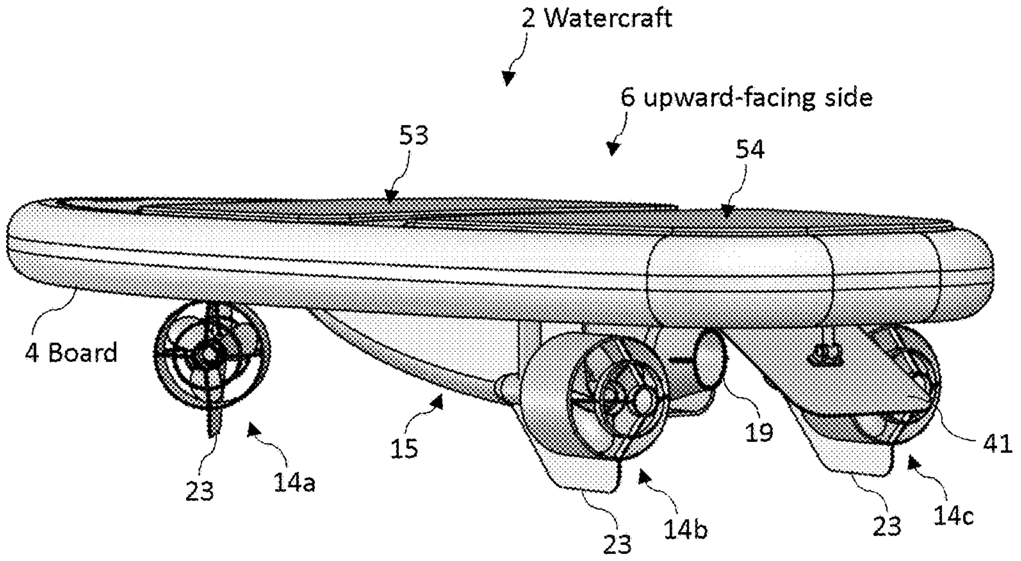
FIG. 10 illustrates a perspective view of a back and a side of the watercraft, according to some embodiments.

FIG. 7 illustrates a perspective view of the portion of FIG. 6 indicated by Circle 7. (The second upward-facing surface 54 and the second platform 88 are hidden in FIG. 7 to increase the clarity of the first upward-facing surface 53 and the first platform 87.) When a foot (of a person) stands on the first upward-facing surface 53, the foot exerts forces (indicated by arrows 52*a*, 52*b*, 52*c*, 52*d*) on force sensors 28*a*, 28*b*, 28*c*, 28*d*. If the foot is positioned near the left side of the board 4, the system will detect higher forces with sensors 28*a*, 28*b* than with sensors 28*c*, 28*d*. If the foot is positioned near the right side of the board 4, the system will detect higher forces with sensors 28*c*, 28*d* than with sensors 28*a*, 28*b*.

If the foot is positioned near the front of the first upward-facing surface 53, the system will detect higher forces with sensors 28*a*, 28*c* than with sensors 28*b*, 28*d*. If the foot is positioned near the back of the first upward-facing surface 53, the system will detect higher forces with sensors 28*b*, 28*d* than with sensors 28*a*, 28*c*. Thus, the system can determine where the weight of the person is distributed on the first upward-facing surface 53.

The system can work the same way with the second upward-facing surface 54 and with sensors 28*e*, 28*f*, 28*g*, 28*h*. Thus, the system can estimate where the weight of the person is distributed on the second upward-facing surface 54. As a result, the system can determine the estimated center of mass 61 of the person on the board 4 and then can respond according to the embodiments described herein to keep the person successfully on the board 4 (rather than the person falling off the board 4).

The first upward-facing surface 53 can have a soft outer surface (such as foam) to make riding the watercraft 2 more comfortable. An inner layer of the first upward-facing surface 53 can be rigid (e.g., a plastic material) to reliably transfer force from the foot of the person to the force sensors 28*a*, 28*b*, 28*c*, 28*d*. The force sensors 28*a*, 28*b*, 28*c*, 28*d* can protrude upward one millimeter to five millimeters. The rigid layer of the first upward-facing surface 53 can be screwed to the force sensors 28*a*, 28*b*, 28*c*, 28*d*. The outer foam layer can hide the screws.

In some embodiments, a binding (e.g., a wakeboarding binding, a windsurfing binding) is coupled to the first upward-facing surface 53. In some embodiments, a binding (e.g., a wakeboarding binding, a windsurfing binding) is coupled to the second upward-facing surface 54. Some embodiments use a tilt sensor 24 (illustrated in FIGS. 5 and 28) to determine if the board 4 is rotated to the left, to the right, forward (such that the nose 10 is lower than the tail 12), or backward (such that the tail 12 is lower than the nose 10). Then, the computer system 33 can activate motors and fins to move the board 4 (e.g., to move the board 4 under an estimated center of mass 61 of the person riding the board 4). FIGS. 30-38 include additional details about movement of the watercraft, according to some embodiments.

Embodiments described herein dramatically reduce the difficulty of motorized surfing.

The watercraft 2 can comprise a first force sensor system coupled to the front portion such that the first force sensor system is configured to detect a first foot stepping on the first upward-facing surface 53 in a first area of the front portion. The watercraft 2 can comprise a second force sensor system coupled to the back portion such that the second force sensor system is configured to detect a second foot stepping on the second upward-facing surface 54 in a second area of the back portion. The first force sensor system can comprise one or more force sensors. The second force sensor system can comprise one or more force sensors. A data analysis system 35 (of the watercraft 2) can analyze data from many force sensors of the first force sensor system and can analyze data from many force sensors of the second force sensor system.

In some embodiments, a watercraft 2 comprises a board 4 having an upward-facing side 6 configured to enable a person to stand while riding the watercraft 2. The board 4 comprises a downward-facing side 8, which is located on an opposite side relative to the upward-facing side 6. The downward-facing side 8 is configured to be oriented facing downward into the body of water on which the person rides the watercraft 2.

Figure 3:
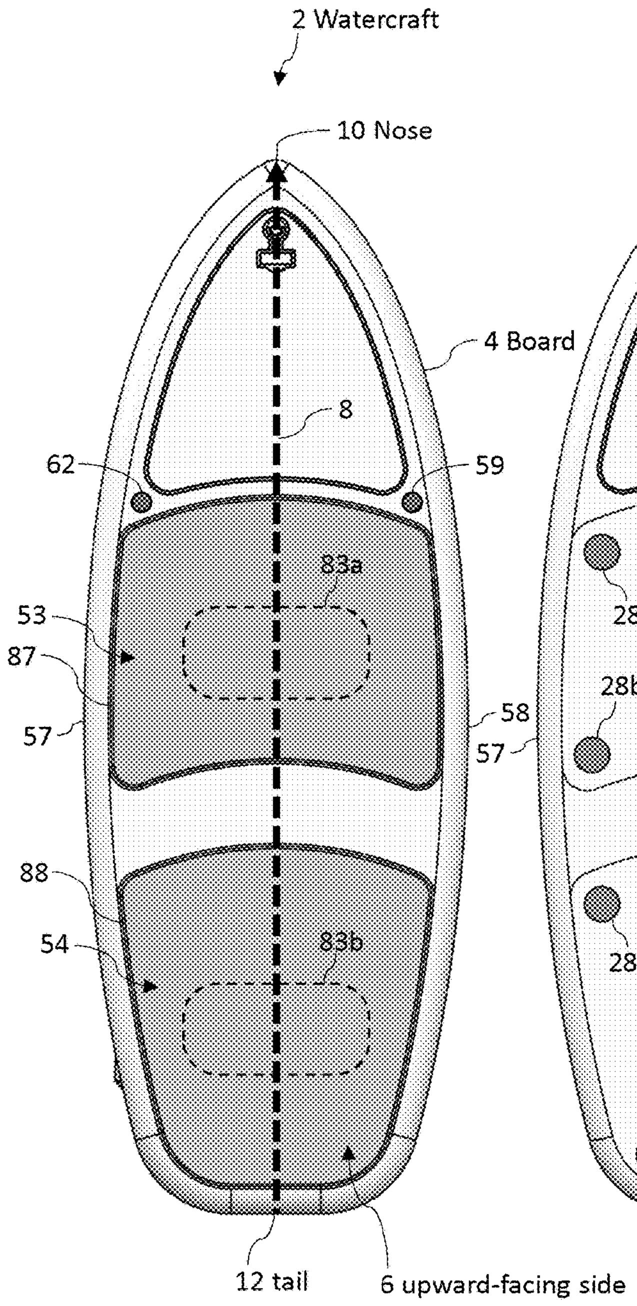
FIG. 3 illustrates a top view looking directly at an upward-facing side of the watercraft, according to some embodiments.

As shown in FIG. 3, the board 4 can comprise a central axis 8 from a tail 12 of the board 4 a nose 10 of the board 4. (The central axis 8 is also labeled in FIG. 28.) The nose 10 is the front of the board 4. The tail 12 is the back of the board 4. The central axis 8 starts at the tail 12 and ends at the nose 10. The watercraft 2 can comprise a motor coupled to the board 4 and configured to propel the board 4.

A watercraft 2 can have a motor configured to propel the watercraft 2 through the water (e.g., as the person surfs on the watercraft 2). Embodiments can include one or more of the motors described herein and/or incorporated by reference. Not all embodiments necessarily include all of the motors and steering features described herein.

Referring now primarily to FIGS. 11, 15, 28 and 29, a motor system 14*a* can comprise a propeller 16 and an electric motor 18 configured to rotate the propeller 16. The motor system 14*a* can comprise a rotatable shaft 20. A rotary actuator 21 (e.g., a servomotor) can couple the shaft 20 to the board 4. Program instructions 38 can cause the rotary actuator 21 to rotate the shaft 20 (and thereby rotate the propeller 16 and a fin 23). Rotating the shaft 20 and/or the fin 23 can direct water flow (e.g., as the board moves relative to water of a lake) to steer the watercraft 2. A protective cover 25 can shield people from the propeller 16.

Motor systems 14*b*, 14*c* can include any of the features described in the context of motor system 14*a*. Motor systems 14*a*, 14*b*, 14*c* can be rotated independently of each other to optimize the balancing of the person riding the watercraft 2 (e.g., to maintain a center of mass of the person over the board 4).

Referring now primarily to FIGS. 8-11, a motor system 15 can comprise a jet propulsion system having an impeller, a water intake 17, and a steerable nozzle 19 configured to move (e.g., left, right, upward, and/or downward) based on prompts from the computer system 33 (e.g., in response to program instructions 38) to steer the watercraft 2. The jet propulsion system information in the following patents is incorporated herein by reference: U.S. Pat. Nos. 9,376,189 and 8,905,800.

In some embodiments, a steering system comprises the motor system 15. The steerable nozzle 19 enables the computer system 33 to direct water flow to turn the watercraft 2.

Many different types of steering systems can be used to turn the watercraft 2. In some embodiments, the steering system comprises fins 23 coupled to rotatable shafts 20. Rotating the fins 23 enables the fins to direct water flow to turn the watercraft.

In some embodiments, the steering system comprises propellers 16, which can be coupled to rotatable shafts 20. Rotating the shafts 20 can cause the propellers 16 to provide thrust in any desired direction (to direct water flow to turn the watercraft 2).

Figure 21:
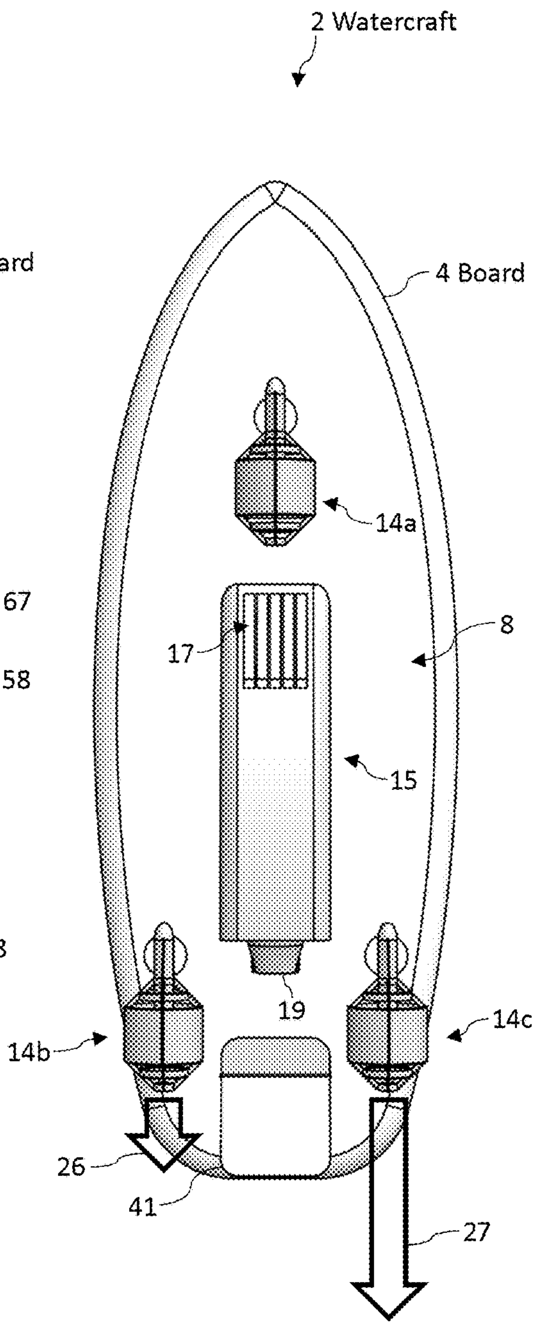
FIG. 21 illustrates a bottom view of the watercraft, according to some embodiments.
Figure 22:
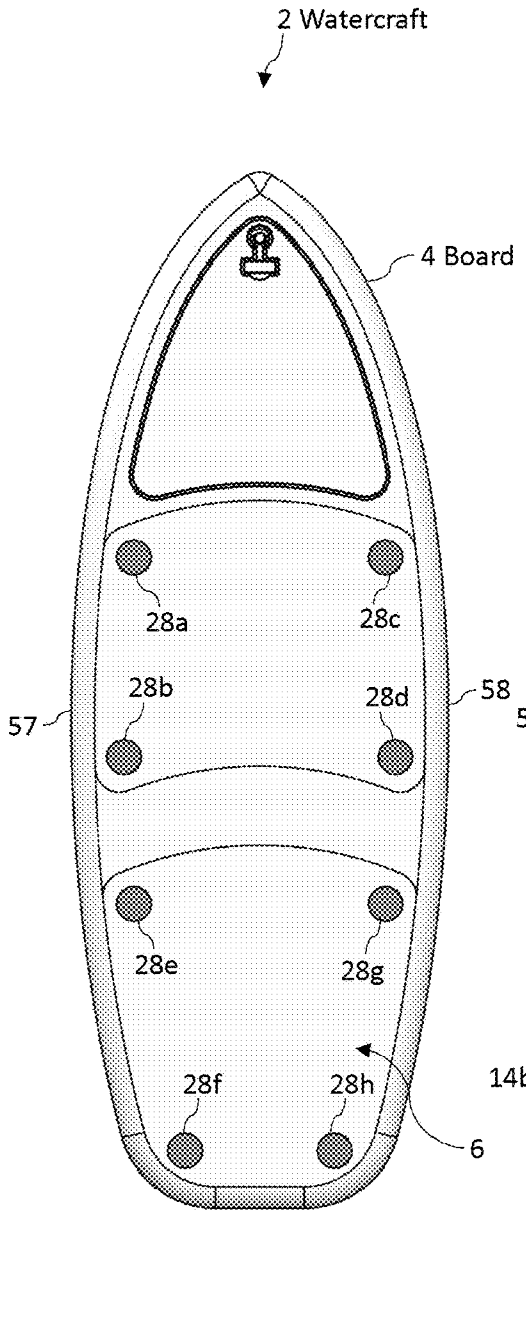
FIG. 22 illustrates a top view of the watercraft in which platforms are hidden, according to some embodiments.

Referring now to FIG. 21, a first motor system 14*b* can provide a first thrust (depicted by arrow 26). At the same time, a second motor system 14*c* can provide a second thrust (depicted by arrow 27) that is much larger than the first thrust. The imbalance in thrusts causes the watercraft 2 to turn. Thus, the first motor system 14*b* and the second motor system 14*c* can be parts of a steering system.

Figure 5:
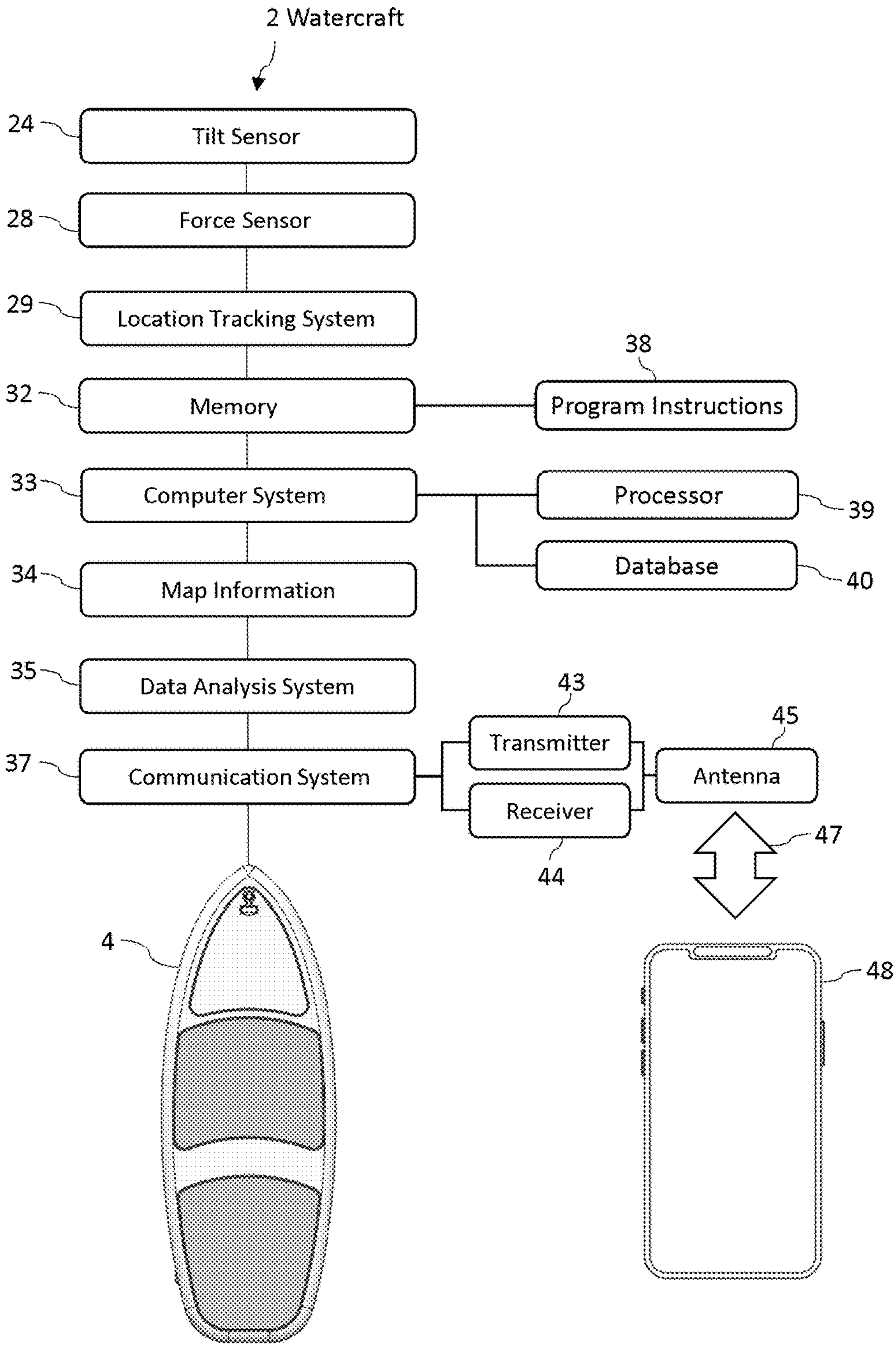
FIG. 5 illustrates a diagrammatic view of the watercraft, according to some embodiments.

Referring now to FIG. 5, a watercraft 2 can comprise a computer system 33 comprising at least one processor 39 and a memory 32 having program instructions 38 that can be executed by the at least one processor 39. The program instructions 38 can comprise software and/or firmware. The watercraft 2 can comprise a printed circuit board.

The watercraft 24 can comprise tilt sensors 24, 24*a* and force sensors 28 configured to enable the computer system 33 to receive tilt and force data. Program instructions 38 can then cause motor systems to take actions that help restore and/or maintain a center of mass 61 of the person (riding the board 4) over the board 4.

The watercraft 2 can comprise map information 34 (e.g., of a body of water). A location tracking system 29 can receive Global Positioning System ("GPS") data to enable the watercraft 2 to be aware of the position of the watercraft 2 on the body of water, and thereby can enable the watercraft 2 to avoid running into obstacles such as beaches, items submerged just below the surface of the water, and docks.

The watercraft 2 can comprise a database of rider preferences and settings. Riders can select between various modes (e.g., beginner mode, intermediate mode, advanced mode) by pressing buttons 62 (shown in FIG. 3) on the board 4 and/or via an "app" on a remote computing device 48. The beginner mode can be configured to accelerate slower and/or be less responsive to forward/backward weight shifts than the advanced mode. The beginner mode can be configured to be more responsive or less responsive to left/right weight shifts than the advanced mode. In some embodiments, the beginner mode is more aggressive in trying to maintain the center of mass 61 over the board 4 (e.g., as explained in the context of FIGS. 30, 31, 34, and 35) than the advanced mode.

Pressing a button 59 (shown in FIG. 3) can initiate a start mode. In some embodiments of the start mode, pressing the button 59 causes the watercraft 2 to accelerate regardless of whether more weight is on the first upward-facing surface 53 or on the second upward-facing surface 54. This gives the rider the ability to lay on the board 4 while the watercraft 2 accelerates.

In the start mode, if the weight on the first upward-facing surface 53 is below a first threshold (e.g., 10 pounds) and the weight on the second upward-facing surface 54 is below a second threshold (e.g., 10 pounds), the programming instructions can cause the watercraft 2 to decelerate to a stop (or at least to a speed below three miles per hour). In this way, the watercraft 2 can stop is the rider falls off (during the start mode).

If the total weight on the first upward-facing surface 53 and on the second upward-facing surface 54 is less than a predetermined threshold (e.g., 30 pounds), the programming instructions 38 can assume the rider has fallen off the board 4 and can cut power to motor system 14*a*, 14*b*, 14*c*; cause propellers 16 to rotate in a reverse direction until the board is traveling at less than a predetermined speed (e.g., less than five miles per hour, less than ten miles per hour); and/or can position fins 23, 41 in a position configured to slow the forward travel of the watercraft 2.

The programming instructions can be configured to exit the start mode in response to the watercraft 2 reaching a predetermined speed (e.g., at least ten miles per hour) and/or in response to a first weight on the second upward-facing surface 54 being within 20 percent of a second weight on the first upward-facing surface 53.

The watercraft 2 can comprise a communication system 37 having a transmitter 43, a receiver 44, and/or an antenna 45. The remote computing device 48 can be communicatively coupled with the watercraft 2 via the antenna 45 (e.g., via wireless communications 47). In some embodiments, intermediary communication systems communicatively couple the remote computing device 48 and the watercraft 2.

Intermediary communication systems can comprise wireless networks, Wi-Fi routers, radio-communication systems, Bluetooth systems, cellular networks, telephone networks, Internet systems, servers, cloud computing, remotely located computers, satellite systems, communication systems, and any other suitable means of enabling communication between the various components of embodiments described herein and/or incorporated by reference.

A remote computing device can be a smartphone, a tablet computer, a laptop computer, a desktop computer, a wrist computer such as an Apple Watch or Fitbit, a server, augmented reality glasses, an implanted computer, and/or any type of computer.

In some embodiments, the remote computing device 48 is a hand-held device communicatively coupled with the watercraft 2 (e.g., via radio communication such as Bluetooth). The remote computing device 48 can comprise a throttle control (e.g., a trigger configured to enable the rider to control a speed of the watercraft 2) and/or can comprise a "kill switch" configured to cut power and/or cut thrust (in response to the rider pressing the "kill switch").

In some embodiments, the watercraft's motor is turned off (or at least a rotational speed of a propeller or impeller is reduced by at least 80 percent) in response to the remote computing device 48 being too far away from the watercraft 2 and/or in response to the remote computing device 48 not being communicatively coupled to the watercraft 2.

When a person places his center of mass on the left side of the board 4, the board can rotate counter-clockwise direction relative to the central axis 8 (i.e., counter-clockwise when looking directly at the tail 12). There is a chance the person will move his center of mass before he falls off the board 4. The system, however, can compensate for the person's error by moving leftward in an effort to bring the person's center of mass back toward the center of the board 4. Then, the system can resume moving straight ahead (e.g., once the compensating leftward move is complete).

Figure 28:
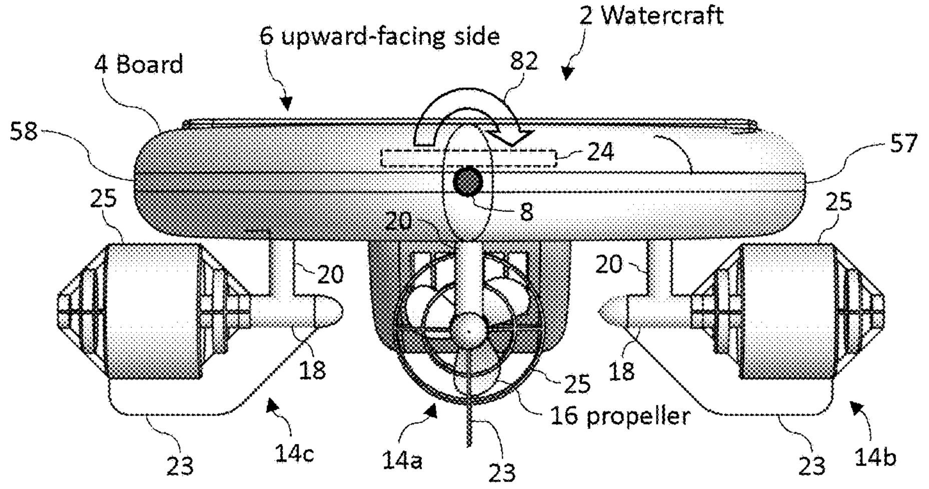
FIG. 28 illustrates a front view of the watercraft, according to some embodiments.

FIG. 28 illustrates a counter-clockwise direction 82 relative to the central axis 8 from a tail 12 of the board 4 to a nose 10 of the board 4 (shown in FIG. 3). The counter-clockwise direction 82 appears to be clockwise in FIG. 28 because FIG. 28 illustrates a view looking directly at the nose 10 of the board 4. However, relative to the central axis 8 (from a tail 12 of the board 4 to a nose 10 of the board 4) direction 82 is counter-clockwise.

A first tilt sensor 24 can detect clockwise rotations of the board 4 and can detect counter-clockwise rotations of the board 4. In some embodiments, a watercraft 2 comprises a first tilt sensor 24 configured to detect a first rotation of at least a first portion of the board 4 in a counter-clockwise direction relative to the central axis 8 (i.e., counter-clockwise when looking directly at the tail 12). The watercraft 2 can comprise a steering system configured to turn the watercraft 2 by directing water flow.

The watercraft 2 can comprise a computer system 33 comprising at least one processor 39 and a memory 32 having program instructions 38 that when executed by the at least one processor 39 are configured to cause the steering system to direct the water flow to turn the watercraft 2 leftward (or rightward) in response to the first tilt sensor 24 detecting the first rotation.

In some embodiments, a remote computing device 48 is communicatively coupled (e.g., wirelessly) with the computer system 33. Software (e.g., application software running on the remote computing device 48) can be used to select settings that are sent from the remote computing device 48 to the computer system 33 of the watercraft 2.

Figure 11:
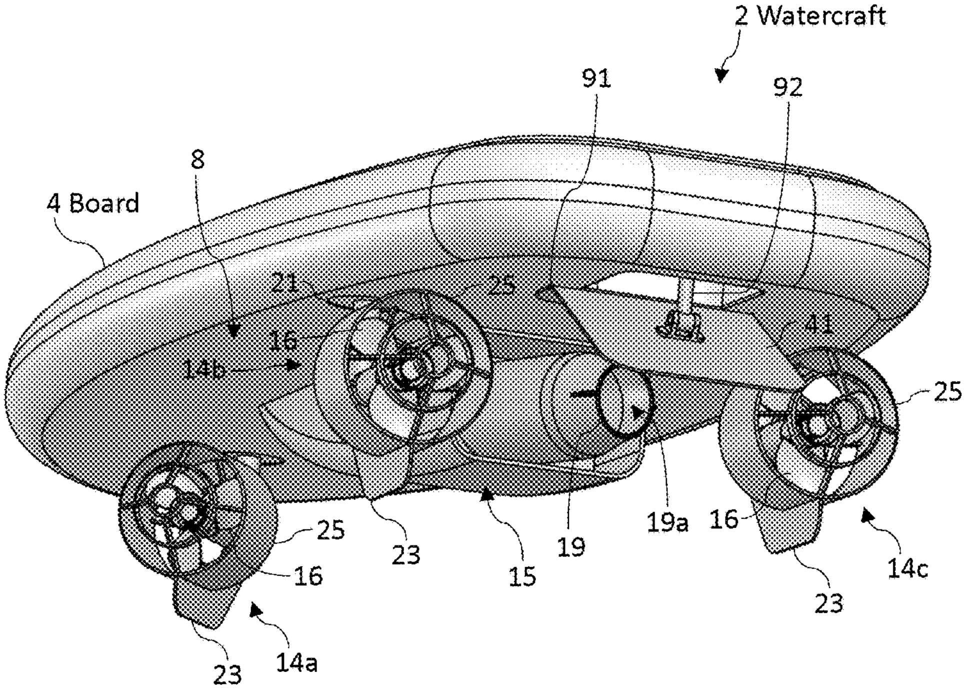
FIG. 11 illustrates a perspective view of a back, a side, and a bottom of the watercraft, according to some embodiments.

The computer system 33 can use many different portions of the watercraft 2 to steer the watercraft. Referring now to FIG. 11, the computer system 33 can use a motor system 14*a* and/or a fin 23 coupled to a front half of the board 4 to steer the watercraft 2. Steering with a portion on the front half of the watercraft 2 can quickly compensate for movements of the person riding the board 4.

In some embodiments, the board 4 comprises a front half having the nose 10. The steering system can comprise a portion (e.g., a fin, a jet, a propeller, a surface configured to redirect water flowing under the board 4) configured to direct the water flow. The portion of the steering system can be coupled to the front half of the board 4. The portion of the steering system can be configured to direct the water flow (e.g., leftward or rightward) in response to the first tilt sensor 24 detecting the first rotation.

In some embodiments, the computer system 33 uses portions that are coupled to the back portion of the watercraft 2 to steer the watercraft 2 (and thereby compensate for movements of the person riding the watercraft 2). Referring now to FIG. 11, the computer system 33 can use motor systems 14*b*, 14*c*, 15, nozzles 19, and/or fins 23 coupled to a back half of the board 4 to steer the watercraft 2. Steering with a portion on the back half of the watercraft 2 feels very different than steering with a portion on the front half of the watercraft 2.

In some embodiments, the board 4 comprises a back half having the tail 12. The steering system can comprise a portion configured to direct the water flow. The portion of the steering system can be coupled to the back half of the board 4. The portion of the steering system can be configured to direct the water flow leftward (or rightward) in response to the first tilt sensor 24 detecting the first rotation.

As used herein, the left side 57 of the board 2 and the right side 58 of the board 4 are defined by looking downward onto the upward-facing side 6 (labeled in FIG. 2) of the board 4 while standing at the tail 12 of the board 4 and looking toward the nose 10. FIG. 3 illustrates this perspective and shows the left side 57 and the right side 58. Leftward is toward the left side 57 and rightward is toward the right side 58.

Water can be directed leftward without traveling directly toward the left side 57. In other words, the water can be directed leftward without being directed in a direction that is perpendicular to the central axis 8.

Water can be directed rightward without traveling directly toward the right side 58. In other words, the water can be directed rightward without being directed in a direction that is perpendicular to the central axis 8.

In some embodiments, the first tilt sensor 24 (e.g., a gyroscope, an accelerometer, another tilt sensor) is configured to detect a second rotation of the board 4 in a clockwise direction relative to the central axis 8 (i.e., clockwise when looking directly at the tail 12). The program instructions 38 are configured to cause the steering system to direct the water flow to turn the watercraft 2 rightward (or leftward) in response to the first tilt sensor 24 detecting the second rotation.

In some embodiments, a second tilt sensor (e.g., a gyroscope, accelerometer, another tilt sensor) is configured to detect a second rotation of the board 4 in a clockwise direction relative to the central axis 8 (i.e., clockwise when looking directly at the tail 12). The program instructions 38 can be configured to cause the steering system to direct the water flow to turn the watercraft 2 rightward (or leftward) in response to the second tilt sensor detecting the second rotation.

In some embodiments, the first tilt sensor 24 and/or the second tilt sensor 24*a* comprises at least one of a gyroscope, an accelerometer, an inclinometer (which can be any type of inclinometer including a digital inclinometer and/or an inclinometer using microelectromechanical systems), a clinometer, a liquid capacitive sensor, an electrolytic sensor, and a pendulum sensor.

The first tilt sensor 24 and/or the second tilt sensor 24*a* can comprise at least one of a gyroscope, an accelerometer, an inclinometer, a clinometer, a liquid capacitive sensor, an electrolytic sensor, and a pendulum sensor.

The first tilt sensor 24 can comprise a gyroscope and an accelerometer. The second tilt sensor 24*a* can comprise a gyroscope and an accelerometer.

Some tilt sensors 24, 24*a* detect tilt in one axis, two axes, and/or three axes. Tilt sensors 24 can be calibrated by placing the watercraft 2 in a level orientation (e.g., as indicated by bubble levels). A bubble level can be placed on the upward-facing side 6 of the board 4, on the first upward-facing surface 53 and/or on the second upward-facing surface 54. Once the board 4 is level, the tilt sensor 24 can be calibrated to zero rotation. Then, when the board is rotated left, right, forward (i.e., with the nose 10 lower than the tail 12), or backward (i.e., with the tail 12 lower than the nose 10), the title sensor can detect the rotation. In some embodiments, the greater the rotation, the greater the signal from the tilt sensor 24, and the greater the magnitude of the response from the motors 14*a*, 14*b*, 14*c*, 15 and/or fins 23, 41.

Fin 41 can be a hydraulically actuated trim tab configured to direct water flow downward to move the nose 10 downward (e.g., to decrease an angle of an axis 8 relative to a horizontal plane). As shown by arrow 42 in FIG. 13, the fin 41 can rotate away from a bottom surface of the board 4 to direct water flow downward. A pivot can couple the fin 41 to the board 4.

As the rotation increases, the system can increase the magnitude of the response from the motors 14*a*, 14*b*, 14*c*, 15 and/or fins 23, 41. For example, the computer system 33 can increase an angle of a fin 23 relative to the central axis 8. The computer system 33 can increase an angle of a fin 41 relative to the upward-facing surface 6. The computer system 33 can increase an angle of a motor 14*a*, 14*b*, 14*c*, 15 and/or of a steerable nozzle 19 relative to the central axis 8. The computer system 33 can increase an angle of a steerable nozzle 19 relative to the upward-facing surface 6.

As the rotation decreases, the system can reduce the magnitude of the response from the motors 14*a*, 14*b*, 14*c*, 15 and/or fins 23, 41. For example, the computer system 33 can decrease an angle of a fin 23 relative to the central axis 8. The computer system 33 can decrease an angle of a fin 41 relative to the upward-facing surface 6. The computer system 33 can decrease an angle of a motor 14*a*, 14*b*, 14*c*, 15 and/or of a steerable nozzle 19 relative to the central axis 8. The computer system 33 can decrease an angle of a steerable nozzle 19 relative to the upward-facing surface 6.

Figure 12:
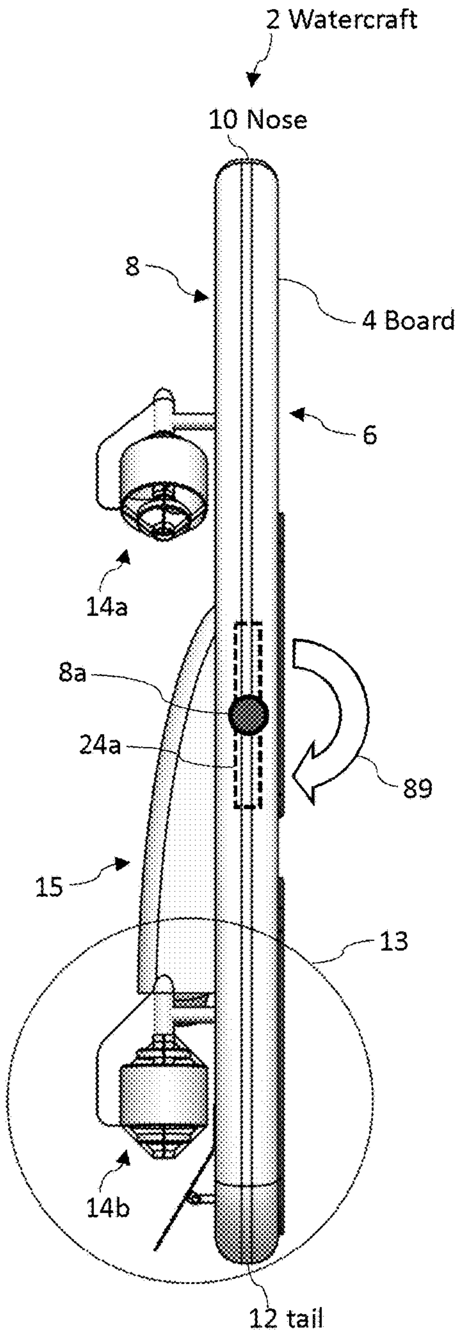
FIG. 12 illustrates a side view of the watercraft, according to some embodiments.
Figure 16:
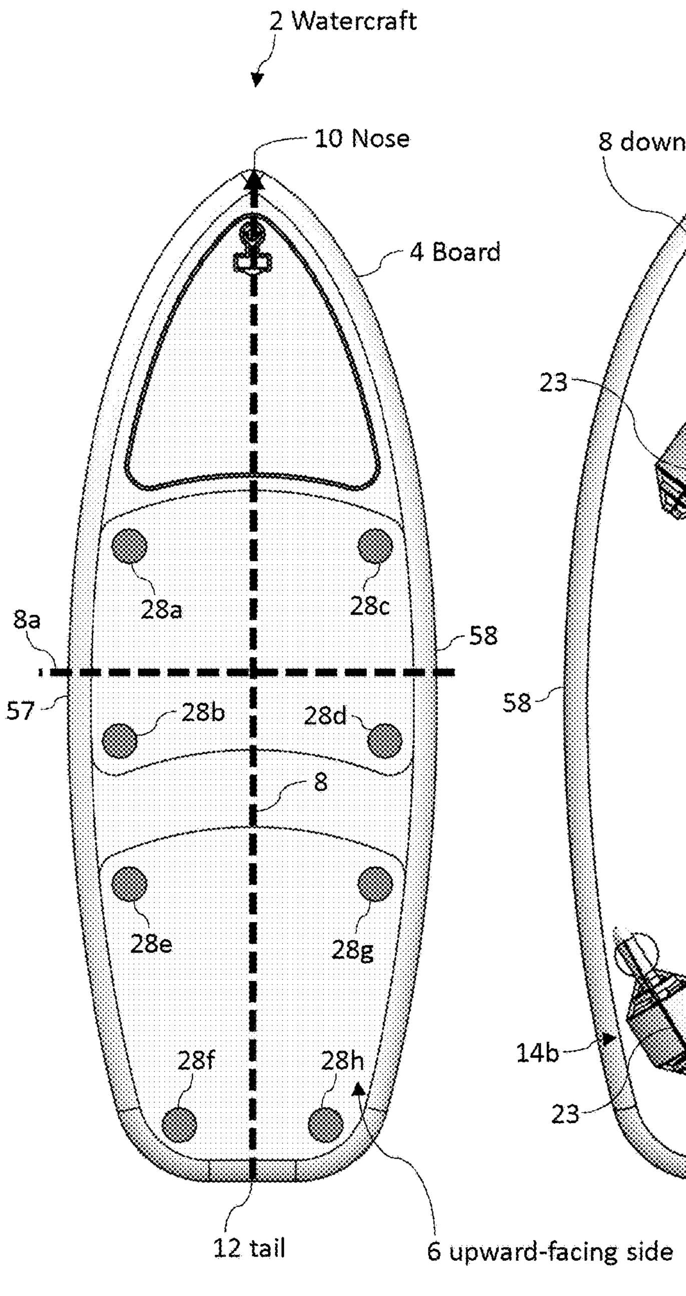
FIG. 16 illustrates a top view of the watercraft in which platforms are hidden, according to some embodiments.

FIG. 16 illustrates an axis 8*a* between a front portion of the board 4 and a back portion of the board. The front portion of the board 4 includes the nose 10. The back portion of the board 4 includes the tail 12. In FIG. 12, the axis 8*a* is oriented directly into the page. The watercraft 2 can comprise another tilt sensor 24*a* configured to detect rotations about the axis 8*a*. Arrow 89 indicates a rotational direction about the axis 8*a* that would cause the nose 10 of the board 4 to be to be higher than the tail 12 of the board 4 (when a rider is surfing on the board 4 on a lake, on a river, on an ocean etc.).

Fin 41 can be a hydraulically actuated trim tab configured to direct water flow downward to move the nose 10 downward (e.g., to decrease an angle of a central axis 8 relative to a horizontal plane). As shown by arrow 42 in FIG. 13, the fin 41 can rotate away from a bottom surface of the board 4 to direct water flow downward. A pivot 91 can couple the fin 41 to the board 4. A hydraulic actuator 92 can push the fin 41 downward (away from the downward-facing side 8). A hydraulic actuator 92 can pull the fin 41 upward (toward the downward-facing side 8).

Figure 13:
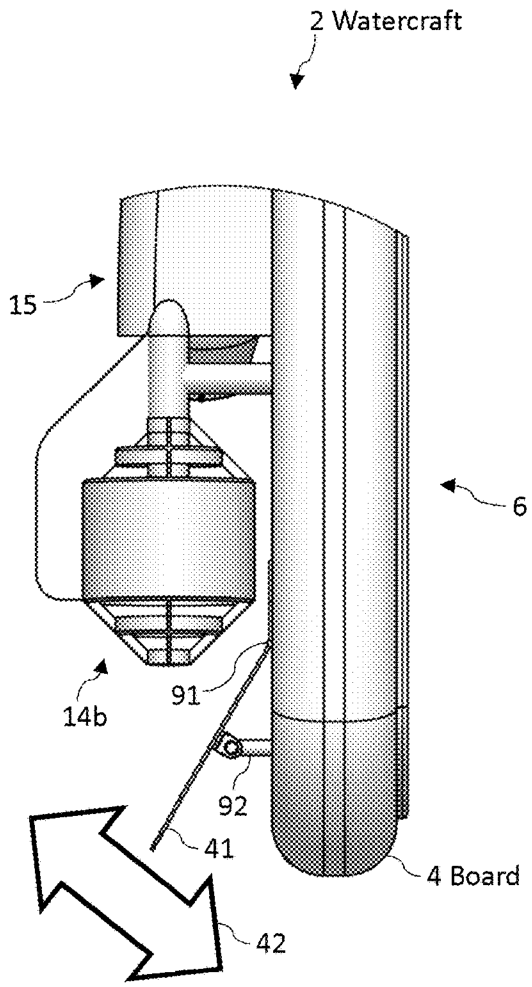
FIG. 13 illustrates a side view of the area indicated by Circle 13 in FIG. 12, according to some embodiments.
Figure 14:
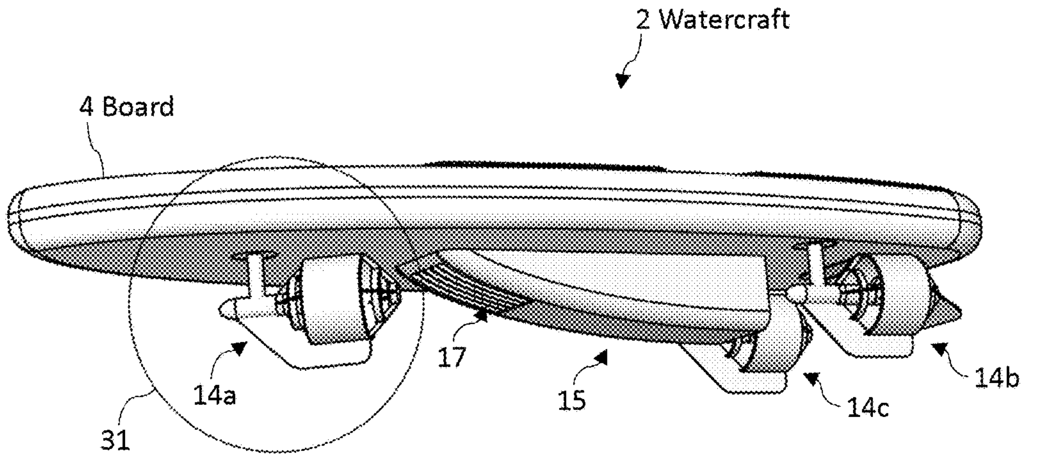
FIG. 14 illustrates a perspective view of a front, a side, and a bottom of the watercraft, according to some embodiments.
Figure 15:
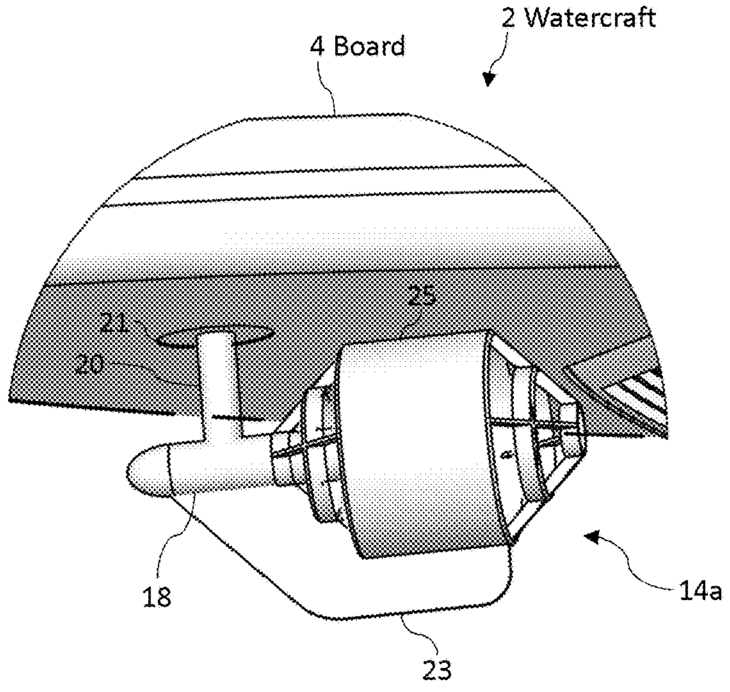
FIG. 15 illustrates a perspective view of the area indicated by Circle 31 in FIG. 14, according to some embodiments.

The watercraft 2 can comprise a tilt sensor 24*a* configured to detect a first rotation of the board 4 about an axis 8*a* between a front portion of the board 4 and a back portion of the board 4. The watercraft 2 can comprise a trim tab (e.g., fin 41) coupled to a back half of the board 4. The back half comprises the tail 12. The trim tab (e.g., fin 41) is configured to pivot to direct water flow downward. As illustrated in FIG. 13, the fin 41 can be hydraulically actuated.

A computer system 33 can comprise at least one processor 39 and a memory 32 having program instructions 38 that when executed by the at least one processor 39 are configured to cause the trim tab (e.g., fin 41) to direct the water flow downward (away from the downward-facing side 8) in response to the tilt sensor 24*a* detecting a condition indicative of the nose 10 being raised at least five degrees from a horizontal plane.

The tilt sensor 24*a* (shown in FIG. 12) can be calibrated by placing a bubble level on the board 4 (e.g., on a top surface of the board 4 with the bubble level oriented from the nose 10 to the tail 12), moving the board 4 until the bubble level indicates that the board 4 is level relative to a horizontal plane, and then setting the tilt sensor 24*a* to a zero degree angle.

The tilt sensor 24 (shown in FIG. 28) can be calibrated by placing a bubble level on the board 4 (e.g., on a top surface of the board 4 with the bubble level oriented from the left side 57 of the board 4 to the right side 58 of the board 4), moving the board 4 until the bubble level indicates that the board 4 is level relative to a horizontal plane, and then setting the tilt sensor 24 to a zero degree angle.

A tilt sensor 24 can create an artificial horizon and measure angular tilt with respect to the artificial horizon. Axes of the tilt sensor 24 can be orthogonal. A tilt sensor can be implemented via accelerometers, liquid capacitive systems, electrolytic systems, using a gas bubble in liquid, and using a pendulum. A tilt sensor can be built with microelectromechanical systems ("MEMS") to provides simultaneous two-dimensional angle readings of a surface plane tangent to an earth datum.

In some embodiments, as a tilt sensor (such as an inclinometer) measures the angle of the board 4 with respect to the force of gravity, external accelerations (such as the shocks and vibrations caused by the board 4 hitting a rough, wavy surface of a lake) can introduce errors in the tilt measurements. A gyroscope can be used in addition to an accelerometer to overcome this problem. The above mentioned external accelerations can easily affect the accelerometer, but typically have a limited effect on the measured rotation rates of a gyroscope. An algorithm can use both a signal from the gyroscope and a signal from the accelerometer to get the best value out of each sensor. In this manner, the computer system 33 can separate the actual tilt angle from errors introduced by external accelerations.

In some embodiments, the steering system comprises at least one of a movable propeller 16 configured to direct the water flow, a movable impeller (of a motor 15) configured to direct the water flow, a movable nozzle 19 configured to direct the water flow, and a movable fin 23 configured to direct the water flow. In some embodiments, the fin 23 acts as a rudder.

In some embodiments, the steering system comprises a channel 19*a* (e.g., of the nozzle 19) configured to direct the water flow in a first direction. The first direction can be offset from the central axis 8 of the board 4. The offset can be configured such that directing the water flow in the first direction causes the board 4 to turn. (A channel 19*a* is labeled in FIGS. 9 and 11.)

In some embodiments, the steering system comprises a channel 19*a* configured to direct the water flow in a first direction. The first direction can be oriented at a first angle relative to the central axis 8 of the board 4. The first angle can be greater than ten degrees, less than 80 degrees, and/or less than 110 degrees. The first angle can be configured such that directing the water flow in the first direction causes the board 4 to turn.

Figure 17:
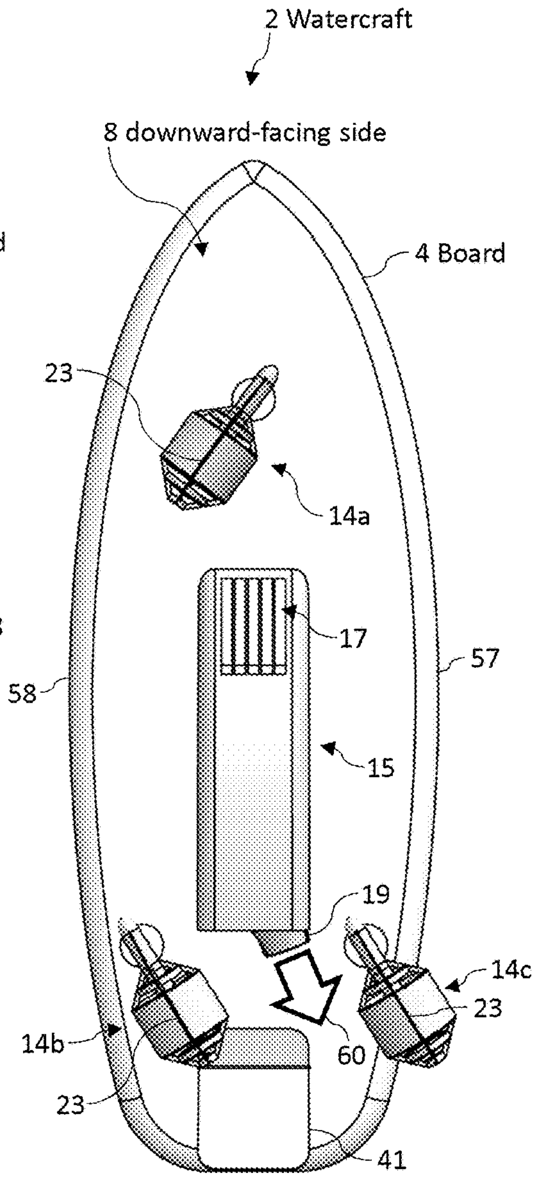
FIG. 17 illustrates a bottom view of the watercraft, according to some embodiments.

Arrow 60 in FIG. 17 indicates a direction in which the channel 19*a* (labeled in FIG. 9) of the nozzle 19 directs the water flow. The direction indicated by the arrow 60 is oriented at an angle relative to the central axis 8 (labeled in FIG. 16).

In some embodiments, the board 4 is a surfboard. The board 4 can comprise at least one of a surfboard shape, a wakeboard shape, a stand-up-paddleboard shape, a kiteboarding board shape, a snowboard shape, and a windsurfing board shape.

In some embodiments, the board 4 is buoyant (in fresh water) and at least a majority of the upward-facing side 6 is approximately flat. As used herein, "approximately flat" means that the surface (not including rounded edges that couple the surface to other surfaces) fits within two parallel planes spaced three inches apart.

The upward-facing side 6 can comprise foot bindings figured to help secure feet of the rider to the board 4. Foot bindings can include wakeboard bindings, kiteboarding bindings, and/or wind-surfing bindings. The entire contents of U.S. Pat. No. 6,095,881 are incorporated by reference herein. U.S. Pat. No. 6,095,881 describes one of many types of foot bindings that can be used with the embodiments described herein.

The board 4 comprises a front portion and a back portion. A first force sensor system can be configured to detect a first foot stepping on a first upward-facing surface 53 of the front portion. For example, the first foot can stand on a first area 83*a* (shown in FIG. 3). A second force sensor system can be configured to detect a second foot stepping on a second upward-facing surface 54 of the back portion. For example, the second foot can stand on a second area 83*b* (shown in FIG. 3).

A first foot binding (e.g., a foot binding described in U.S. Pat. No. 6,095,881) can be coupled to the first area 83*a*. A second foot binding (e.g., a foot binding described in U.S. Pat. No. 6,095,881) can be coupled to the second area 83*b*.

In some embodiments, a first footbed of a first binding comprises a first upward-facing surface 53 and a second footbed of a second binding comprises a second upward-facing surface 54.

In some embodiments, a first upward-facing surface 53 is not related to a binding and a second upward-facing surface 54 is not related to a binding (e.g., because the watercraft 2 does not include bindings).

In some embodiments, the board 4 is buoyant and at least a majority of the upward-facing side 6 is approximately flat to enable feet of the person to stand on the upward-facing side 6. The upward-facing side 6 can comprise a texture configured to provide grip to the feet of the person surfing on the board 4. The texture can be an abrasive texture (like textures used on surfboards to provide foot grip). The texture can include bumps and ridges configured to provide foot grip.

In some embodiments, the watercraft 2 comprises an enclosed shape configured to float in response to being submerged. The watercraft 2 can be configured to enable the person to surf on the watercraft 2. The watercraft 2 can comprise a length from the nose 10 to the tail 12, a width from a left side of the watercraft 2 to a ride side of the watercraft 2, and a thickness. The length can be less than eleven feet, less than eight feet, greater than 4 feet, and/or greater than three feet. The width can be less than four feet, less than three feet, greater than 12 inches, and/or greater than 18 inches. The thickness can be less than eleven inches, less than 8 inches, greater than 0.1 inches, and/or greater than 0.4 inches.

In some embodiments, force detected by the computer system 33 causes the watercraft 2 to accelerate, decelerate, turn, move leftward, and/or move rightward.

FIG. 7 illustrates a perspective view of the portion of FIG. 6 indicated by Circle 7. When a foot (of a person) stands on the first upward-facing surface 53, the foot exerts forces (indicated by arrows 52*a*, 52*b*, 52*c*, 52*d*) on force sensors 28*a*, 28*b*, 28*c*, 28*d*. If the foot is positioned near the left side of the board 4, the system will detect higher forces with sensors 28*a*, 28*b* than with sensors 28*c*, 28*d*. If the foot is positioned near the right side of the board 4, the system will detect higher forces with sensors 28*c*, 28*d* than with sensors 28*a*, 28*b*.

In some embodiments, a watercraft 2 comprises a board 4 having an upward-facing side 6 configured to enable a person to stand while riding the watercraft 2. The board 4 can comprise a central axis 8 from a nose 10 of the board 4 to a tail 12 of the board 4. The watercraft 2 can comprise a motor coupled to the board 4 and configured to propel the board 4.

In some embodiments, the board 4 comprises a front portion having the nose 10 and a back portion having the tail 12. The upward-facing side 6 of the board 4 can comprise a first upward-facing surface 53 and a second upward-facing surface 54. The watercraft 2 can comprise a first force sensor system coupled to the front portion such that the first force sensor system is configured to detect a first foot stepping on the first upward-facing surface 53 in a first area of the front portion. The watercraft 2 can comprise a second force sensor system coupled to the back portion such that the second force sensor system is configured to detect a second foot stepping on the second upward-facing surface 54 in a second area of the back portion. The first force sensor system can comprise one or more force sensors. The second force sensor system can comprise one or more force sensors. A data analysis system 35 (of the watercraft 2) can analyze data from many force sensors of the first force sensor system and can analyze data from many force sensors of the second force sensor system.

In some embodiments, the watercraft 2 is configured to enable the person to surf (e.g., on an ocean, on a river, on a lake with or without waves) on the watercraft 2.

Figure 36:
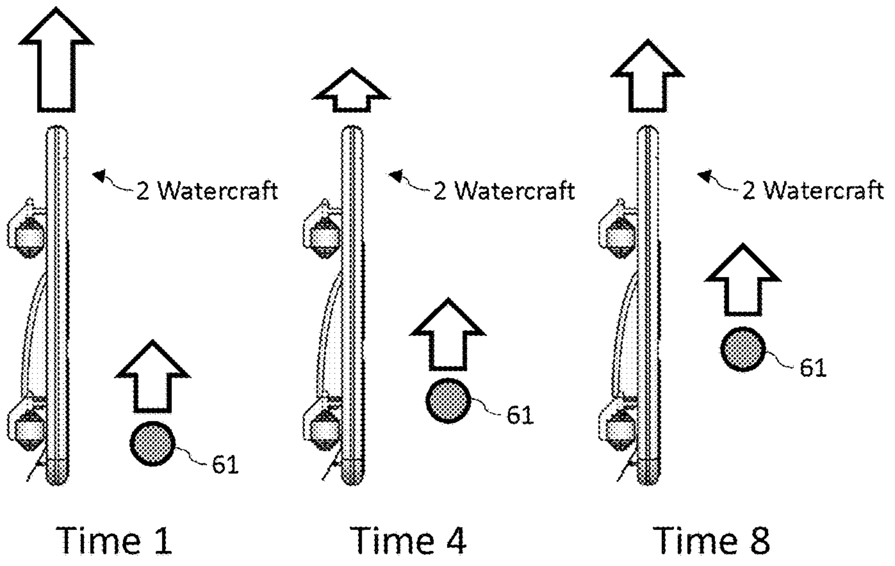

Referring now to FIG. 36, a person rider the watercraft 2 can begin to fall backwards (as indicated by a center of mass ("COM") 61 of the person at Time 1). Because the COM 61 is falling backward relative to the watercraft 2, the watercraft 2 is moving forward faster than the COM 61 is moving forward. (FIG. 38 explains details about one example to help the reader understand one of many ways in which the watercraft 2 can help balance the rider on the board 4.)

Referring primarily to FIGS. 36, 1, and 2, at Time 1 the watercraft 2 can detect that the COM 61 is more over the second upward-facing surface 54 than over the first upward-facing surface 53 due to a second force sensor system (e.g., comprising force sensors 28*e*, 28*f*, 28*g*, 28*h*) detecting an overall greater force (e.g., resulting from the sum of forces measured by force sensors 28*e*, 28*f*, 28*g*, 28*h*) than detected by a first force sensor system (e.g., comprising force sensors 28*a*, 28*b*, 28*c*, 28*d*).

In some embodiments, a tilt sensor 24 detects the board being rotated backward (e.g., such that the tail 12 is lower than the nose 10) and the computer system 33 uses this data to determine that at Time 1 the COM 61 is too far toward the tail 12.

Then, the watercraft 2 can decelerate to allow the COM 61 to "catch up" with the watercraft 2 (e.g., such that the COM 61 is more centered over the first upward-facing surface 53 and the second upward-facing surface 54 and/or such that the board is no longer tilted so much in a manner where the tail is 12 lower than the nose 10). At Time 4, the watercraft 2 has decelerated and the COM 61 is moving toward being centered over the board 4. At Time 7, the COM 61 is centered on the board 4. At Time 8, the COM 61 and the watercraft 2 are moving at the same velocity (e.g., the person is no longer falling off the board 4).

Figure 37:
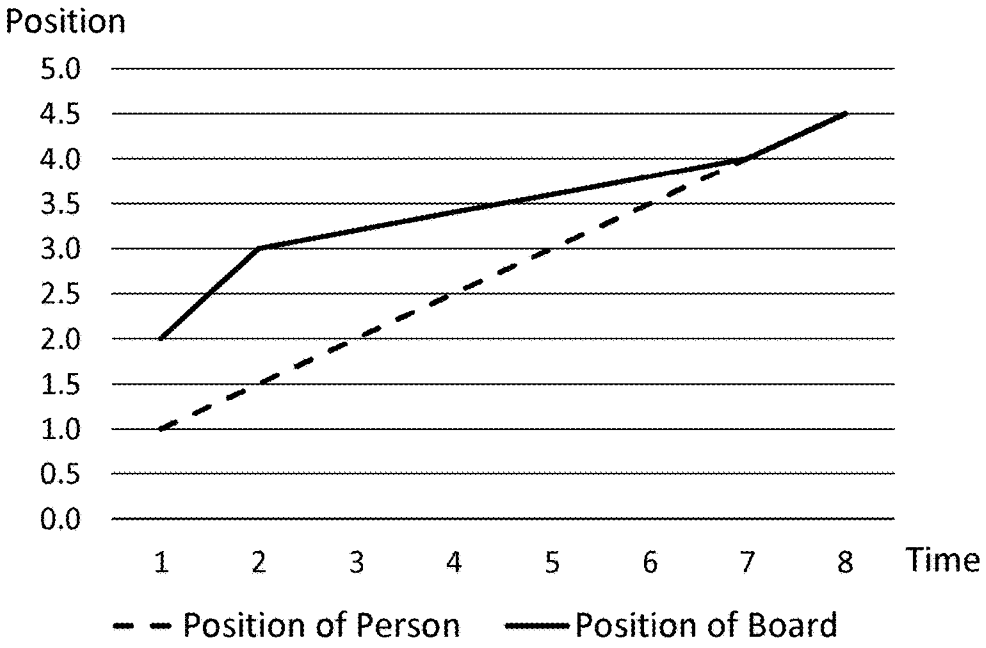
FIG. 37 illustrates a position chart, according to some embodiments.

FIG. 37 comprises a graph of the example shown in FIGS. 36 and 38.

Figure 23:
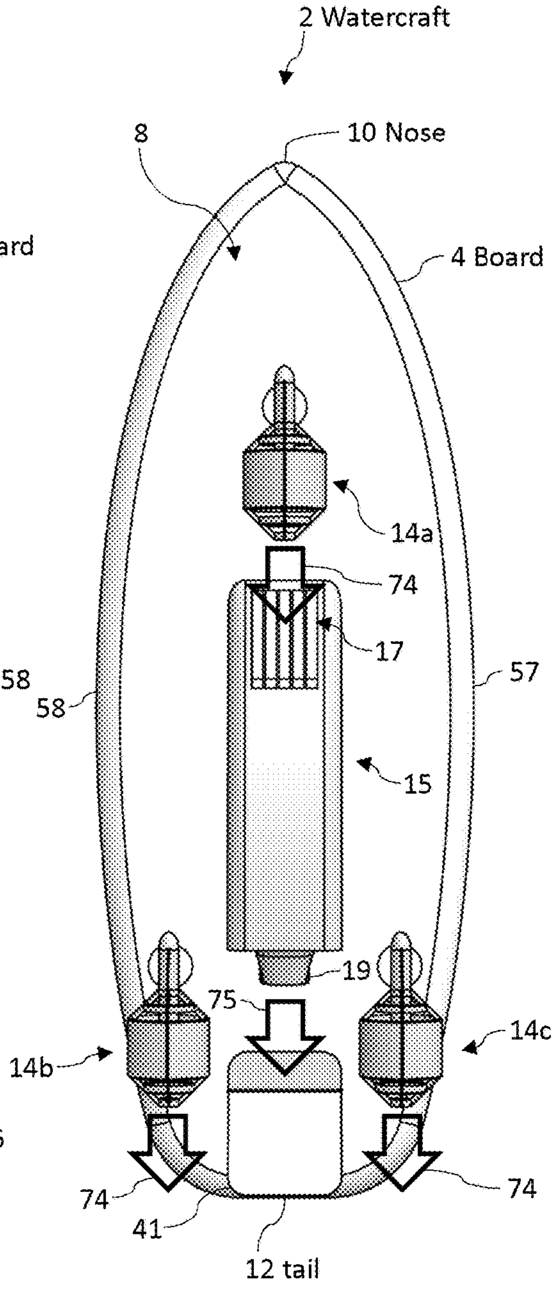
FIG. 23 illustrates a bottom view of the watercraft, according to some embodiments.
Figure 24:
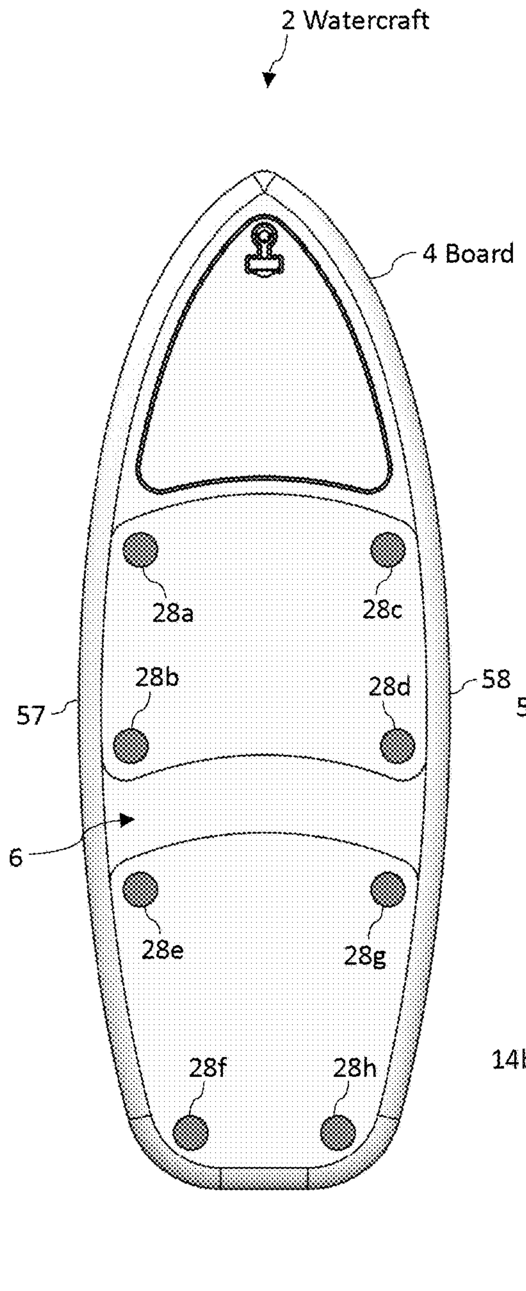
FIG. 24 illustrates a top view of the watercraft in which platforms are hidden, according to some embodiments.

If the COM 61 of the person riding the watercraft 2 is too far toward the tail 12 of the board 4, the computer system 33 can reduce thrust of motors 14*a*, 14*b*, 14*c* (as indicated by arrows 74 in FIG. 23) and/or can reduce thrust of a motor 15 (as indicated by arrow 75 in FIG. 23) to reduce the speed of the watercraft 2. Reducing the speed of the watercraft 2 causes the COM 61 to move forward (toward the nose 10) relative to the watercraft 2 to move the COM 61 over a location approximately centered between the first upward-facing surface 53 and the second upward-facing surface 54.

Figure 25:
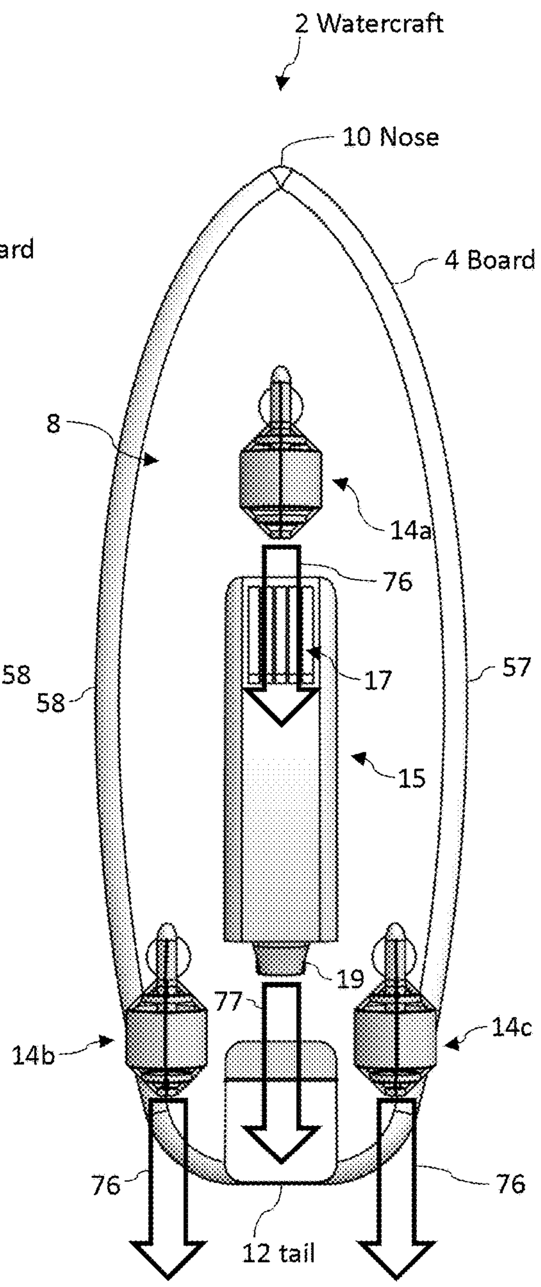
FIG. 25 illustrates a bottom view of the watercraft, according to some embodiments.
Figure 26:
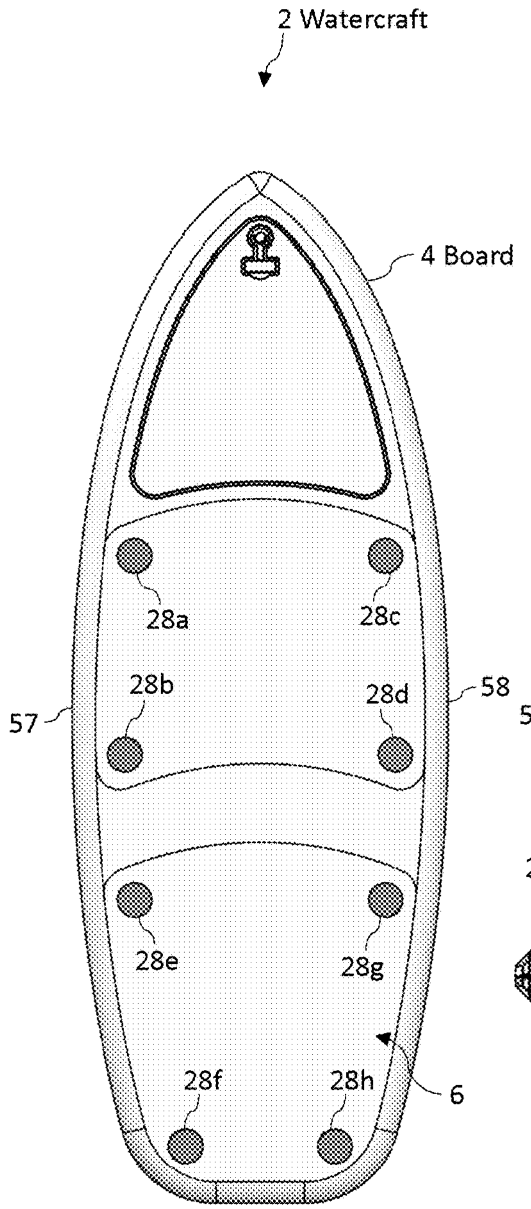
FIG. 26 illustrates a top view of the watercraft in which platforms are hidden, according to some embodiments.

If the COM 61 of the person riding the watercraft 2 is too far toward the nose 10 of the board 4, the computer system 33 can increase thrust of motors 14*a*, 14*b*, 14*c* (as indicated by arrows 76 in FIG. 25) and/or can increase thrust of a motor 15 (as indicated by arrow 77 in FIG. 25) to increase the speed of the watercraft 2. Increasing the speed of the watercraft 2 causes the COM 61 to move backward (toward the tail 12) relative to the watercraft 2 to move the COM 61 over a location approximately centered between the first upward-facing surface 53 and the second upward-facing surface 54.

In some embodiments, the watercraft 2 comprises a computer system 33 having at least one processor 39 and a memory 32 having program instructions 38 that when executed by the at least one processor 39 are configured to decelerate the watercraft 2 in response to comparing a first force detected by the first force sensor system to a second force detected by the second force sensor system.

In some embodiments, the motor comprises at least one of a propeller 16 and an impeller (e.g., of the motor 15). The program instructions 38 can be configured to decelerate the watercraft 2 by decreasing a second thrust of the motor 14*a*, 14*b*, 14*c*, 15. The program instructions 38 can decrease the second thrust of the motor 14*a*, 14*b*, 14*c*, 15 by reducing a rotational speed of the propeller 16 and/or impeller. The program instructions 38 can decrease the second thrust of the motor by reducing an electrical power supplied to the motor 14*a*, 14*b*, 14*c*, 15.

In some embodiments, the motor comprises at least one of a propeller 16 and an impeller (e.g., of the motor 15). The program instructions 38 can be configured to decelerate the watercraft 2 by reversing a rotational direction of at least one of the propeller 16 and the impeller from a forward thrust direction to a reverse thrust direction.

Figure 27:
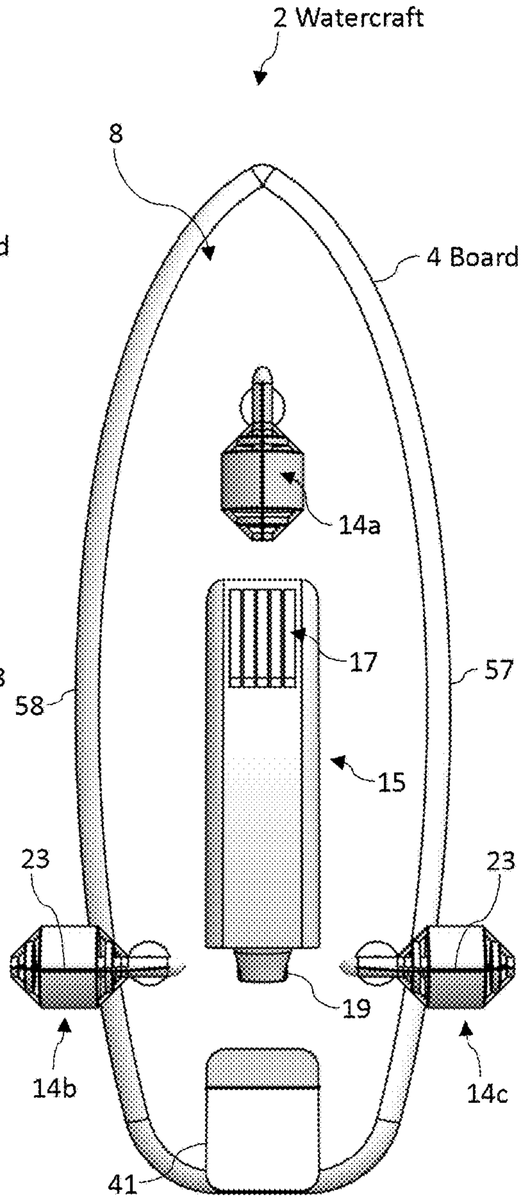
FIG. 27 illustrates a bottom view of the watercraft, according to some embodiments.
Figure 29:
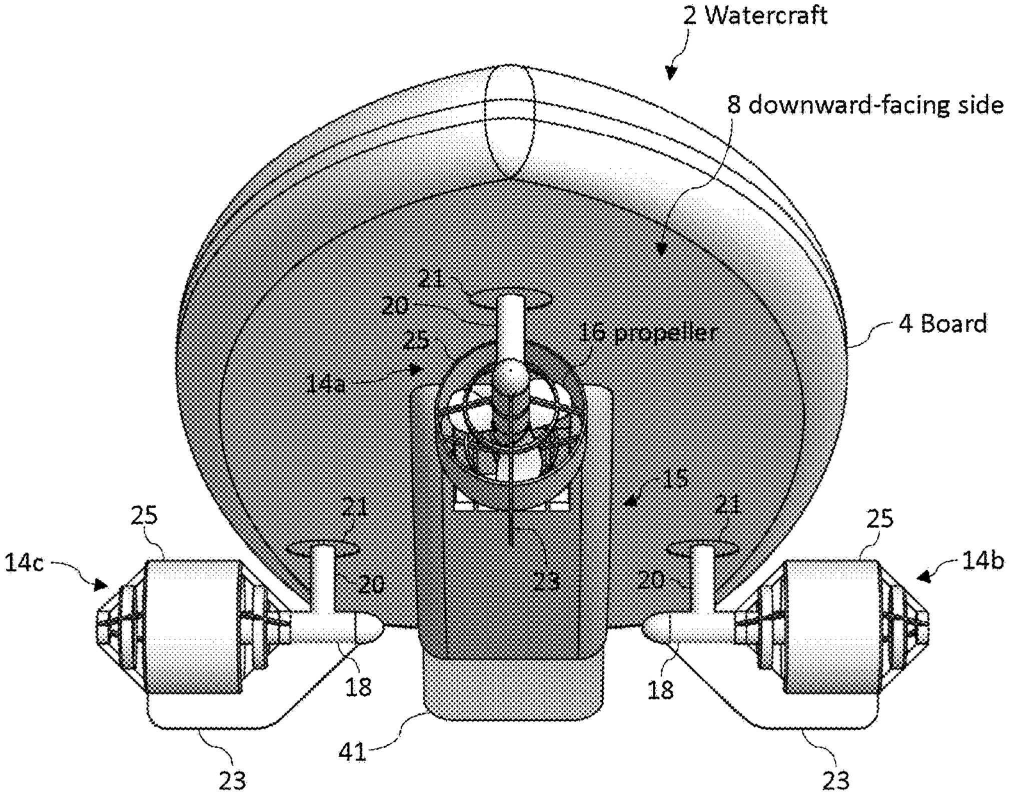
FIG. 29 illustrates a perspective view of a front and a bottom of the watercraft, according to some embodiments.

In some embodiments, program instructions 38 are configured to decelerate the watercraft 2 by deploying at least one braking fin. FIGS. 27-29 illustrates how fins 23 can be oriented in opposite directions (at an angle relative to a central axis 8) to act as braking fins. The opposite orientations of the fins 23 can prevent the fins 23 from turning the watercraft 2 and instead create drag that slows the watercraft 2.

Referring now to FIG. 6, moving the "up/down" fin 41 downward (e.g., via hydraulics) can also create drag to slow the watercraft 2. Thus, the fin 41 can act as a braking fin. In some embodiments, propellers 16 turn in a reverse thrust direction to slow the watercraft 2 down when a rider falls off the watercraft 2 (e.g., as indicated by force sensors detecting an overall force that is below a threshold).

In some embodiments, a computer system 33 comprises at least one processor 39 and a memory 32 having program instructions 38 that when executed by the at least one processor 39 are configured to decelerate the watercraft 2 in response to determining (e.g., by the computer system 33) that a first force detected by the first force sensor system is less than a first predetermined threshold relative to a second force detected by the second force sensor system.

In some embodiments, a computer system 33 comprises at least one processor 39 and a memory 32 having program instructions 38 that when executed by the at least one processor 39 are configured to decelerate the watercraft 2 in response to determining (e.g., by the computer system 33) that a first ratio of the first force divided by the second force is less than a second predetermined threshold.

In some embodiments, a computer system 33 comprises at least one processor 39 and a memory 32 having program instructions 38 that when executed by the at least one processor 39 are configured to decelerate the watercraft 2 in response to determining (e.g., by the computer system 33) that a second ratio of the second force divided by the first force is greater than a third predetermined threshold.

In some embodiments, a computer system 33 comprises at least one processor 39 and a memory 32. The memory 32 can comprise program instructions 38 that when executed by the at least one processor 39 are configured to decelerate the watercraft 2 in response to determining (e.g., by the computer system 33) that a first force detected by the first force sensor system is less than a second force detected by the second force sensor system.

In some embodiments, a computer system 33 comprises at least one processor 39 and a memory 32. The memory 32 can comprise program instructions 38 that when executed by the at least one processor 39 are configured to decelerate the watercraft 2 in response to determining (e.g., by the computer system 33) that the second force detected by the second force sensor system is greater than the first force detected by the first force sensor system.

In some embodiments, a computer system 33 comprises at least one processor 39 and a memory 32. The memory 32 can comprise program instructions 38 that when executed by the at least one processor 39 are configured to decelerate the watercraft 2 in response to determining that the first force detected by the first force sensor system is at least ten percent, at least twenty percent, and/or at least thirty percent less than the second force detected by the second force sensor system.

In some embodiments, a computer system 33 comprises at least one processor 39 and a memory 32. The memory 32 can comprise program instructions 38 that when executed by the at least one processor 39 are configured to decelerate the watercraft 2 in response to determining that the second force detected by the second force sensor system is at least ten percent, at least twenty percent, and/or at least thirty percent greater than the first force detected by the first force sensor system.

In some embodiments, a computer system 33 comprises at least one processor 39 and a memory 32. The memory 32 can comprise program instructions 38 that when executed by the at least one processor 39 are configured to decelerate the watercraft 2 in response to determining that the first force detected by the first force sensor system is less than seventy percent, is less than eighty percent, and/or is less than ninety percent of the second force detected by the second force sensor system.

In some embodiments, a computer system 33 comprises at least one processor 39 and a memory 32. The memory 32 can comprise program instructions 38 that when executed by the at least one processor 39 are configured to decelerate the watercraft 2 in response to determining that the second force detected by the second force sensor system is greater than 110 percent, is greater than 120 percent, and/or is greater than 140 percent of the first force detected by the first force sensor system.

If the person riding the watercraft 2 is falling forward (e.g., is moving forward faster than the board 4), the watercraft 2 can accelerate (e.g., to move the COM 61 to a center of a preferred riding position of the person).

In some embodiments, a watercraft 2 comprises a computer system 33 having at least one processor 39 and a memory 32 having program instructions 38 that when executed by the at least one processor 39 are configured to increase a first thrust of the motor in response to comparing a first force detected by the first force sensor system to a second force detected by the second force sensor system. In some embodiments, program instructions 38 increase a first thrust of the motor by increasing a rotational speed of an impeller (e.g., of the motor 15) or propeller 16 and/or by increasing electrical power supplied to an electrical motor.

Embodiments can use any of the motors described herein, incorporated by reference, and/or any suitable motor and propeller and/or impeller.

If the person falls off the watercraft 2, the watercraft 2 can cut power to the motors 14*a*, 14*b*, 14*c*, 15 (or at least greatly reduce the thrust of the motors 14*a*, 14*b*, 14*c*, 15). In some embodiments, program instructions 38 are configured to decrease the first thrust of the motor at least ninety percent in response to the first force sensor system detecting a third force that is below a first threshold, and in response to the second force sensor system detecting a fourth force that is below a second threshold. The first threshold can be configured to be indicative of the person not standing on the first upward-facing surface 53. The second threshold can be configured to be indicative of the person not standing on the second upward-facing surface 54. The first and second thresholds can be chosen such that if the person falls off the board 4, the third force will be less than the first threshold and the fourth force will be less than the second threshold.

In some embodiments, a first force sensor system comprises at least one of an electronic force sensor, a pressure sensor, a pressure transducer, a force transducer, a first strain gauge, a piezoresistive strain gauge, a piezoelectric force sensor, a diaphragm force sensor, a capacitive force sensor, an electromagnetic force sensor, an optical force sensor, a potentiometric force sensor, a resonant force sensor, a thermal force sensor, an ionization force sensor, and a load cell.

Some embodiments use force sensors that are pressure sensors.

In some embodiments, a second force sensor system comprises at least one of an electronic force sensor, a pressure sensor, a pressure transducer, a force transducer, a first strain gauge, a piezoresistive strain gauge, a piezoelectric force sensor, a diaphragm force sensor, a capacitive force sensor, an electromagnetic force sensor, an optical force sensor, a potentiometric force sensor, a resonant force sensor, a thermal force sensor, an ionization force sensor, and a load cell.

Figure 18:
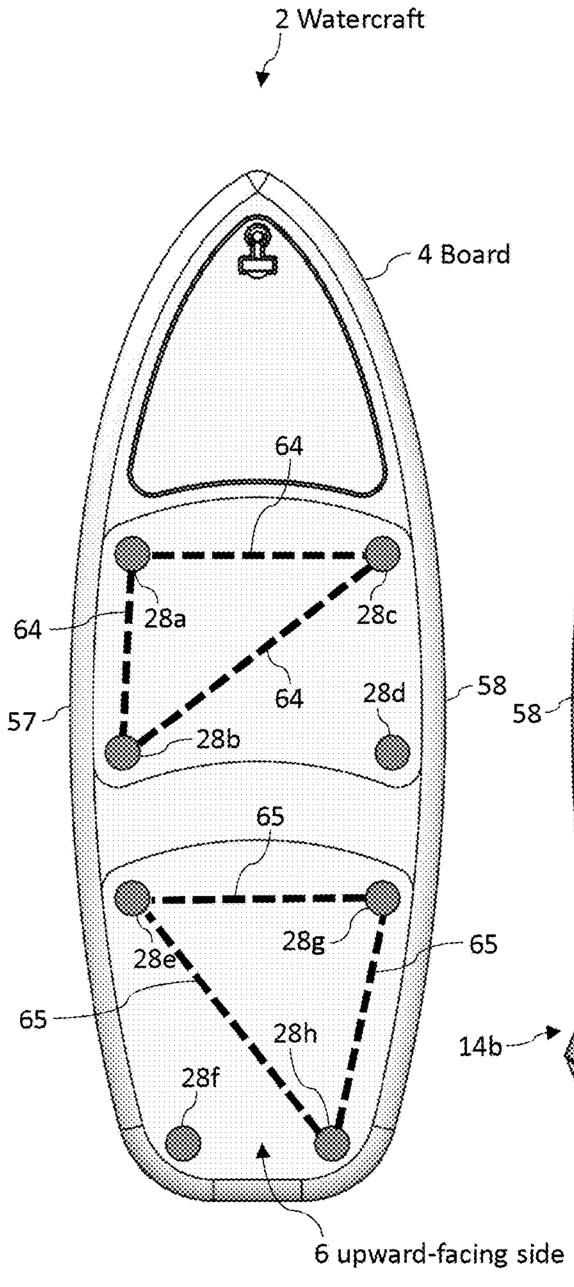
FIG. 18 illustrates a top view of the watercraft in which platforms are hidden, according to some embodiments.

In some embodiments, a first force sensor system comprises at least a first force sensor, a second force sensor, and a third force sensor arranged in a triangular format under the first upward-facing surface 53 to detect the first force. Referring now to FIG. 18, a first force sensor system can comprise force sensors 28*a*, 28*b*, 28*c*. Lines 64 illustrate how the force sensors 28*a*, 28*b*, 28*c* are arranged in a triangular format where the force sensors 28*a*, 28*b*, 28*c* are located at the corners of the triangle.

In some embodiments, a second force sensor system comprises at least a first force sensor, a second force sensor, and a third force sensor arranged in a triangular format under the second upward-facing surface 54 to detect the second force. Lines 65 illustrate how the force sensors 28*e*, 28*g*, 28*h* are arranged in a triangular format where the force sensors 28*e*, 28*g*, 28*h* are located at the corners of the triangle.

Figure 20:
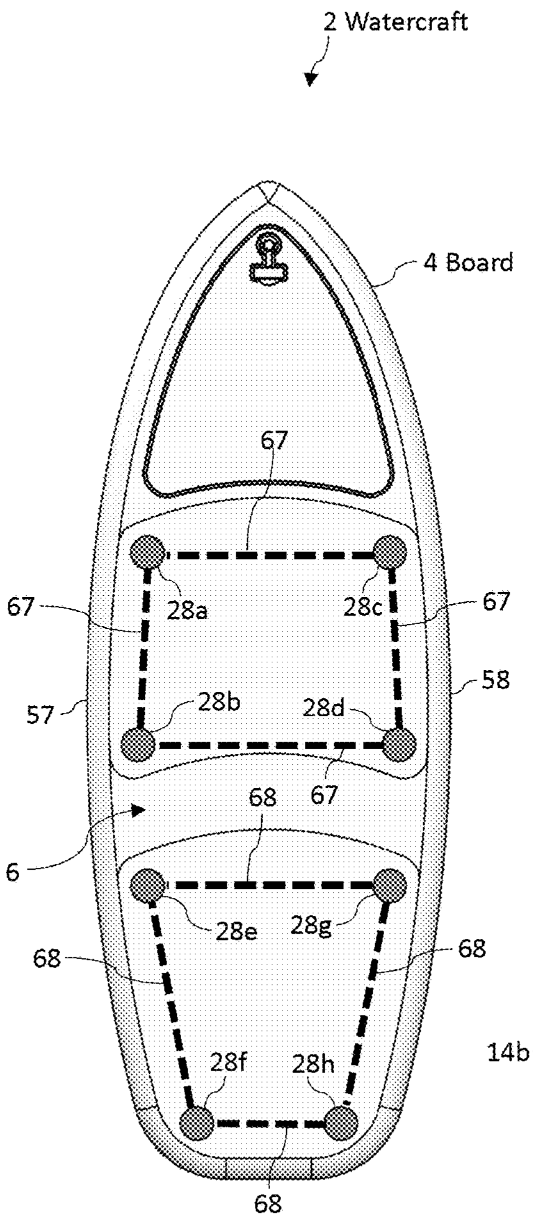
FIG. 20 illustrates a top view of the watercraft in which platforms are hidden, according to some embodiments.

In some embodiments, a first force sensor system comprises at least a first force sensor, a second force sensor, a third force sensor, and a fourth force sensor arranged in at least one of a quadrilateral format under the first upward-facing surface 53 to detect the first force and a trapezoidal format under the first upward-facing surface 53 to detect the first force. Referring now to FIG. 20, a first force sensor system can comprise force sensors 28*a*, 28*b*, 28*c*, 28*d*. Lines 67 illustrate how the force sensors 28*a*, 28*b*, 28*c*, 28*d* are arranged in a quadrilateral format where the force sensors 28*a*, 28*b*, 28*c*, 28*d* are located at the corners of the quadrilateral.

In some embodiments, a second force sensor system comprises at least a first force sensor, a second force sensor, a third force sensor, and a fourth force sensor arranged in at least one of a quadrilateral format under the second upward-facing surface 54 to detect the second force and a trapezoidal format under the second upward-facing surface 54 to detect the second force. A second force sensor system can comprise force sensors 28*e*, 28*f*, 28*g*, 28*h*. Lines 68 illustrate how the force sensors 28*e*, 28*f*, 28*g*, 28*h* are arranged in a quadrilateral format where the force sensors 28*e*, 28*f*, 28*g*, 28*h* are located at the corners of the quadrilateral. Lines 68 also illustrate how the force sensors 28*e*, 28*f*, 28*g*, 28*h* are arranged in a trapezoidal format where the force sensors 28*e*, 28*f*, 28*g*, 28*h* are located at the corners of the trapezoid.

Although some embodiments illustrate four force sensors, embodiments can have any number of force sensors. Some embodiments comprise one force sensor, two force sensors, three force sensors, five force sensors, six force sensors, and/or additional force sensors.

In some embodiments, a first force sensor system comprises at least a first force sensor and a second force sensor. The first force sensor and the second force sensor can be configured to detect force from the first foot stepping on the first upward-facing surface 53.

The second force sensor system can comprise at least a third force sensor and a fourth force sensor. The third force sensor and the fourth force sensor can be configured to detect force from the second foot stepping on the second upward-facing surface 54. Program instructions 38 can be configured to determine the first force based on first data from the first force sensor and based on second data from the second force sensor. Program instructions 38 can be configured to determine the second force based on third data from the third force sensor and based on fourth data from the fourth force sensor.

In some embodiments, the watercraft 2 comprises a computer system 33 having at least one processor 39 and a memory 32 having program instructions 38 that when executed by the at least one processor 39 are configured to increase a first thrust of the motor in response to determining (e.g., by the computer system 33) that a first force detected by the first force sensor system is greater than a first predetermined threshold relative to a second force detected by the second force sensor system.

In some embodiments, the watercraft 2 comprises a computer system 33 having at least one processor 39 and a memory 32 having program instructions 38 that when executed by the at least one processor 39 are configured to increase a first thrust of the motor in response to determining (e.g., by the computer system 33) that a first ratio of the first force divided by the second force is greater than a second predetermined threshold.

In some embodiments, the watercraft 2 comprises a computer system 33 having at least one processor 39 and a memory 32 having program instructions 38 that when executed by the at least one processor 39 are configured to increase a first thrust of the motor in response to determining (e.g., by the computer system 33) that a second ratio of the second force divided by the first force is less than a third predetermined threshold.

In some embodiments, the watercraft 2 comprises a computer system 33 having at least one processor 39 and a memory 32 having program instructions 38 that when executed by the at least one processor 39 are configured to increase a first thrust of the motor in response to determining (e.g., by the computer system 33) that a first force detected by the first force sensor system is greater than a second force detected by the second force sensor system.

In some embodiments, the watercraft 2 comprises a computer system 33 having at least one processor 39 and a memory 32 having program instructions 38 that when executed by the at least one processor 39 are configured to increase a first thrust of the motor in response to determining (e.g., by the computer system 33) that the second force detected by the second force sensor system is less than the first force detected by the first force sensor system.

In some embodiments, the watercraft 2 comprises a computer system 33 having at least one processor 39 and a memory 32 having program instructions 38 that when executed by the at least one processor 39 are configured to increase a first thrust of the motor in response to determining that the first force detected by the first force sensor system is at least ten percent, at least twenty percent and/or at least thirty percent greater than the second force detected by the second force sensor system.

In some embodiments, the watercraft 2 comprises a computer system 33 having at least one processor 39 and a memory 32 having program instructions 38 that when executed by the at least one processor 39 are configured to increase a first thrust of the motor in response to determining that the second force detected by the second force sensor system is at least ten percent, at least twenty percent and/or at least thirty percent less than the first force detected by the first force sensor system.

In some embodiments, the watercraft 2 comprises a computer system 33 having at least one processor 39 and a memory 32 having program instructions 38 that when executed by the at least one processor 39 are configured to increase a first thrust of the motor in response to determining that the first force detected by the first force sensor system is greater than seventy percent, greater than eighty percent, and/or greater than ninety percent of the second force detected by the second force sensor system.

In some embodiments, the watercraft 2 comprises a computer system 33 having at least one processor 39 and a memory 32 having program instructions 38 that when executed by the at least one processor 39 are configured to increase a first thrust of the motor in response to determining that the second force detected by the second force sensor system is less than 110 percent, less than 120 percent, and/or less than 140 percent of the first force detected by the first force sensor system.

Figure 30:
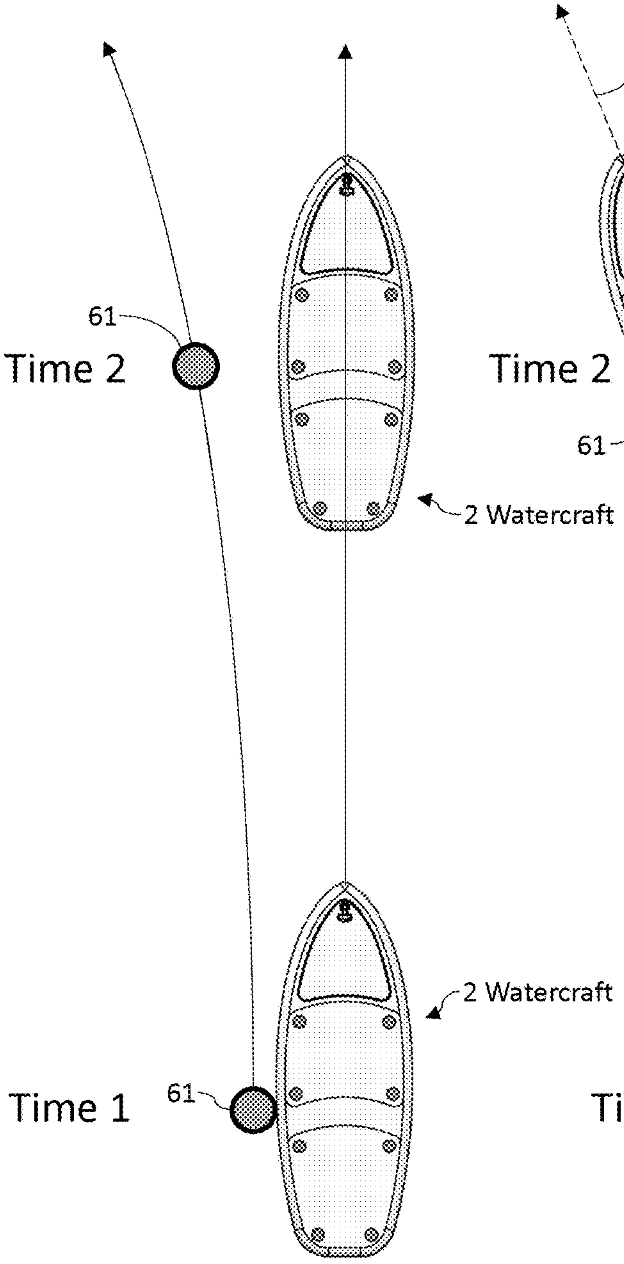
FIGS. 30 and 31 illustrate diagrammatic views of the watercraft, according to some embodiments.

Force sensors and/or tilt sensors can also help prevent a rider from falling off a right side 58 or a left side 57 of the board 4. Referring now primarily to FIGS. 30, 16, and 17, a center of mass ("COM") 61 of the person at Time 1 is located too far to the left of a center of the watercraft 2, which is indicative of the person being in the process of falling off the watercraft 2. If the force detected by force sensor **28*a* plus the force detected by force sensor 28*b* is greater than the force detected by force sensor 28*c* plus the force detected by force sensor 28*d*, and the force detected by force sensor 28*e* plus the force detected by force sensor 28*f* is greater than the force detected by force sensor 28*f* plus the force detected by force sensor 28*h*, then the computer system 33 can determine that the COM 61** is located too far to the left.

If the force detected by force sensor **28*a* plus the force detected by force sensor 28*b* is greater than the force detected by force sensor 28*c* plus the force detected by force sensor 28*d*, and the force detected by force sensor 28*e* plus the force detected by force sensor 28*f* is only slightly larger than the force detected by force sensor 28*f* plus the force detected by force sensor 28*h*, then the computer system 33 can determine that the COM 61 is close enough and does not need to be corrected by the watercraft 61**.

If the force detected by force sensor **28*a* plus the force detected by force sensor 28*b* is greater than the force detected by force sensor 28*c* plus the force detected by force sensor 28*d*, and the force detected by force sensor 28*e* plus the force detected by force sensor 28*f* is much larger than the force detected by force sensor 28*f* plus the force detected by force sensor 28*h*, then the computer system 33 can determine that aggressive action by the watercraft 2 is necessary to move the board 4 under the COM 61**.

The computer system 33 can use data from a tilt sensor 24 (illustrated in FIGS. 5 and 28) to determine the COM 61 is located too far to the left or right of the watercraft 2. Data from the tilt sensor 24 can indicate if the board 4 is rotated such that the left side 57 of the board is lower than the right side 58 of the board 4.

If the data from the tilt sensor 24 indicates if the board 4 is rotated such that the left side 57 of the board is lower than the right side 58 of the board 4, the computer system can determine that the COM 61 is located too far to the left of the central axis 8 (labeled in FIG. 3).

If the data from the tilt sensor 24 indicates if the board 4 is rotated such that the right side 58 of the board is lower than the left side 57 of the board 4, the computer system can determine that the COM 61 is located too far to the right of the central axis 8 (labeled in FIG. 3).

At Time 1 of FIG. 30, data from the tilt sensor 24 indicates that the board 4 is rotated such that the left side 57 of the board is lower than the right side 58 of the board 4. If the tilt angle is large, the computer system can determine that the COM 61 is located too far to the left of the board.

The magnitude and/or the likelihood of the watercraft 2 taking action to move the watercraft 2 under the COM 61 can be influenced by settings selected by the person. The person can use an "app" running on a remote computing device 48, buttons on the remote computing device 48, and/or buttons on the watercraft 2 to select various modes (e.g., beginner mode, intermediate mode, advanced mode). These mode selections can alter the magnitude and/or the likelihood of the watercraft 2 taking action to move the watercraft 2 under the COM 61.

FIG. 30 illustrates the watercraft 2 not taking action to move the watercraft 2 under the COM 61. At Time 1, the COM 61 is located a first distance from the central axis 8. Between Time 1 and Time 2, the watercraft 2 continues approximately straight. The continued movement of the COM 61 leftward (and forward) causes the COM 61 to continue to move farther from the watercraft 2. At Time 2, the person is flying through the air and is no longer in contact with the watercraft 2.

Figure 31:
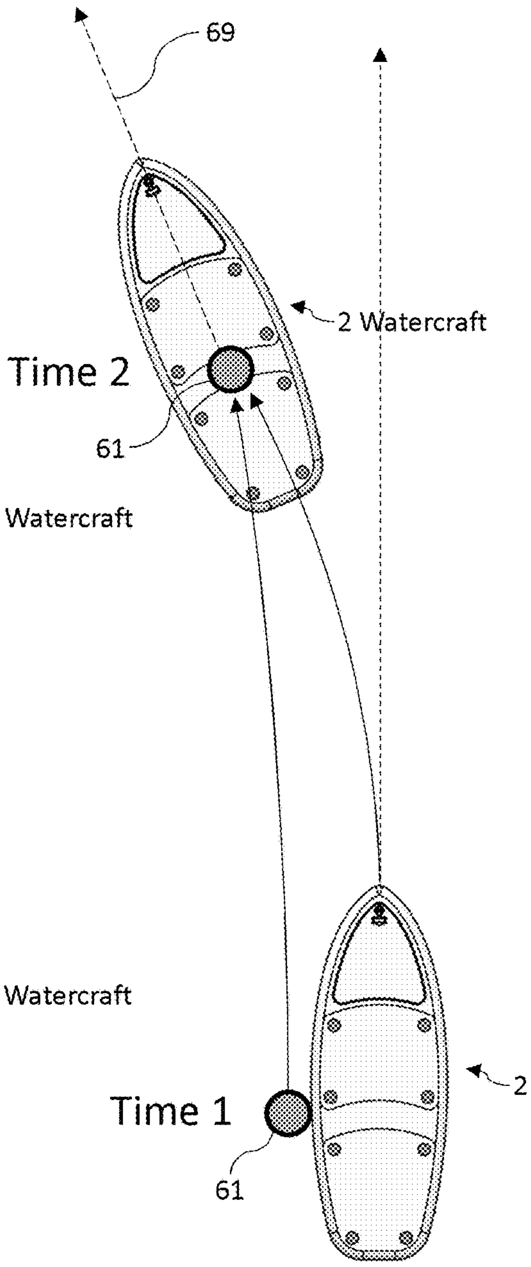

Although moving the COM 61 to the left can cause the watercraft 2 to turn leftward (due to the hydrodynamics of the board 4), this passive leftward movement is often insufficient to move the watercraft 2 back under the COM 61 (especially with beginner and intermediate riders). FIG. 31 illustrates the watercraft 33 actively responding to the computer system 33 detecting the COM 61 being located too far to the left at Time 1. The motors **14*a*, 14*b*, 14*c*, 15, and/or fins 23 can move to direct water flow (e.g., under the board 4) that causes the watercraft 2 to turn more quickly than would be the case with a passive system and more quickly than the COM 61 is turning. As a result, by Time 2 the watercraft 2 has moved such that the COM 61 is located approximately over a center between the first upward-facing surface 53 and the second upward-facing surface 54. Thus, the computer system 33 has prevented the person from falling off the watercraft 2**.

FIG. 17 illustrates motors **14*a*, 14*b*, 14*c*, 15 and fins 23 having been moved to direct water flow to turn the watercraft 2 leftward (from the perspective of the topside of the board 4). The nozzle 19 has been placed in a position to eject water flow to turn the watercraft 2**.

Figure 19:
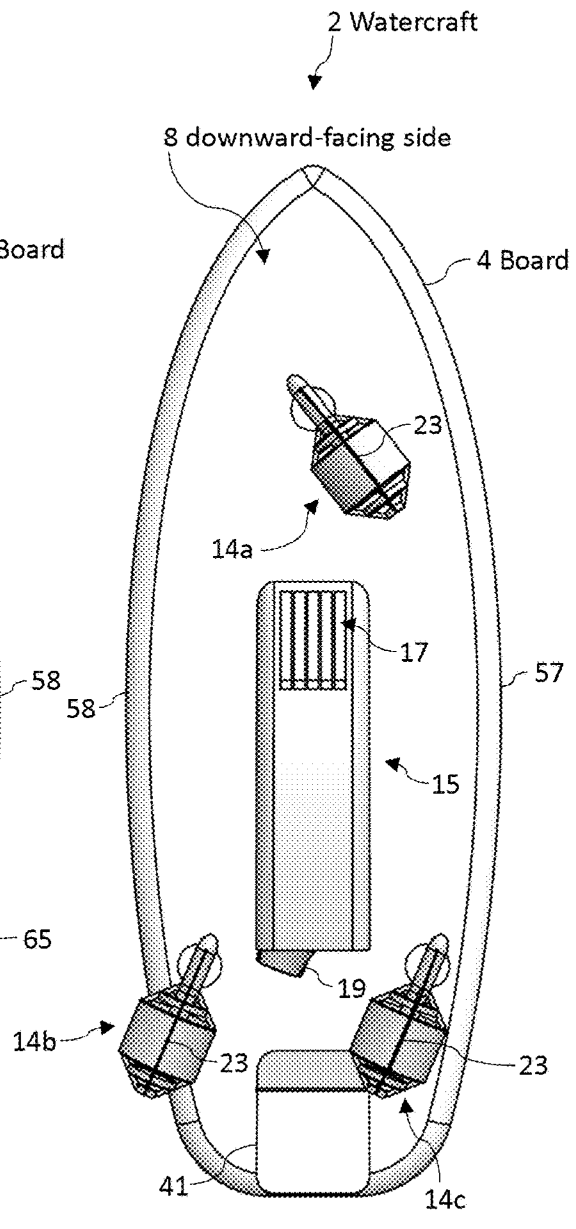
FIG. 19 illustrates a bottom view of the watercraft, according to some embodiments.

FIG. 19 illustrates motors **14*a*, 14*b*, 14*c*, 15 and fins 23 having been moved to direct water flow to turn the watercraft 2 rightward (from the perspective of the topside of the board 4). The nozzle 19 has been placed in a position to eject water flow to turn the watercraft 2**.

Turning the watercraft 2 can be quite effective to bring the COM 61 back over the board 4, but as shown by line 69 of FIG. 31, turning the watercraft 2 changes the direction in which the watercraft 2 is heading. If a person is simply off balance (and thus his COM 61 is not centered over the first upward-facing surface 53 and the second upward-facing surface 54), turning the watercraft 2 can be disconcerting to the rider and may not be what the rider wants to do.

Figure 35:
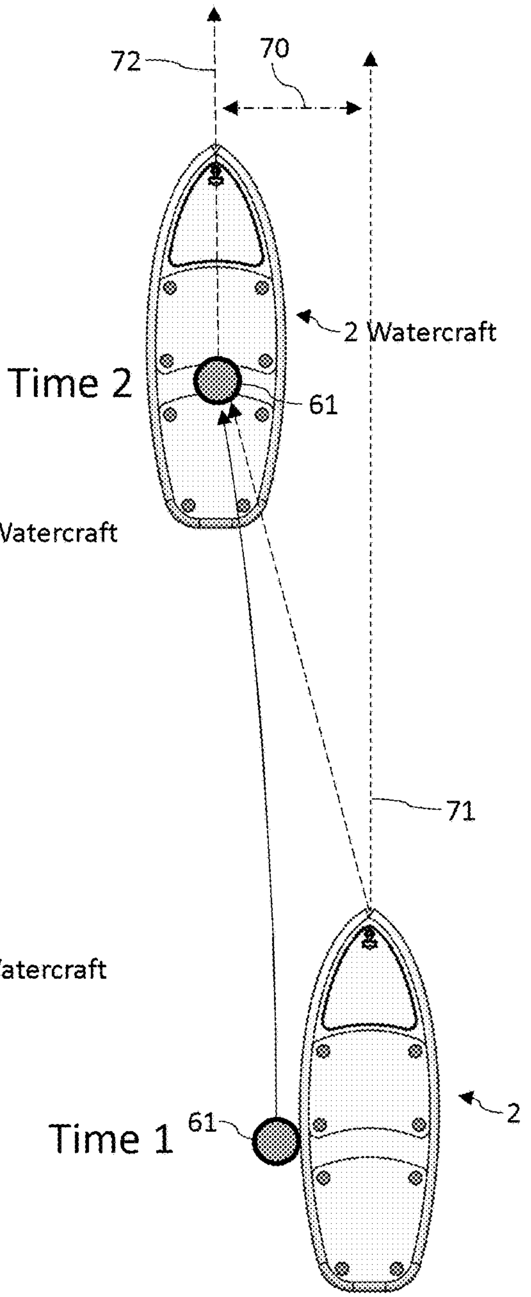

In contrast, FIG. 35 illustrates the watercraft 2 moving to bring the COM 61 closer to being centered over the first upward-facing surface 53 and the second upward-facing surface 54 while reducing (and in some cases even eliminating) an angle 70 between a first direction 71 of travel of the watercraft 2 (at Time 1) and a second direction 72 of travel of the watercraft 2 (at Time 2). This approach can be extremely helpful, especially when the movement required to center the COM 61 is small (because the maintaining the direction of travel makes the centering nearly unnoticeable to the rider, and in some cases is completely unnoticeable to the rider). Some embodiments use the approach illustrated in FIG. 35 for small centering movements (e.g., when the force difference and/or tilt different is below a first threshold) and use the approach illustrated in FIG. 31 for larger centering movements (e.g., when the force difference and/or tilt difference is greater than a first threshold). This enables minimizing the noticeability of centering to the rider when minor active adjustments are necessary while (1) feeling responsive to larger, deliberate movements of the rider (e.g., when the rider actually wants to turn) and (2) taking aggressive active adjustments when necessary to "catch" the rider (to prevent the rider from falling off due to large imbalances).

Minor COM 61 misalignments are often inadvertent, so minor, unnoticeable active actions (by the watercraft 2) are often appropriate. Large COM 61 misalignments are often deliberate, so large active actions are often desired (because the rider wants to turn) and/or necessary to avoid falls.

Figure 32:
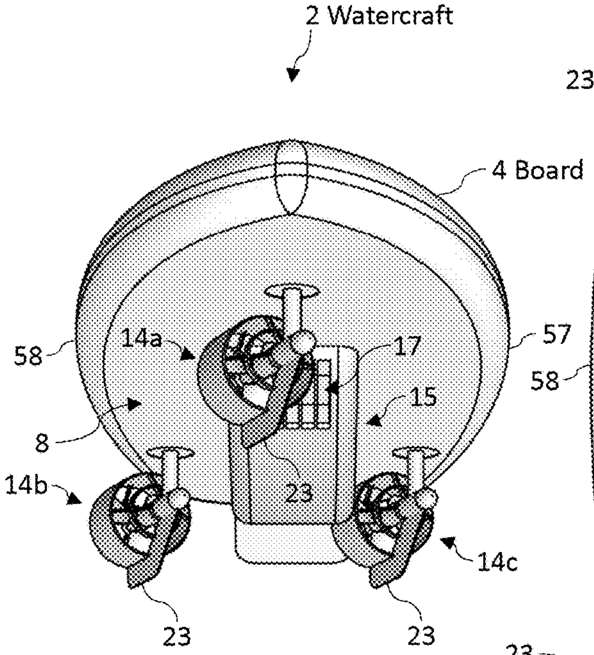
FIG. 32 illustrates a perspective view of a front and a bottom of the watercraft, according to some embodiments.
Figure 33:
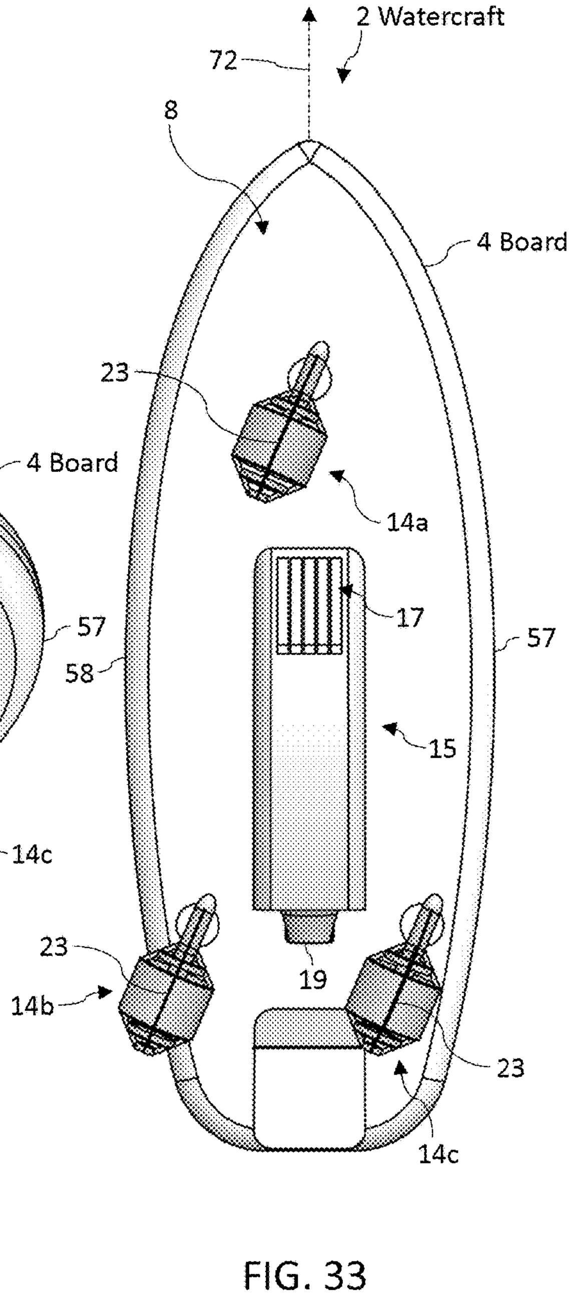
FIG. 33 illustrates a bottom view of the watercraft, according to some embodiments.
Figure 34:
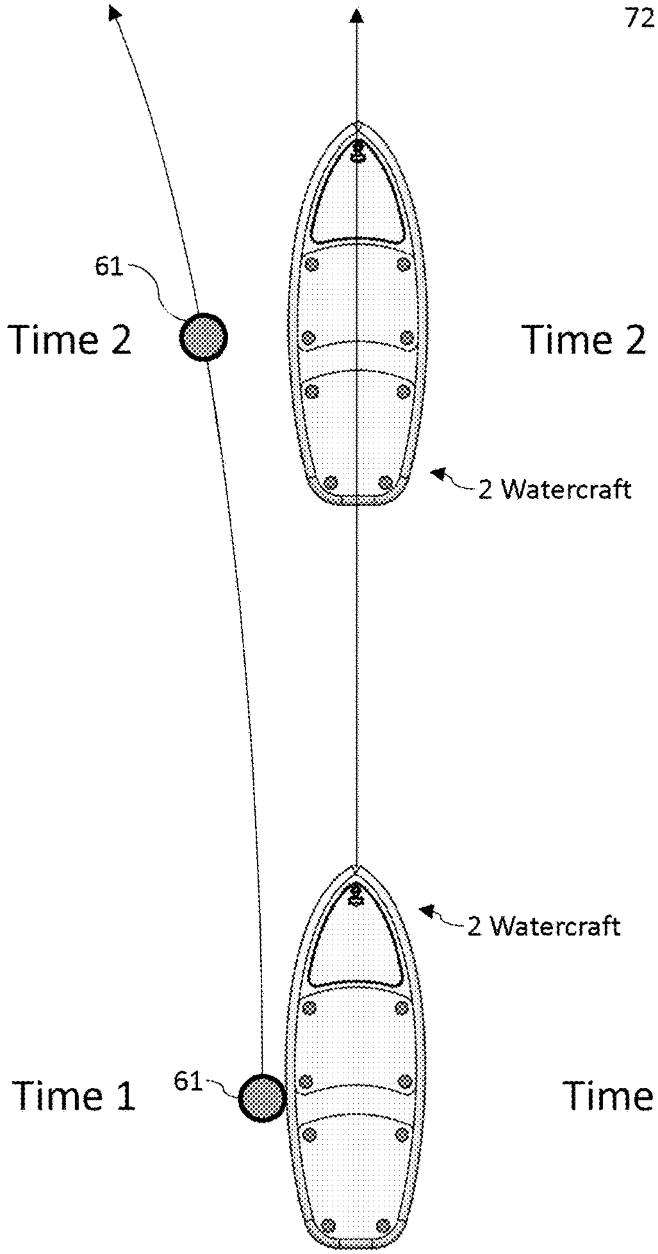
FIGS. 34-36 illustrate diagrammatic views of the watercraft, according to some embodiments.

FIGS. 32 and 33 illustrate one configuration that enables the movement illustrated in FIG. 35. A portion on the front of the watercraft 2 and a portion on the back of the watercraft 2 work together to move the watercraft 2 leftward (or rightward) while maintaining a direction 72 of travel of the watercraft. The nozzle 19 can also be turned to help maintain the direction 72 of travel.

In some embodiments, a motor 14*a* and/or a fin 23 located on a front half of the board 4 directs water flow to help maintain a direction in which the watercraft 2 is pointing while motors 14*b*, 14*c*, a nozzle 19, and/or fins 23 located on a rear half of the board 4 direct water flow to make the watercraft 2 move leftward or rightward (to enable the watercraft 2 to move as shown in FIG. 35).

In some embodiments, motors 14*b*, 14*c*, a nozzle 19, and/or fins 23 located on a rear half of the board 4 direct water flow to help maintain a direction in which the watercraft 2 is pointing while a motor 14*a* and/or a fin 23 located on a front half of the board 4 directs water flow to make the watercraft 2 move leftward or rightward (to enable the watercraft 2 to move as shown in FIG. 35).

In some embodiments, a watercraft 2 comprises a steering system configured to turn the watercraft 2 by directing water flow, and a computer system 33 comprising at least one processor 39 and a memory 32. At least one of the first force sensor system and the second force sensor system can comprise at least a first force sensor located on a left half of the board 4 and a second force sensor located on a right half of the board 4. The memory 32 can comprise program instructions 38 that when executed by the at least one processor 39 are configured to cause the steering system to direct the water flow to turn the watercraft 2 leftward (or rightward) in response to at least one of determining a first force detected by the first force sensor is greater than a second force detected by the second force sensor; determining the second force detected by the second force sensor is less than the first force detected by the first force sensor; determining the first force detected by the first force sensor is at least ten percent, at least twenty percent, and/or at least forty percent greater than the second force detected by the second force sensor; and determining the second force detected by the second force sensor is at least ten percent, at least twenty percent, and/or at least forty percent less than the first force detected by the first force sensor.

In some embodiments, the program instructions 38 are configured to cause the steering system to direct the water flow to turn the watercraft 2 rightward (or leftward) in response to at least one of determining the first force detected by the first force sensor is less than the second force detected by the second force sensor; determining the second force detected by the second force sensor is greater than the first force detected by the first force sensor; determining the first force detected by the first force sensor is at least ten percent, at least twenty percent, and/or at least forty percent less than the second force detected by the second force sensor; and determining the second force detected by the second force sensor is at least ten percent, at least twenty percent, and/or at least forty percent greater than the first force detected by the first force sensor.

In some embodiments, a watercraft 2 comprises a first force sensor system coupled to a left half of the board 4 such that the first force sensor system is configured to detect a first force from at least a first portion of a first foot stepping on the left half. In some embodiments, the first portion comprises a heel of the first foot.

The watercraft 2 can comprise a second force sensor system coupled to a right half of the board 4 such that the second force sensor system is configured to detect a second force from at least a second portion of the first foot stepping on the right half. In some embodiments, the second portion comprises a ball (and/or toes) of the first foot. In some embodiments, however, the first portion comprises a ball and toes of the first foot, and the second portion comprises a heel of the first foot.

The watercraft 2 can comprise a steering system configured to turn the watercraft 2 by directing water flow. The steering system can comprise at least one of an impeller, a propeller, a movable nozzle, and a fin.

The watercraft 2 can comprise a computer system 33 comprising at least one processor 39 and a memory 32. The memory 32 can comprise program instructions 38 that when executed by the at least one processor 39 are configured to cause the steering system to direct the water flow to turn the watercraft 2 in response to comparing the first force detected by the first force sensor system to the second force detected by the second force sensor system.

Some embodiments are configured to turn the watercraft 2 in response to a force on the left side of the board 4 being larger than a force on the right side of the board 4. Some embodiments are configured to turn the watercraft 2 in response to a force on the right side of the board 4 being larger than a force on the left side of the board 4. Some embodiments do not cause the watercraft 2 to actively turn (e.g., by using motors to move water and/or fins) unless the force on one side of the board 4 is at least 10 percent larger than a force on the other side of the board 4.

The watercraft 2 can comprise a platform (e.g., platform 87 or platform 88) configured to enable a first foot to step on the platform while the person surfs. The platform 87 is coupled to the left half of the board such that the first force sensor system (e.g., comprising force sensor 28*a* and force sensor 28*b*) is located under the platform 87 and is configured to detect the first force from the first foot stepping on the platform. The platform 87 is coupled to the right half of the board 4 such that the second force sensor system (e.g., comprising force sensor 28*c* and force sensor 28*d*) is located under the platform 87 and is configured to detect the second force from the first foot stepping on the platform.

As used herein, a "platform" is not necessarily raised higher than the upward-facing side 6 of the board 4 and is not necessarily flat.

The watercraft 2 can comprise a computer system 33 comprising at least one processor 39 and a memory 32. The memory 32 can comprise program instructions 38 that when executed by the at least one processor 39 are configured to cause the steering system to direct the water flow to turn the watercraft 2 leftward in response to at least one of determining the first force is greater than the second force; determining the second force is less than the first force; determining the first force is at least ten percent, at least twenty percent, and/or at least forty percent greater than the second force; and determining the second force is at least ten percent, at least twenty percent, and/or at least forty percent less than the first force.

The program instructions 38 can be configured to cause the steering system to direct water flow to turn the watercraft 2 leftward in response to determining the first force is greater than the second force; determining the first force is at least twenty percent greater than the second force; determining the first force is more than a first predetermined threshold greater than the second force; determining a ratio that compares the first force to the second force is at least one of greater than a second predetermined threshold and less than a third predetermined threshold; determining the second force is less than the first force; and determining the second force is at least twenty percent less than the first force. The program instructions 38 can determine that the first force is greater than the second force by determining that the second force is smaller than the first force.

The program instructions 38 can be configured to cause the steering system to direct water flow to turn the watercraft 2 rightward in response to determining the second force is greater than the first force; determining the second force is at least twenty percent greater than the first force; determining the second force is more than a first predetermined threshold greater than the first force; determining a ratio that compares the second force to the first force is at least one of greater than a second predetermined threshold and less than a third predetermined threshold; determining the first force is less than the second force; and determining the first force is at least twenty percent less than the second force. The program instructions 38 can determine that the second force is greater than the first force by determining that the first force is smaller than the second force.

Figure 4:
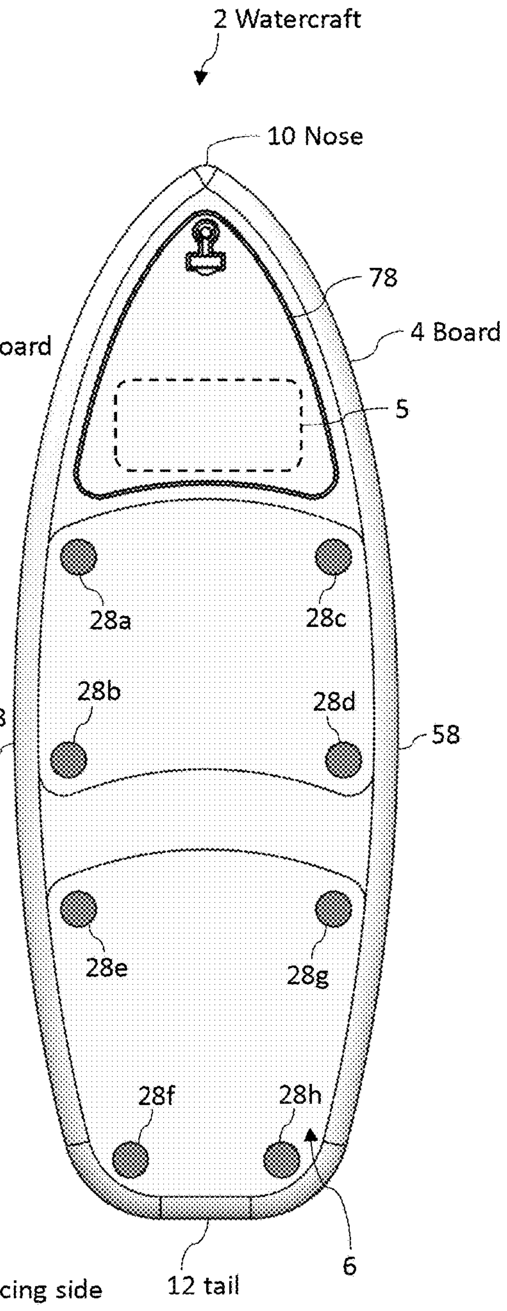
FIG. 4 illustrates a top view in which platforms are hidden, according to some embodiments.

A person can travel a long way on the watercraft and could be far from shore when the battery 5 runs out. The battery 5 can be located under a waterproof hatch 78 (e.g., as illustrated in FIG. 4). Running out of power far from shore is very inconvenient for riders. Some embodiments protect against a rider running out of electrical power by providing a low-power mode. In some embodiments, the low-power mode provides enough power to the motors 14*a*, 14*b*, 14*c*, 15 to enable the person to travel back to shore, but does not provide enough power to the motors 14*a*, 14*b*, 14*c*, 15 to enable the person to have fun. As a result, the rider is encouraged to head back to shore right away.

For example, the watercraft 2 might travel at less than 20 percent and/or less than 50 percent of a maximum speed of the watercraft 2 (while in the low-power mode). Charging the battery 5 can cause the computer system 33 to exit the low-power mode and enable the maximum speed.

In some embodiments, a watercraft 2 comprises a battery 5 configured to supply electrical power to the motor, and a computer system 33 comprising at least one processor 39 and a memory 32 having program instructions 38 that when executed by the at least one processor 39 are configured to monitor a power level of the battery 5. The program instructions 38 can be configured to limit a maximum available thrust of the motor to less than 50 percent of a maximum full-charge thrust of the motor and greater than 5 percent of the maximum full-charge thrust in response to the power level falling below a predetermined threshold that is less than 30 percent of a maximum of the power level. The program instructions 38 can be configured to limit the maximum available thrust until the power level is greater than 30 percent of the maximum of the power level.

As used herein, a "maximum full-charge thrust" of a motor is the maximum thrust of the motor when the battery is fully charged (without the computer system 33 artificially limiting the thrust available to the rider). As used herein, a "maximum available thrust" of a motor is the maximum thrust the computer system 33 will allow. The computer system 33 can artificially limit the thrust of a motor to encourage the rider to head back to shore (rather than continuing riding until the battery is completely drained and the rider is stranded away from shore).

Some embodiments are configured to accelerate the watercraft 2 in response to a force on a front portion of the board 4 being larger than a force on a rear portion of the board 4. Some embodiments are configured to decelerate the watercraft 2 in response to a force on the rear portion of the board 4 being larger than a force on the front portion of the board 4.

Some embodiments do not cause the watercraft 2 to accelerate (e.g., by using motors) unless a force on the front portion of the board 4 is at least 10 percent larger than a force on the rear portion of the board 4. Some embodiments do not cause the watercraft 2 to decelerate (e.g., by using motors, by reduce power to motors, by using braking fins) unless a force on the rear portion of the board 4 is at least 10 percent larger than a force on the front portion of the board 4.

A watercraft 2 can comprise a board 4 having an upward-facing side 6 configured to enable a person to surf on the watercraft 2. The watercraft 2 can comprise a motor (e.g., any of the motors described herein) coupled to the board 4 and configured to propel the board 4 to enable the person to surf on the watercraft 2.

The board 4 can comprise a front portion (that includes the nose 10) and a back portion (that includes the tail 12). The watercraft 2 can comprise a first force sensor system configured to detect a first foot stepping on a first upward-facing surface 53 of the front portion of the board 4. The watercraft 2 can comprise a second force sensor system configured to detect a second foot stepping on a second upward-facing surface 54 of the back portion of the board 4.

The watercraft can comprise a computer system 33 having at least one processor 39 and a memory 32 having program instructions 38 that when executed by the at least one processor 39 are configured to increase a first thrust of the motor in response to comparing a first force detected by the first force sensor system to a second force detected by the second force sensor system.

The first force sensor system can comprise a first force sensor and a second force sensor. (The first force sensor and the second force sensor can be any two of the force sensors 28*a*, 28*b*, 28*c*, 28*d*.)

The first force sensor system can comprise a first platform 87. The first platform 87 is arranged under the first upward-facing surface 53 and configured such that the first foot stepping on a first area 83*a* centered over the first force sensor and the second force sensor presses the first platform 87 onto the first force sensor and onto the second force sensor to enable the computer system 33 to detect the first force based on both first data from the first force sensor and second data from the second force sensor.

In some embodiments, the first force is calculated by adding each force detected by each force sensor (e.g., force sensors 28*a*, 28*b*, 28*c*, 28*d*) at a particular moment in time. For example, force sensor 28*a* may detect 20 pounds, force sensor 28*b* may detect 20 pounds, force sensor 28*c* may detect 20 pounds, force sensor 28*d* may detect 20 pounds. In this case, the first force can be 80 pounds. The first force can be calculated every 0.1 seconds, every 0.01 seconds, every 0.001 seconds, or at any regular or irregular interval to enable the watercraft 2 to respond quickly to shifts in the rider's position.

In some embodiments, the second force is calculated by adding each force detected by each force sensor (e.g., force sensors 28*e*, 28*f*, 28*g*, 28*h*) at a particular moment in time. For example, force sensor 28*e* may detect 10 pounds, force sensor 28*f* may detect 10 pounds, force sensor 28*g* may detect 10 pounds, force sensor 28*h* may detect 10 pounds. In this case, the second force can be 40 pounds. The second force can be calculated every 0.1 seconds, every 0.01 seconds, every 0.001 seconds, or at any regular or irregular interval to enable the watercraft 2 to respond quickly to shifts in the rider's position.

The second force sensor system can comprise a third force sensor and a fourth force sensor. (The third force sensor and the fourth force sensor can be any two of the force sensors 28*e*, 28*f*, 28*g*, 28*h*.)

The second force sensor system can comprise a second platform 88. The second platform 88 is arranged under the second upward-facing surface 54 and configured to be sufficiently rigid such that the second foot stepping on a second area 83*b* centered over the third force sensor and the fourth force sensor presses the second platform 88 onto the third force sensor and onto the fourth force sensor to enable the computer system 33 to detect the second force based on both third data from the third force sensor and fourth data from the fourth force sensor.

The first platform 87 can be sufficiently rigid such that when a foot stands on the first platform 87, the first platform 87 transfers at least 90 percent of the force (from the foot) onto force sensors (e.g., force sensors 28*a*, 28*b*, 28*c*, 28*d*). If the first platform 87 is not sufficiently rigid, the first platform 87 may flex so much that the force (from the foot) is transferred onto the upward-facing side 6 of the board 4 rather than being detected by the force sensors (e.g., force sensors 28*a*, 28*b*, 28*c*, 28*d*).

The second platform 88 can be sufficiently rigid such that when a foot stands on the second platform 88, the second platform 88 transfers at least 90 percent of the force (from the foot) onto force sensors (e.g., force sensors 28*e*, 28*f*, 28*g*, 28*h*). If the second platform 88 is not sufficiently rigid, the second platform 88 may flex so much that the force (from the foot) is transferred onto the upward-facing side 6 of the board 4 rather than being detected by the force sensors (e.g., force sensors 28*e*, 28*f*, 28*g*, 28*h*).

In some embodiments, the first platform 87 and the second platform 88 are molded from plastic. In some embodiments, the first upward-facing surface 53 and the second upward-facing surface 54 are made from soft foam (for comfort and safety). The board 4 can be made from foam. The board 4 can be made using surfboard fabrication techniques. The board 4 can be made with fiberglass.

In some embodiments, the board 4, the first platform 87, the second platform 88, the first upward-facing surface 53, and the second upward-facing surface 54 are made from fiberglass.

Embodiments can use any of the motors described herein. A motor can comprise at least one of a propeller 16 and an impeller (of a motor 15). The watercraft 2 further comprising a computer system 33 having at least one processor 39 and a memory 32 having program instructions 38 that when executed by the at least one processor 39 are configured to decelerate the watercraft 2 in response to comparing a first force detected by the first force sensor system to a second force detected by the second force sensor system.

The first force sensor system can comprise one or more of force sensors 28*a*, 28*b*, 28*c*, 28*d*. The second force sensor system can comprise one or more of force sensors 28*e*, 28*f*, 28*g*, 28*h*.

The program instructions 38 can be configured to decelerate the watercraft 2 by decreasing a forward thrust of at least one of the propeller 16 and the impeller (of a motor 15). Decreasing the forward thrust can be accomplished by reducing a rotational rate of the propeller 16 and/or the impeller (of a motor 15).

The program instructions 38 can be configured to decelerate the watercraft 2 by reversing a rotational direction of at least one of the propeller 16 and the impeller (of a motor 15) from a forward thrust direction to a reverse thrust direction. The forward thrust direction rotates the propeller 16 and/or the impeller in a direction that applies a forward force to the watercraft 2. The reverse thrust direction rotates the propeller 16 and/or the impeller in a direction that applies a backward force to the watercraft 2. A reverse thrust direction can be used to slow the watercraft 2 from a first forward speed (e.g., of 25 miles per hour) to a second forward speed that is less than the first forward speed. The second forward speed can be less than five miles per hour. Continuing to apply reverse thrust can eventually cause the watercraft to move backwards.

The watercraft 2 can comprise a first force sensor system. The first force sensor system can comprise at least a first force sensor (e.g., force sensor 28*a* or force sensor 28*b*) and a second force sensor (e.g., force sensor 28*c* or force sensor 28*d*). The first force sensor and the second force sensor can be configured to collectively detect the first force from the first foot stepping on the first upward-facing surface 53.

As used herein, "collectively detect" means that each force sensor of the first force sensor system can detect different portions of the first force. These portions can be added together and/or combined to determine the first force. For example, a force sensor system with force sensor "A" and force sensor "B" may detect 40 pounds with force sensor "A" and may detect 60 pounds with force sensor "B." In this scenario, the first force can be 100 pounds.

The watercraft 2 can comprise a second force sensor system. The second force sensor system can comprise at least a third force sensor (e.g., force sensor 28*e* or force sensor 28*t*) and a fourth force sensor (e.g., force sensor 28*g* or force sensor 28*h*). The third force sensor and the fourth force sensor are configured to collectively detect the second force from the second foot stepping on the second upward-facing surface 54.

Many different control methods can be used with the embodiments described herein and/or incorporated by reference. The control methods noted herein are in no way limiting, but are provided merely as non-limiting examples of some, but not all embodiments.

Referring now primarily to FIGS. 3 and 4, a person can place her left foot on a first area 83*a*, which presses a first platform 87 onto four force sensors 28*a*, 28*b*, 28*c*, 28*d*. The person can place her right foot on a second area 83*b*, which presses a second platform 88 onto four force sensors 28*e*, 28*f*, 28*g*, 28*h*.

"Fa" is the force detected by force sensor 28*a*. "Fb" is the force detected by force sensor 28*b*. "Fc" is the force detected by force sensor 28*c*. "Fd" is the force detected by force sensor 28*d*.

"Fe" is the force detected by force sensor 28*e*. "Ff" is the force detected by force sensor 28*f*. "Fg" is the force detected by force sensor 28*g*. "Fh" is the force detected by force sensor 28*h*.

In some embodiments, if Fa+Fb+Fc+Fd is zero and/or is less than a threshold (e.g., 10 pounds), then the program instructions cut power to the motors, reduce the power to the motors by at least 90 percent, reduce the rotational speed of a propeller or impeller by at least 90 percent, reduce the speed of the watercraft to less than five miles per hour, orient fins in a braking orientation, and/or reverse a rotational direction of at least one of the propeller and the impeller from a forward thrust direction to a reverse thrust direction (e.g., until the speed of the watercraft is less than five miles per hour).

In some embodiments, if Fe+Ff+Fg+Fh is zero and/or is less than a threshold (e.g., 10 pounds), then the program instructions cut power to the motors, reduce the power to the motors by at least 90 percent, reduce the rotational speed of a propeller or impeller by at least 90 percent, reduce the speed of the watercraft to less than five miles per hour, orient fins in a braking orientation, and/or reverse a rotational direction of at least one of the propeller and the impeller from a forward thrust direction to a reverse thrust direction (e.g., until the speed of the watercraft is less than five miles per hour).

In some embodiments, if Fa+Fb+Fc+Fd+Fe+Ff+Fg+Fh is zero and/or is less than a threshold (e.g., 10 pounds), then the program instructions cut power to the motors, reduce the power to the motors by at least 90 percent, reduce the rotational speed of a propeller or impeller by at least 90 percent, reduce the speed of the watercraft to less than five miles per hour, orient fins in a braking orientation, and/or reverse a rotational direction of at least one of the propeller and the impeller from a forward thrust direction to a reverse thrust direction (e.g., until the speed of the watercraft is less than five miles per hour).

In some embodiments, if Fa+Fb+Fc+Fd is greater than Fe+Ff+Fg+Fh, then the program instructions increase the speed of the watercraft (e.g., by increasing the rotational speed of propellers and/or impellers). In some embodiments, if Fa+Fb+Fc+Fd is at least ten percent and/or at least 20 percent greater than Fe+Ff+Fg+Fh, then the program instructions increase the speed of the watercraft.

The rate at which the program instructions increase the speed of the watercraft can scale according to the degree to which Fa+Fb+Fc+Fd is greater than Fe+Ff+Fg+Fh. For example, if Fa+Fb+Fc+Fd is only slightly greater than Fe+Ff+Fg+Fh, the program instructions can increase the speed of the watercraft slowly. If Fa+Fb+Fc+Fd is substantially greater than Fe+Ff+Fg+Fh, the program instructions can increase the speed of the watercraft at a substantial rate. If Fa+Fb+Fc+Fd is dramatically greater than Fe+Ff+Fg+Fh, the program instructions can increase the speed of the watercraft very quickly.

The rate at which the program instructions increase or decrease the speed of the watercraft can be influenced by a database of rider preferences and settings. Riders can select between various modes (e.g., beginner mode, intermediate mode, advanced mode) by pressing buttons 62. The beginner mode can cause the watercraft to accelerate slower than the same ratio of (Fa+Fb+Fc+Fd) divided by (Fe+Ff+Fg+Fh) would cause in the advanced mode.

In some embodiments, if Fe+Ff+Fg+Fh is greater than Fa+Fb+Fc+Fd, then the program instructions decrease the speed of the watercraft (e.g., by decreasing the rotational speed of propellers and/or impellers, by placing fins in orientations that slow the watercraft). In some embodiments, if Fe+Ff+Fg+Fh is at least ten percent and/or at least 20 percent greater than Fa+Fb+Fc+Fd, then the program instructions decrease the speed of the watercraft.

The program instructions can compare Fa+Fb+Fc+Fd to Fe+Ff+Fg+Fh many times per second (e.g., every 0.01 seconds) and can update the acceleration behavior and/or deceleration behavior according to the latest comparison. For example, if a COM center of mass 61 (shown in FIG. 36) of the person riding the board 4 is located over the second platform 88, then Fe+Ff+Fg+Fh will typically be larger than Fa+Fb+Fc+Fd, which can trigger the program instructions to cause the watercraft to decelerate. Deceleration of the watercraft can help shift the center of mass 61 toward the first platform 87, which can decrease Fe+Ff+Fg+Fh compared to Fa+Fb+Fc+Fd. As the center of mass 61 continues to shift toward the nose 10 of the board 4, Fe+Ff+Fg+Fh will typically decrease compared to Fa+Fb+Fc+Fd, which can trigger the program instructions to decrease the rate of deceleration (and can even trigger the program instructions to accelerate the watercraft). Eventually, Fe+Ff+Fg+Fh decrease to the point that Fe+Ff+Fg+Fh is approximately equal to Fa+Fb+Fc+Fd, which can trigger the program instructions to maintain a current speed of the watercraft.

In some embodiments, if a COM center of mass 61 (shown in FIG. 36) of the person riding the board 4 is located over the first platform 87, then Fa+Fb+Fc+Fd will typically be larger than Fe+Ff+Fg+Fh, which can trigger the program instructions to cause the watercraft to accelerate. Acceleration of the watercraft can help shift the center of mass 61 toward the second platform 88, which can decrease Fa+Fb+Fc+Fd compared to Fe+Ff+Fg+Fh. As the center of mass 61 continues to shift toward the tail 12 of the board 4, Fa+Fb+Fc+Fd will typically decrease compared to Fe+Ff+Fg+Fh, which can trigger the program instructions to decrease the rate of acceleration (and can even trigger the program instructions to decelerate the watercraft). Eventually, Fa+Fb+Fc+Fd decrease to the point that Fa+Fb+Fc+Fd is approximately equal to Fe+Ff+Fg+Fh, which can trigger the program instructions to maintain a current speed of the watercraft.

In some embodiments, if Fa+Fb is greater than Fc+Fd, then the program instructions direct water flow to turn the watercraft leftward. In some embodiments, if Fa+Fb is at least ten percent and/or at least 20 percent greater than Fc+Fd, then the program instructions direct water flow to turn the watercraft leftward.

In some embodiments, if Fe+Ff is greater than Fg+Fh, then the program instructions direct water flow to turn the watercraft leftward. In some embodiments, if Fe+Ff is at least ten percent and/or at least 20 percent greater than Fg+Fh, then the program instructions direct water flow to turn the watercraft leftward.

In some embodiments, if Fa+Fb+Fe+Ff is greater than Fc+Fd+Fg+Fh, then the program instructions direct water flow to turn the watercraft leftward. In some embodiments, if Fa+Fb+Fe+Ff is at least ten percent and/or at least 20 percent greater than Fc+Fd+Fg+Fh, then the program instructions direct water flow to turn the watercraft leftward.

In some embodiments, if Fc+Fd is greater than Fa+Fb, then the program instructions direct water flow to turn the watercraft rightward. In some embodiments, if Fc+Fd is at least ten percent and/or at least 20 percent greater than Fa+Fb, then the program instructions direct water flow to turn the watercraft rightward.

In some embodiments, if Fg+Fh is greater than Fe+Ff, then the program instructions direct water flow to turn the watercraft rightward. In some embodiments, if Fg+Fh is at least ten percent and/or at least 20 percent greater than Fe+Ff, then the program instructions direct water flow to turn the watercraft rightward.

In some embodiments, if Fc+Fd+Fg+Fh is greater than Fa+Fb+Fe+Ff, then the program instructions direct water flow to turn the watercraft rightward. In some embodiments, if Fc+Fd+Fg+Fh is at least ten percent and/or at least 20 percent greater than Fa+Fb+Fe+Ff, then the program instructions direct water flow to turn the watercraft rightward.

The rate at which the program instructions turn the watercraft can be influenced by a database of rider preferences and settings. Riders can select between various modes (e.g., beginner mode, intermediate mode, advanced mode) by pressing buttons 62. The mode selected by the rider can influence the rate at which the program instructions turn the watercraft.

The rate at which the program instructions turn the watercraft leftward can scale according to the degree to which Fa+Fb+Fe+Ff is greater than Fc+Fd+Fg+Fh. For example, if Fa+Fb+Fe+Ff is only slightly greater than Fc+Fd+Fg+Fh, the program instructions can turn the watercraft slowly. If Fa+Fb+Fe+Ff is substantially greater than Fc+Fd+Fg+Fh, the program instructions can turn the watercraft at a substantial rate. If Fa+Fb+Fe+Ff is dramatically greater than Fc+Fd+Fg+Fh, the program instructions can turn the watercraft very quickly. The rate at which the program instructions turn the watercraft rightward can also scale (in the same way) according to the degree to which Fc+Fd+Fg+Fh is greater than Fa+Fb+Fe+Ff.

In some cases, turning the watercraft too quickly can cause the rider to fall off the watercraft (especially if the rider is a beginner rather than advanced). In some embodiments, the advanced mode enables faster turning than the intermediate mode, and the intermediate mode enables faster turning than the beginner mode.

The program instructions can compare Fa+Fb+Fe+Ff to Fc+Fd+Fg+Fh many times per second (e.g., every 0.01 seconds) and can update the turning behavior according to the latest comparison. For example, if a COM center of mass 61 (shown in FIGS. 30 and 31) of the person riding the board 4 is located far to the left of the board 4, Fa+Fb+Fe+Ff will typically be much greater than Fc+Fd+Fg+Fh. As the watercraft turns in response to Fa+Fb+Fe+Ff being much greater than Fc+Fd+Fg+Fh, the center of mass 61 will typically move such that the center of mass 61 is not as far to the left of the board 4, which can trigger the programming instructions to reduce the magnitude of the turn. As the watercraft continues to turn, the center of mass 61 will typically eventually become centered over the board, at which point Fa+Fb+Fe+Ff will approximately equal Fc+Fd+Fg+Fh, which can cause the turn to end (and can cause the watercraft to go straight rather than turn).

In some embodiments, a tilt sensor 24 (shown in FIG. 28) can be used to help govern turning of the watercraft via any of the motors and/or movable fins described herein. The motors and fins can direct water flow to turn the watercraft. After calibrating the tilt sensor 24 to a horizontal plane, if the tilt sensor 24 indicates a tilt of five degrees in a counterclockwise direction (such that the left side 57 of the board 4 moves downward), the program instructions can direct water flow (e.g., via motors and/or fins) to turn the watercraft leftward at a first rate.

If the tilt sensor 24 indicates a tilt of ten degrees in a counterclockwise direction (such that the left side 57 of the board 4 moves downward), the program instructions can direct water flow (e.g., via motors and/or fins) to turn the watercraft leftward at a second rate. In some embodiments, the second rate is larger than the first rate such that the turning rate scales with the degree of tilt. This scaling can be linear or non-linear.

In some embodiments, a tilt sensor 24 (shown in FIG. 28) can be used to help govern turning of the watercraft via any of the motors and/or movable fins described herein. The motors and fins can direct water flow to turn the watercraft. After calibrating the tilt sensor 24 to a horizontal plane, if the tilt sensor 24 indicates a tilt of five degrees in a clockwise direction (such that the right side 58 of the board 4 moves downward), the program instructions can direct water flow (e.g., via motors and/or fins) to turn the watercraft rightward at a first rate.

If the tilt sensor 24 indicates a tilt of ten degrees in a clockwise direction (such that the right side 58 of the board 4 moves downward), the program instructions can direct water flow (e.g., via motors and/or fins) to turn the watercraft rightward at a second rate. In some embodiments, the second rate is larger than the first rate such that the turning rate scales with the degree of tilt. This scaling can be linear or non-linear.

Some embodiments use combinations of the program-instruction embodiments described herein.

The program instructions 38 can apply the methods and systems described in the context of FIGS. 30-35 at the same time that the program instructions 38 apply the methods and systems described in the context of FIGS. 36-38.

The program instructions 38 can analyze not only where the estimated COM 61 is located (e.g., based on the force distribution and/or based on tilt information), but also can analyze changes in the estimated COM 61 location and the rate of change of the estimated COM 61 location (e.g., by analyzing how the force distribution is changing with time and/or analyzing how the tilt is changing with time).

The program instructions 38 can detect a shift in the estimated COM 61 leftward or rightward (e.g., by comparing Fa+Fb+Fe+Ff to Fc+Fd+Fg+Fh over time, by comparing Fa+Fb to Fc+Fd over time, by comparing Fe+Ff to Fg+Fh over time, by detecting a rotation over time about the central axis 8 using a tilt sensor 24, by using any of the methods described herein) and can respond to the leftward or rightward shift in the COM 61 by turning the watercraft 2 leftward or rightward while the program instructions 38 detect a shift of the estimated COM 61 toward the nose 10 or toward the tail 12 (e.g., by comparing Fa+Fb+Fc+Fd to Fe+Ff+Fg+Fh over time, by using any of the methods described herein) and respond by accelerating or decelerating the watercraft 2.

The program instructions 38 can be configured to respond to force and tilt data by turning and accelerating at the same time. The program instructions 38 can be configured to respond to force and tilt data by turning and decelerating at the same time.

The program instructions 38 can detect that the estimated COM 61 is not centered and instead is too far leftward or rightward (e.g., by comparing Fa+Fb+Fe+Ff to Fc+Fd+Fg+Fh, by comparing Fa+Fb to Fc+Fd, by comparing Fe+Ff to Fg+Fh, by detecting a rotation about the central axis 8 using a tilt sensor 24, by using any of the methods described herein) while the program instructions 38 detect that the estimated COM 61 is not centered and instead is too far toward the nose 10 or toward the tail 12 (e.g., by comparing Fa+Fb+Fc+Fd to Fe+Ff+Fg+Fh, by using any of the methods described herein). The program instructions 38 can respond by turning the watercraft 2 leftward or rightward while accelerating or decelerating the watercraft 2.

Other embodiments use more complex programming instructions to govern turning, acceleration, and deceleration of the watercraft. Various embodiments use more aggressive and less aggressive responses to weight distributions and/or tilting. Responses can be nonlinear and can scale with the weight imbalances and/or tilts according to a mode selected by the rider, according to the speed of the watercraft, according to optimizing algorithms, and/or according to any other item that helps prevent the rider from falling off the board.

Any of the watercraft embodiments described herein and/or incorporated by reference can be used with a hydrofoil. The hydrofoil can be coupled to a bottom of a board. Any of the motors described herein and/or incorporated by reference can be coupled to the hydrofoil such that the hydrofoil couples the motor to the board 4.

Figure 39:
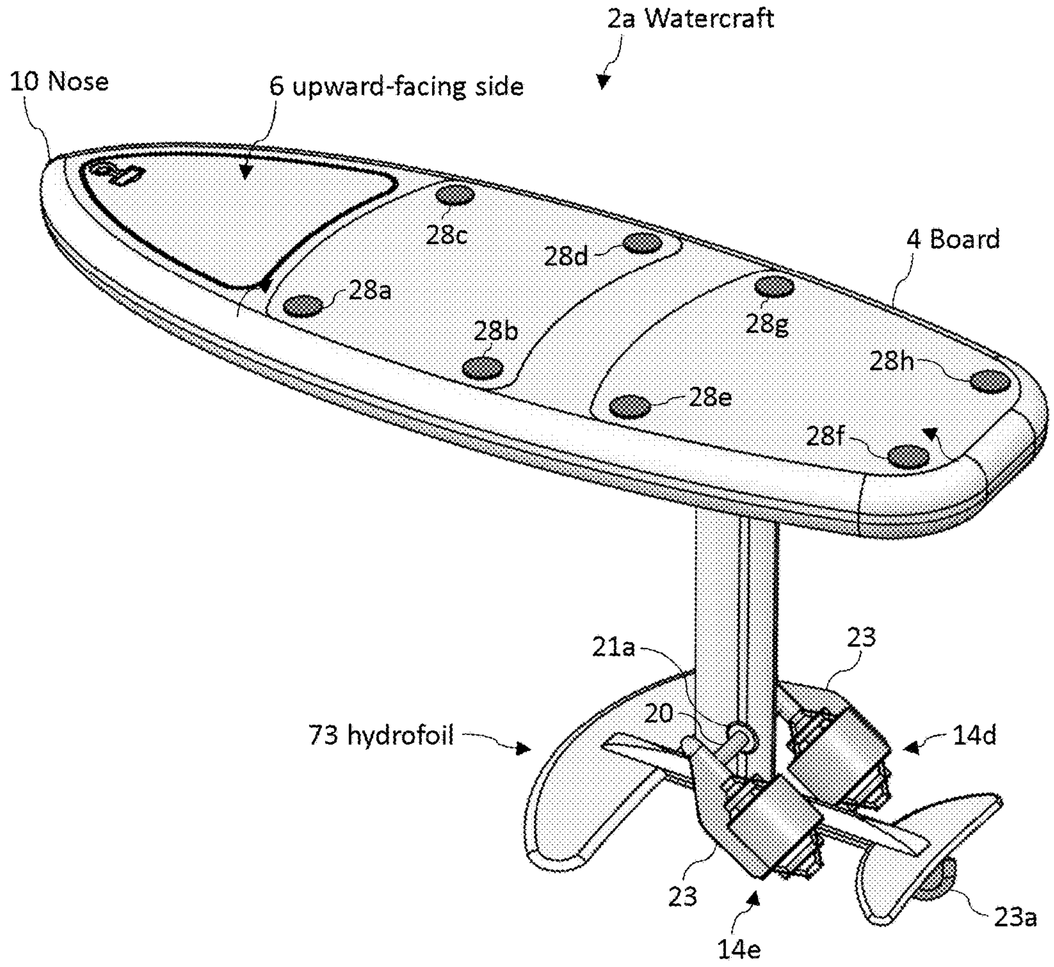
FIG. 39 illustrates a perspective view of a top, a side, and a back of the watercraft with a hydrofoil, according to some embodiments.
Figure 40:
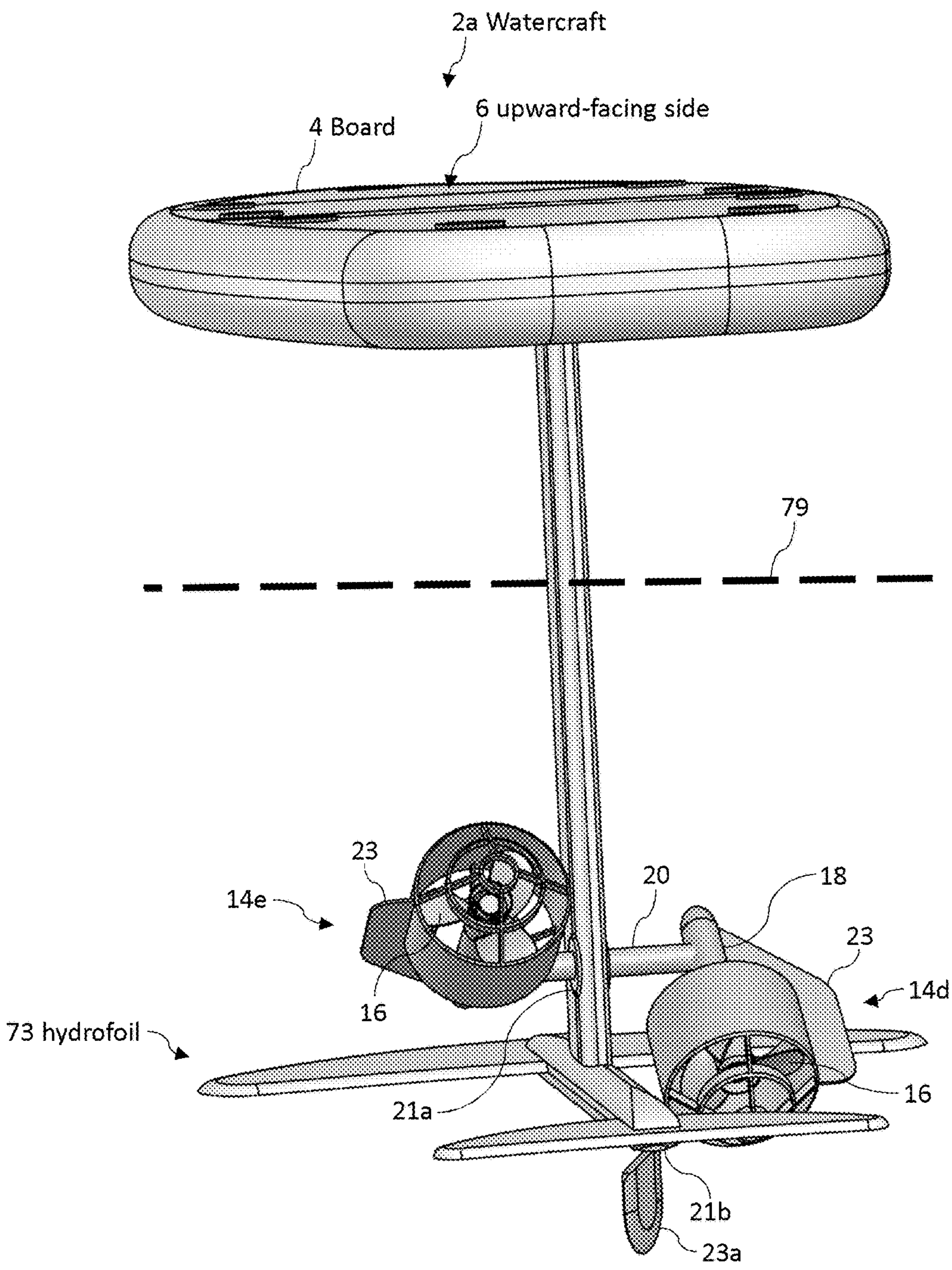
FIGS. 40 and 41 illustrate perspective views that mainly show a back of the watercraft but also show a top and a side of the watercraft with a hydrofoil, according to some embodiments.
Figure 41:
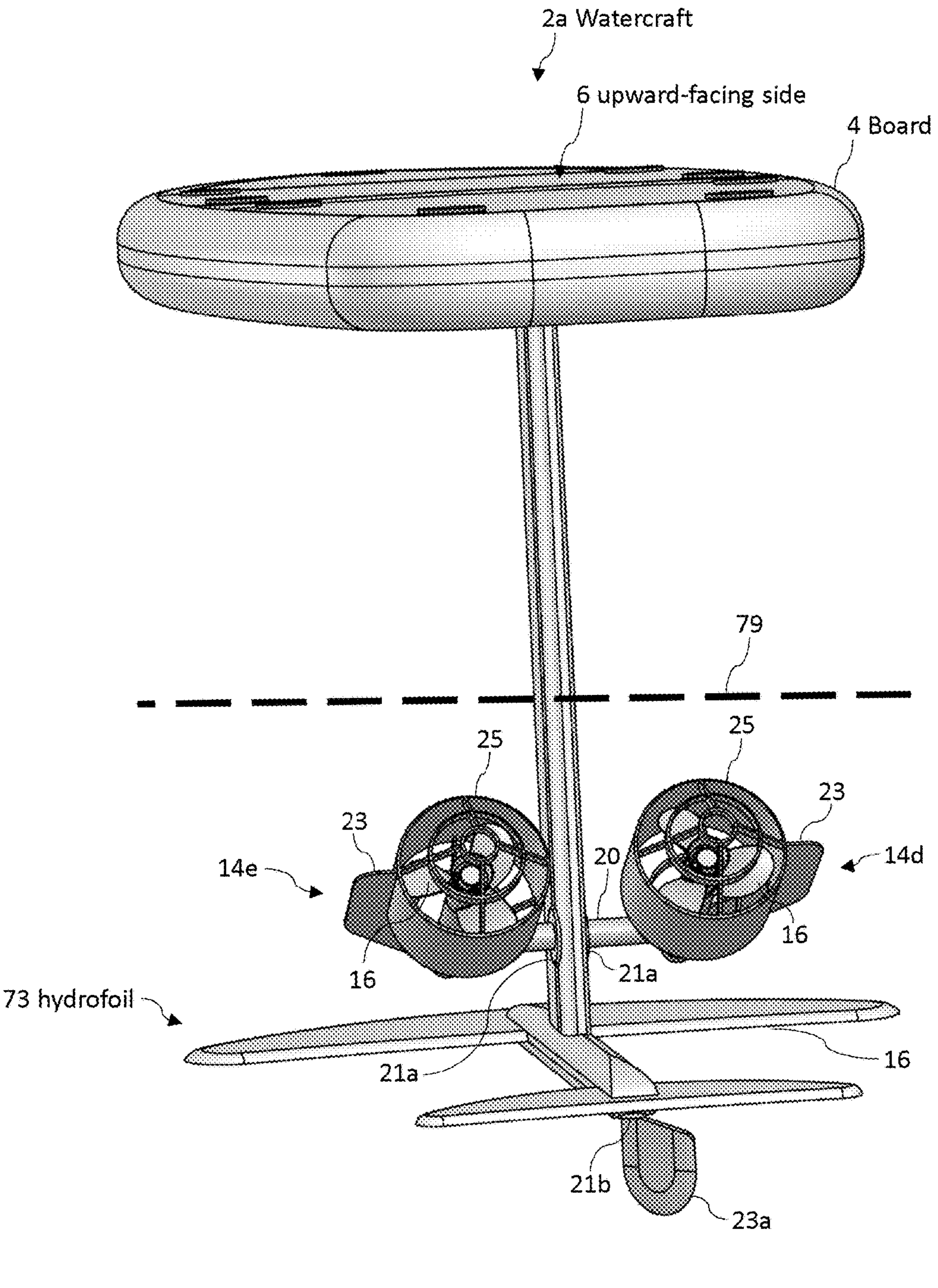

FIGS. 39-41 illustrate perspective views of a watercraft 2*a* that can include any of the features described in the context of FIGS. 1-38. The watercraft 2*a* can include any of the features described in the context of watercraft 2. To avoid unnecessary redundancy, not all the features are described both in the context of watercraft 2 and in the context of watercraft 2*a*.

The first upward-facing surface 53 and the second upward-facing surface 54 are hidden in FIGS. 39-41 to show force sensors 28*a*, 28*b*, 28*c*, 28*d*, 28*e*, 28*f*, 28*g*, 28*h*.

A hydrofoil 73 can couple motor systems 14*a*, 14*b*, 14*c*, 14*d*, 14*e* to the board 4. Motor systems 14*d*, 14*e* can include any of the features described in the context of motor systems 14*a*, 14*b*, 14*c*. To avoid unnecessary redundancy, not all the features are described both in the context of motor systems 14*a*, 14*b*, 14*c* and in the context of motor systems 14*d*, 14*e*.

Motor systems 14*d*, 14*e* can comprise a propeller 16 and an electric motor 18 configured to rotate the propeller 16. The motor systems 14*d*, 14*e* can comprise a rotatable shaft 20. A rotary actuator 21*a* (e.g., a servomotor) can couple the shaft 20 to the board 4 and/or to the hydrofoil 73.

Program instructions 38 can cause the rotary actuator 21*a* to rotate the shaft 20 (and thereby rotate the propeller 16 and a fin 23). Rotating the shaft 20 and/or the fin 23 can direct water flow (e.g., as the board moves relative to water of a lake) to steer the watercraft 2*a*. A protective cover 25 can shield people from the propeller 16.

Motor systems 14*d*, 14*e* can be rotated independently of each other to optimize the balancing of the person riding the watercraft 2*a* (e.g., to maintain a center of mass of the person over the board 4).

A fin 23*a* can be coupled to the hydrofoil 73 and/or to the board 4 by a rotary actuator 21*b* (e.g., a servomotor). The fin 23*a* can be rotated by the rotary actuator 21*b* (e.g., as controlled by program instructions 38). Rotating the fin 23*a* can cause the watercraft 2*a* to turn leftward or rightward to enable the watercraft 2*a* to perform the center of mass optimization described in the context of FIGS. 30 and 31. In FIG. 40, the fin 23*a* is positioned to help turn the watercraft 2*a* leftward (although the actual turning can be influenced by other fins 23). In FIG. 41, the fin 23*a* is positioned to turn the watercraft 2*a* rightward.

Rotating rotatory actuators 21*a* can rotate fins 23 and/or motor systems 14*d*, 14*e* to enable the watercraft 2*a* to perform the center of mass optimization described in the context of FIGS. 30 and 31. FIG. 40 illustrates moving the left and right fins 23 in different directions to cause the watercraft 2*a* to turn and tilt. Turning and tilting can be used to perform center of mass optimization (to help the rider avoid falling off the board 4).

In FIG. 39, the rotatory actuators 21*a* have positioned the fins 23 such that the fins 23 help the board 4 rise upward from the surface 79 of the water (on which the watercraft 2*a* is riding). The propellers 26 can also help the board 4 rise upward from the surface 79 of the water.

In FIG. 41, the rotatory actuators 21*a* have positioned the fins 23 such that the fins 23 help the board 4 go downward toward the surface 79 of the water (on which the watercraft 2*a* is riding). The propellers 26 can also help the board 4 go downward toward the surface 79 of the water.

The fins 23 can also make the nose 10 of the board 4 rotate upward away from the surface 79 of the water and can make the nose 10 of the board 4 rotate downward toward the surface 79 of the water.

If one motor system (e.g., 14*e*) applies more thrust than another motor system (e.g., 14*d*), the thrust asymmetry can cause the watercraft 2*a* to turn. If program instructions 38 cause motor system 14*e* to apply more thrust than motor system 14*d*, the watercraft 2*a* can turn rightward. If program instructions 38 cause motor system 14*d* to apply more thrust than motor system 14*e*, the watercraft 2*a* can turn leftward.

Program instructions 38 can perform center of mass optimization (to help the rider not fall off the board 4) by using motor systems 14*d*, 14*e* and fins 23, 23*a* to move the board 4 leftward, move the board 4 rightward, move the board 4 upward (away from a surface 79 of the water), and/or move the board 4 downward (toward the surface 79 of the water).

Program instructions 38 can also perform center of mass optimization (to help the rider not fall off the board 4) by using motor systems 14*d*, 14*e* and fins 23, 23*a* to cause the board 4 to tilt rightward, leftward, forward, and/or backward.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are non-limiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

To increase the clarity of various features, other features are not labeled in each figure.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations—are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A watercraft comprising:

a board comprising a front portion, a back portion, and an upward-facing side that is configured to enable a person to surf on the watercraft;

a motor coupled to the board and configured to propel the board;

a first force sensor system configured to detect a first foot stepping on a first upward-facing surface of the front portion;

a second force sensor system configured to detect a second foot stepping on a second upward-facing surface of the back portion; and a computer system comprising at least one processor and a memory, wherein the memory comprises program instructions that when executed by the at least one processor are configured to increase a first thrust of the motor in response to at least one of:

determining that the first force is greater than a first predetermined threshold relative to the second force, determining that a first ratio of the first force divided by the second force is greater than a second predetermined threshold, and determining that a second ratio of the second force divided by the first force is less than a third predetermined threshold.

2. The watercraft of claim 1, wherein the first force sensor system comprises at least a first force sensor and a second force sensor, and the first force sensor and the second force sensor are configured to collectively detect the first force from the first foot stepping on the first upward-facing surface, and wherein the second force sensor system comprises at least a third force sensor and a fourth force sensor, and the third force sensor and the fourth force sensor are configured to collectively detect the second force from the second foot stepping on the second upward-facing surface.

3. The watercraft of claim 2, wherein the program instructions are configured to determine the first force based on first data from the first force sensor and based on second data from the second force sensor, and wherein the program instructions are configured to determine the second force based on third data from the third force sensor and based on fourth data from the fourth force sensor.

4. The watercraft of claim 1, wherein the first force sensor system comprises at least a first force sensor, a second force sensor, and a third force sensor arranged in a triangular format under the first upward-facing surface to detect the first force.

5. The watercraft of claim 1, wherein the first force sensor system comprises at least a first force sensor, a second force sensor, a third force sensor, and a fourth force sensor arranged in at least one of a quadrilateral format under the first upward-facing surface to detect the first force and a trapezoidal format under the first upward-facing surface to detect the first force.

6. The watercraft of claim 1, wherein the board comprises at least one of a surfboard shape, a wakeboard shape, a stand-up-paddleboard shape, a kiteboarding board shape, a snowboard shape, and a windsurfing board shape.

7. The watercraft of claim 1, wherein the board is buoyant in fresh water, at least a majority of the upward-facing side is approximately flat, a first foot binding is coupled to the first upward-facing surface, and a second foot binding is coupled to the second upward-facing surface.

8. The watercraft of claim 1, further comprising a hydrofoil that couples the motor to the board.

9. The watercraft of claim 1, wherein the motor comprises at least one of a propeller and an impeller, and the program instructions are configured to decelerate the watercraft in response to comparing a third force detected by the first force sensor system to a fourth force detected by the second force sensor system.

10. The watercraft of claim 9, wherein the program instructions are configured to decelerate the watercraft by decreasing a forward thrust of at least one of the propeller and the impeller.

11. The watercraft of claim 9, wherein the program instructions are configured to decelerate the watercraft by reversing a rotational direction of at least one of the propeller and the impeller from a forward thrust direction to a reverse thrust direction.

12. The watercraft of claim 9, further comprising a braking fin, wherein the program instructions are configured to decelerate the watercraft by deploying the braking fin.

13. The watercraft of claim 1, further comprising:

a left force sensor system coupled to a left half of the board such that the left force sensor system is configured to detect a third force from at least a first portion of the person stepping on the left half;

a right force sensor system coupled to a right half of the board such that the right force sensor system is configured to detect a fourth force from at least a second portion of the person stepping on the right half; and a steering system comprising at least one of an impeller, a propeller, a movable nozzle, and a fin, wherein the steering system is configured to turn the watercraft by directing water flow, wherein the program instructions are configured to cause the steering system to direct the water flow to turn the watercraft in response to comparing the third force detected by the left force sensor system to the fourth force detected by the right force sensor system.

14. The watercraft of claim 13, further comprising a platform configured to enable the first foot to step on the platform while the person surfs, wherein the platform is coupled to the left half of the board such that at least a portion of the left force sensor system is located under the platform and is configured to detect at least a portion of the third force from the first foot stepping on the platform, and the platform is coupled to the right half of the board such that at least a portion of the right force sensor system is located under the platform and is configured to detect at least a portion of the fourth force from the first foot stepping on the platform.

15. The watercraft of claim 1, wherein the board comprises a central axis from a tail of the board to a nose of the board, the watercraft further comprising:

a first tilt sensor configured to detect a first rotation relative to the central axis of at least a first portion of the board; and a steering system comprising at least one of an impeller, a propeller, a movable nozzle, and a fin, wherein the steering system is configured to turn the watercraft by directing water flow, wherein the program instructions are configured to cause the steering system to direct the water flow to turn the watercraft in response to the first tilt sensor detecting the first rotation.

16. The watercraft of claim 15, wherein the first tilt sensor is configured to detect a second rotation of the board in a clockwise direction relative to the central axis, and the program instructions are configured to cause the steering system to direct the water flow to turn the watercraft rightward in response to the first tilt sensor detecting the second rotation.

17. The watercraft of claim 15, wherein the first tilt sensor comprises at least one of a gyroscope, an accelerometer, an inclinometer, a clinometer, a liquid capacitive sensor, an electrolytic sensor, and a pendulum sensor.

18. The watercraft of claim 1, further comprising:

a first tilt sensor configured to detect a first rotation about an axis between the front portion of the board and the back portion of the board; and a trim tab coupled to a back half of the board, wherein the back half comprises the tail a tail of the board, and the trim tab is configured to pivot to direct water flow downward, wherein the program instructions are configured to cause the trim tab to direct the water flow downward in response to the first tilt sensor detecting a condition indicative of a nose of the board being raised more than a predetermined angle from a horizontal plane.

19. The watercraft of claim 18, further comprising a hydrofoil that couples the motor and the trim tab to the board.

20. The watercraft of claim 1, wherein the program instructions are configured to decrease a second thrust of the motor at least ninety percent in response to the first force sensor system detecting a third force that is less than a fourth predetermined threshold and in response to the second force sensor system detecting a fourth force that is less than a fifth predetermined threshold.

21. A watercraft comprising:

a board comprising a front portion, a back portion, and an upward-facing side that is configured to enable a person to surf on the watercraft;

a motor coupled to the board and configured to propel the board;

a first force sensor system configured to detect a first foot stepping on a first upward-facing surface of the front portion;

a second force sensor system configured to detect a second foot stepping on a second upward-facing surface of the back portion; and a computer system comprising at least one processor and a memory comprising program instructions that when executed by the at least one processor are configured to increase a first thrust of the motor in response to comparing a first force detected by the first force sensor system to a second force detected by the second force sensor system, wherein the first force sensor system comprises a first force sensor, a second force sensor, and a first platform, wherein the first platform is arranged under the first upward-facing surface and is configured such that the first foot stepping on a first area centered over the first force sensor and the second force sensor presses the first platform onto the first force sensor and onto the second force sensor to enable the computer system to detect the first force based on both first data from the first force sensor and second data from the second force sensor.

22. The watercraft of claim 21, wherein the second force sensor system comprises a third force sensor, a fourth force sensor, and a second platform, wherein the second platform is arranged under the second upward-facing surface and is configured to be sufficiently rigid such that the second foot stepping on a second area centered over the third force sensor and the fourth force sensor presses the second platform onto the third force sensor and onto the fourth force sensor to enable the computer system to detect the second force based on both third data from the third force sensor and fourth data from the fourth force sensor.

23. The watercraft of claim 21, wherein the program instructions are configured to increase the first thrust of the motor in response to at least one of:

determining that the first force detected by the first force sensor system is greater than the second force detected by the second force sensor system, determining that the second force detected by the second force sensor system is less than the first force detected by the first force sensor system, determining that the first force detected by the first force sensor system is at least twenty percent greater than the second force detected by the second force sensor system, determining that the second force detected by the second force sensor system is at least twenty percent less than the first force detected by the first force sensor system, determining that the first force detected by the first force sensor system is greater than eighty percent of the second force detected by the second force sensor system, and determining that the second force detected by the second force sensor system is less than 120 percent of the first force detected by the first force sensor system.

24. The watercraft of claim 21, wherein the first force sensor system comprises at least the first force sensor, the second force sensor, and a third force sensor arranged in a triangular format under the first platform to detect the first force.

25. The watercraft of claim 21, wherein the first force sensor system comprises at least the first force sensor, the second force sensor, a third force sensor, and a fourth force sensor arranged in at least one of a quadrilateral format under the first platform to detect the first force and a trapezoidal format under the first platform to detect the first force.

26. A watercraft comprising:

a board comprising a front portion, a back portion, and an upward-facing side that is configured to enable a person to surf on the watercraft;

a motor coupled to the board and configured to propel the board;

a first force sensor system configured to detect a first foot stepping on a first upward-facing surface of the front portion;

a second force sensor system configured to detect a second foot stepping on a second upward-facing surface of the back portion; and a computer system comprising at least one processor and a memory comprising program instructions that when executed by the at least one processor are configured to decrease a first thrust of the motor at least ninety percent in response to the first force sensor system detecting a first force that is less than a first threshold and in response to the second force sensor system detecting a second force that is less than a second threshold, wherein the first threshold is configured to be indicative of the person not standing on the first upward-facing surface, and the second threshold is configured to be indicative of the person not standing on the second upward-facing surface.

27. The watercraft of claim 26, wherein the board comprises at least one of a surfboard shape, a wakeboard shape, a stand-up-paddleboard shape, a kiteboarding board shape, a snowboard shape, and a windsurfing board shape, wherein the first force sensor system comprises a first force sensor, a second force sensor, and a first platform, wherein the first platform is arranged under the first upward-facing surface and is configured such that the first foot of the person stepping on a first area centered over the first force sensor and the second force sensor presses the first platform onto the first force sensor and onto the second force sensor to enable the computer system to detect the first force based on both first data from the first force sensor and second data from the second force sensor, wherein the second force sensor system comprises a third force sensor, a fourth force sensor, and a second platform, wherein the second platform is arranged under the second upward-facing surface and is configured such that the second foot of the person stepping on a second area centered over the third force sensor and the fourth force sensor presses the second platform onto the third force sensor and onto the fourth force sensor to enable the computer system to detect the second force based on both third data from the third force sensor and fourth data from the fourth force sensor.

28. A watercraft comprising:

a board comprising an upward-facing side configured to enable a person to surf on the watercraft;

a motor coupled to the board and configured to propel the board;

a first force sensor system coupled to a left half of the board between an upper surface of the board and a platform such that the first force sensor system is configured to detect a first force from at least a first portion of a first foot stepping on the left half;

a second force sensor system coupled to a right half of the board between the upper surface of the board and the platform such that the second force sensor system is configured to detect a second force from at least a second portion of the first foot stepping on the right half;

a steering system comprising at least one of an impeller, a propeller, a movable nozzle, and a fin, wherein the steering system is configured to turn the watercraft by directing water flow; and a computer system comprising at least one processor and a memory, wherein the memory comprises program instructions configured to cause the steering system to direct the water flow to turn the watercraft leftward in response to at least one of:

determining the first force is greater than the second force, determining the first force is more than a first predetermined threshold greater than the second force, and determining the second force is less than the first force.

29. The watercraft of claim 28, further comprising the platform configured to enable the first foot of the person to step on the platform while the person surfs, wherein the platform is coupled to the left half of the board such that at least a portion of the first force sensor system is located under the platform and is configured to detect at least a portion of the first force from the first foot stepping on the platform, and the platform is coupled to the right half of the board such that at least a portion of the second force sensor system is located under the platform and is configured to detect at least a portion of the second force from the first foot stepping on the platform.

30. The watercraft of claim 28, further comprising a third force sensor system coupled to a front portion of the board such that the third force sensor system is configured to detect a third force from the first foot of the person stepping on the front portion; and a fourth force sensor system coupled to a back portion of the board such that the fourth force sensor system is configured to detect a fourth force from a second foot of the person stepping on the back portion, wherein the motor is configured to use at least one of the impeller and the propeller to create a thrust, and the program instructions are configured to increase the thrust in response to at least one of:

determining that the third force detected by the third force sensor system is greater than the fourth force detected by the fourth force sensor system, and determining that the fourth force detected by the fourth force sensor system is less than the third force detected by the third force sensor system.

* * * * *